(12) United States Patent
Mani et al.

(10) Patent No.: US 7,069,504 B2
(45) Date of Patent: Jun. 27, 2006

(54) CONVERSION PROCESSING FOR XML TO XML DOCUMENT TRANSFORMATION

(75) Inventors: Ravi Mani, Westmont, IL (US); Joerg Meyer, San Jose, CA (US); Pratibha Jamdagneya Sharma, Milpitas, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/246,991

(22) Filed: Sep. 19, 2002

(65) Prior Publication Data

US 2004/0060004 A1  Mar. 25, 2004

(51) Int. Cl.
 *G06F 3/00* (2006.01)
(52) U.S. Cl. ...................................... 715/513
(58) Field of Classification Search ................ 715/513, 715/517, 523, 530
See application file for complete search history.

(56) References Cited

U.S. PATENT DOCUMENTS

| | | | |
|---|---|---|---|
| 6,253,366 B1 * | 6/2001 | Mutschler, III | 717/104 |
| 6,330,569 B1 * | 12/2001 | Baisley et al. | 707/203 |
| 6,342,907 B1 | 1/2002 | Petty et al. | 345/762 |
| 6,408,311 B1 * | 6/2002 | Baisley et al. | 707/203 |
| 6,725,231 B1 * | 4/2004 | Hu et al. | 707/102 |
| 6,782,394 B1 * | 8/2004 | Landeck et al. | 707/104.1 |
| 6,845,380 B1 * | 1/2005 | Su et al. | 707/102 |
| 2003/0167445 A1 * | 9/2003 | Su et al. | 715/513 |

OTHER PUBLICATIONS

Ludo, Van Vooren, "XML and Legacy Data Conversion," 1997<http://www.infoloom.com/gcaconfs/WEB/barcelona97/vooren57.HTM>, pp. 1-3.*
"A Quick Introduction to XML," Nov. 16, 2001, <http://web.archive.orb/web/*/http://http://java.sun.com/xml/jaxp/dist/1.1/docs/tutorial/overview/1_xml.html>.*
Wang, Guangzu, "RE: How to delete empty element tag from output XML?," Oct. 25, 2000, <http://www.xslt.com/html/xsl-list/2000-10/msg00302.html>, pp. 1-3.*
Tang, Shilang, "Efficient Method for Managing XML Data," 2001, pp. 1-36.*
"Webmaster in a Nutshell, 2nd Edition," 1999, O'Reilly & Associates, Inc.*

(Continued)

Primary Examiner—Stephen Hong
Assistant Examiner—Kyle Stork
(74) Attorney, Agent, or Firm—John Biggers; David A. Mims, Jr.; Biggers & Ohanian. LLP

(57) ABSTRACT

Transforming a source XML document satisfying a source DTD into a target XML document satisfying a target DTD, transforming the source XML document into a source document tree, where the source XML document satisfies a first XML grammar and the source document tree satisfies a second XML grammar; converting the source document tree into a target document tree satisfying the second XML grammar; and transforming the target document tree into the target XML document, wherein the target XML document satisfies the first XML grammar.

36 Claims, 23 Drawing Sheets

OTHER PUBLICATIONS

"XML Pocket Reference," 1999, O'Reilly & Associates, Inc.*
"XML Unleashed," 2000, Sams Publishing.*
"Building Java(tm) Enterprise Systems with J2EE(tm)," 2000, Sams Publishing.*
"HTML & XHTML: The Definitive Guide, 4th Edition," 2000, O'Reilly & Associates, Inc.*
"XML for the World Wide Web: Visual QuickStart Guide," 2001, Peachpit Press.*
"ObjectDomain R3 Release Candidate Now Available (Build 181)!," Jul. 24, 2001, <http://web.archive.org/web/20010813143847/www.objectdomain.com/domain30/index.html>.*
"UML2XML—Initial list of requirements (Oct. 9, 2001),".*
Hampton, Kip, "Using XML::Twig," Mar. 21, 2001, <http://www.xml.com/lpt/a/2001/03/21/xmltwig.html>, pp. 1-6.*
Simpson, John E., "Namespace Nuances," Jul. 5, 2001, <http://www.xml.com/lpt/a/2001/07/05/namespaces.html>, pp. 1-5.*
—"Valid Frustrations," Sep. 26, 2001, <http://www.xml.com/lpt/a/2001/09/26/q-and-a.html>, pp. 1-4.*

* cited by examiner

Figure 13

CONVERSION PROCESSING FOR XML TO XML DOCUMENT TRANSFORMATION

BACKGROUND OF THE INVENTION

1. Field of the Invention

The field of the invention is data processing, or, more specifically, methods, systems, and products for conversion processing in support of XML to XML document transformation by use of graphically-specified transformation rules.

2. Description of Related Art

XML is the Extensible Markup Language. XML is designed to provide flexible and adaptable information formatting and identification. XML is called extensible because it has no fixed format like HTML, the Hypertext Markup Language, which is a set of predefined markups. Instead, XML is actually a 'metalanguage'—a language for describing other languages—which allows users to design customized markup languages for many different types of documents.

XML's principal purpose is structuring data. Structured data includes things like spreadsheets, address books, configuration parameters, financial transactions, and technical drawings. XML includes a set of rules for designing text formats that support structuring data.

Like HTML, XML makes use of elements, tags, and attributes. Elements are content segments identified by tags. Elements have possibly empty values, the value of an instance of an element being the string between the start-tag and end-tag for the instance of the element. 'Tags' are words bracketed by '<' and '>,' and attributes are defined characteristics of elements having for example the form: AttributeName="value". While HTML specifies what each tag and attribute means, and often how the text between them will look in a browser, XML uses the tags only to delimit pieces of data, and leaves the interpretation of the data completely to the application that reads it. In other words, although in the predefined syntax of HTML, "<p>" means 'paragraph,' "<p>" in an XML file means whatever the reading application says it means. Depending on the context, it may be a price, a parameter, a person, or in many cases it represents an entity having nothing to do with Ps.

The formal relations among elements and attributes in XML documents are governed by declarations set forth in Document Type Definitions or 'DTDs.' A DTD is a formal description in XML Declaration Syntax of a particular type of XML document. The governing DTD for a particular XML document sets out what names are to be used for the different types of element, where they may occur, and how they all fit together. For example, in a document type describing Lists which contain Items, the relevant part of the governing DTD may contain:

```
<!ELEMENT List (Item)+>
<!ELEMENT Item (#PCDATA)>
```

These declarations define a List as an element containing one or more Items (the plus sign means one or more). These declarations also define Items as elements containing plain text (Parsed Character Data or 'PCDATA'). Validating parsers read the DTD before reading documents governed by the DTD so that the parsers can identify where every element ought to occur and how each relates to the others, so that applications which need to know this in advance (for example, editors, search engines, navigators, and databases) can set themselves up correctly. The example declarations above supports creation of lists in XML like this example snippet:

```
<List>
    <Item>Chocolate</Item>
    <Item>Music</Item>
    <Item>Surfing</Item>
</List>
```

There are three instances of the element named 'Item' in the above example snippet of XML, having values respectively of "Chocolate," "Music," and "Surfing."

How such a list appears in print or on a computer screen depends on an additional document or file called a stylesheet. Unlike HTML, there are no display formatting elements in XML itself. Placing all display formatting in separate files means that display appearance can be changed for all compliant XML documents with no need to edit the XML documents themselves.

There are thousands of DTDs already in existence for many subjects. Many of them can be downloaded and used freely, or users can develop their own DTDs using the XML Declaration Syntax. In fact, it is the growing ubiquity and power of XML and its governing DTDs that creates challenges for users.

XML is not a programming language as such; it is a markup standard for structuring data. There is no need for users to be programmers in order to use XML. On the other hand, DTDs are becoming more widespread, and many DTDs are becoming large and complex. In addition, as more and more data structures, databases, and document types are implemented in XML documents whose structures are governed by DTDs, there is more and more demand for conversion among different structures.

Consider an example of an Internet sales company who purchases a large vendor database from a supplier. The sales company wishes to integrate the vendor database into its sales database. Many of the fields in the two databases map one-to-one, vendor name, vendor street address, city, state, zip code, and so on. Many of them, however, do not. And even the one that do map one-to-one have different field names in the two databases. The sales database's name field is called CustomerName; the vendor database's name field is called VendorName; and so on.

In addition, many desirable conversions are extremely complex: The sales company maintains statistical totals of customers in several categories or even in several different types of categories. The vendor database contains fields that can be mapped into the sales database's category fields, but in order to effect this mapping, running totals must be created for many vendor database fields to map into a single sales database category field at conversion time.

In this example, the vendor database, the source, is expressed in a source XML document governed by a source DTD, and the sales database, the target, is capable of importing data expressed in a target XML governed by a target DTD. The target DTD exists, defining the data structures recognizable by the import function of the target database. The challenge is how to create the target XML document from the source XML document. That is, the challenge is how to convert the data expressed in a source data format conforming with a source DTD into a target format that conforms to a different DTD, the target DTD.

In prior art, although the personnel that developed the XML documents were not required to be programmers, the personnel that write the translation routines, the translation rules for mapping or converting data from the source database to the target database, must not only be programmers, they must be programmers skilled in XML, XML Declaration Syntax, and some special purpose transformation language like XSL for example. And they must be numerous programmers. It would be very advantageous, therefore, it there were means and methods to enable non-programmers, less skilled programmers, or fewer programmers, to establish translation rules for converting a source XML document to a target XML document when the two XML documents have data structures defined and governed by two different DTDs.

SUMMARY OF THE INVENTION

Embodiments of the present invention provide means and methods for transforming a source XML document satisfying a source DTD into a target XML document satisfying a target DTD, including transforming the source XML document into a source document tree, wherein the source XML document satisfies a first XML grammar and the source document tree satisfies a second XML grammar. Typical embodiments include converting the source document tree into a target document tree satisfying the second XML grammar and transforming the target document tree into the target XML document, wherein the target XML document satisfies the first XML grammar.

In typical embodiments, transforming the source XML document into a source document tree further comprises removing alternates and options; converting imbedded repetitions and sequences to repeating children; demoting attributes of elements having attributes to children of the elements having attributes; converting recursive elements to repeating elements; and demoting imbedded leaves and compound repetitions. In some embodiments, transforming the source XML document into a source document tree further comprises pruning the source XML document, including selecting a root element for the target XML document and deleting all XML elements that are outside matching root tags in the source XML document.

In typical embodiments, removing alternates and options further comprises adding start-tags and end-tags with null content for each missing, non-recursive XML element in the source XML document, including identifying missing, non-recursive elements in dependence upon the source DTD. In typical embodiments, converting imbedded repetitions and sequences to repeating children further comprises creating repeating children elements, adding start-tags and end-tags for children elements, and deleting imbedded repetitions and sequences.

In typical embodiments, demoting attributes of elements having attributes to children of the elements having attributes further comprises adding start-tags and end-tags identifying new attribute demotion elements incorporating attribute names as the names of the new elements, inserting attribute values as element values, and deleting the attributes. In typical embodiments, demoting imbedded leaves and compound repetitions further comprises adding IMPCDATA tags to demote imbedded leaves and adding IMREPn tags to demote compound repetitions.

In typical embodiments, converting the source document tree into a target document tree further comprises creating the target document tree in a form satisfying the second XML grammar and having tags containing only branches of children tags and leaves with null content; inserting into the target document tree repeating elements in dependence upon corresponding element of the source document tree, including identifying the corresponding elements from the transformation rules; and applying graphically specified transformation rules to elements of the source document tree, including generating element values and inserting the element values into the target document tree.

In typical embodiments, transforming the target document tree into the target XML document further comprises promoting imbedded leaves and compound repetitions; replacing recursions; promoting attributes, including moving attributes back inside parent element tags; replacing imbedded repetitions and sequences; and replacing alternates and options. In typical embodiments, promoting imbedded leaves and compound repetitions further comprises removing elements having imbedded leaf demotion element removing elements having compound repetition demotion element names.

In typical embodiments, replacing recursions further comprises reattaching to parent elements elements having recursion expansion names and deleting children having names identifying the children as empty children. In typical embodiments, replacing imbedded repetitions and sequences further comprises removing any remaining elements having compound repetition demotion element names. In typical embodiments, replacing alternates and options further comprises removing optional blocks with null symbol values and removing all but the first of each set of alternatives.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 13 is an additional, more detailed block diagram of the overall structure of typical exemplary embodiments of the present invention

DETAILED DESCRIPTION OF EXEMPLARY EMBODIMENTS

Introduction

Figure 1A:
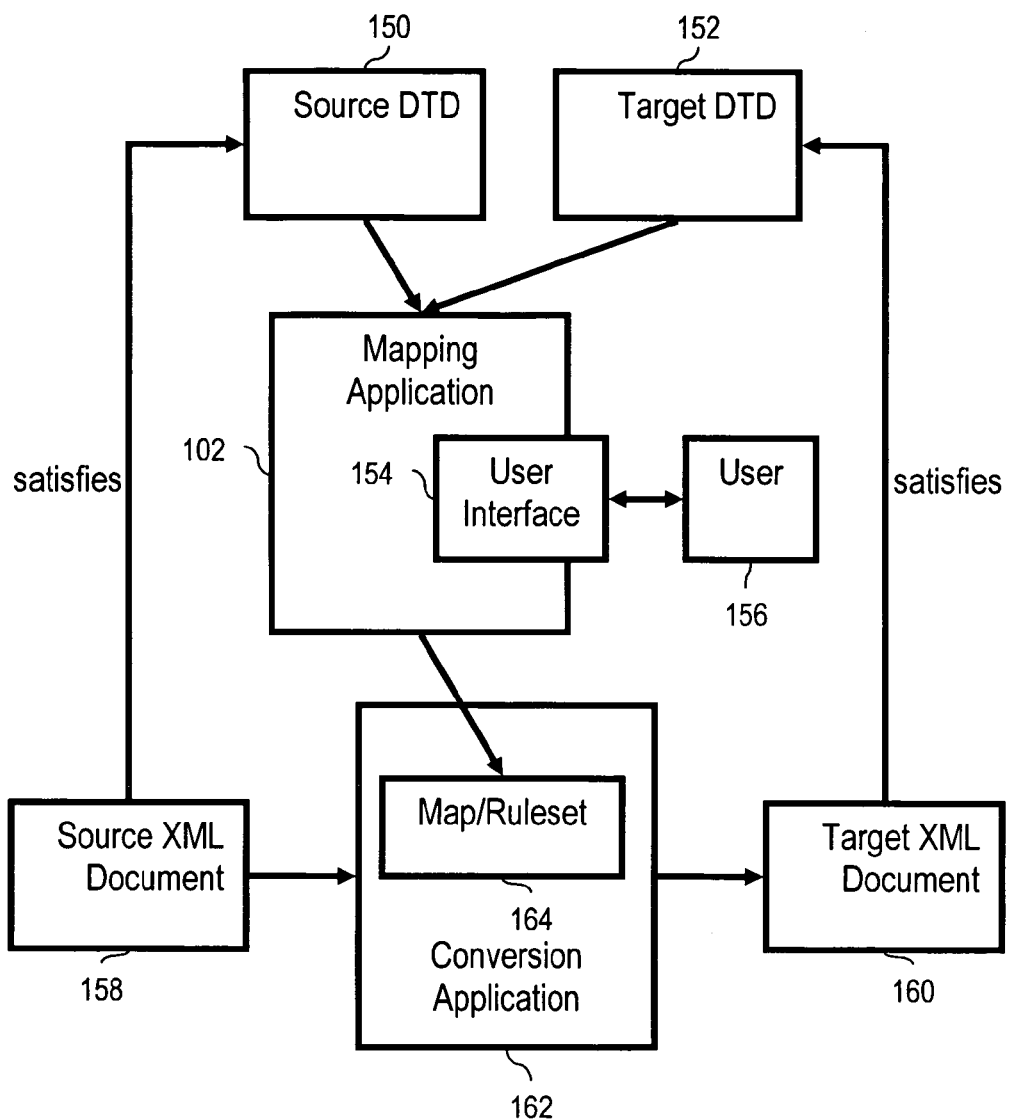
FIG. 1a is a block diagram of the overall structure of typical exemplary embodiments of the present invention.

The present invention is described to a large extent in this specification in terms of methods for conversion processing in support of XML to XML document transformation by use of graphically-specified transformation rules. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

Terms defined in the XML Recommendation are used generally in this disclosure with the same meaning ascribed to them in the XML Recommendation. Examples include "document," "element," "content," "root," "tag," "start-tag," "end-tag," "prolog," "document type definition" or "DTD," and so on.

"Alternation" and its variants refer to 'choices' or 'choice lists' within the meaning of the XML Recommendation. That is, an 'alternate' is an XML element content definition such as '(A|B),' which matches either A or B. The XML Recommendation uses both terms, 'choice' as well as 'alternation,' to refer to such definitions. The word 'choice' is in such common use with so many common meanings, however, that for clarity in this disclosure, the term 'alternation' or 'alternative' is generally preferred for such element content definitions.

"GUI" means graphical user interface.

"Name," subject to context, generally has the meaning ascribed in the XML Recommendation, that is, a token beginning with a letter or one of a few punctuation characters, and continuing with letters, digits, hyphens, underscores, colons, or full stops, together known as name characters. "Name," when used in this sense, is not always capitalized. That is, generally in this disclosure, "Name" and "name" have the same meaning.

"XML Recommendation" refers to the official specification of XML. The XML Recommendation is the specification from the World Wide Web Consortium ("W3C") entitled "Extensible Markup Language (XML) 1.0 (Second Edition)," dated Oct. 6, 2000. The XML Recommendation is well known and is readily available for reference browsing or download from the W3C website at http://www.w3.org/TR/2000/REC-xml-20001006.html.

Pseudocode Examples of Rule Development

The following examples illustrate XML documents and DTDXML DTDs. Elements in DTDs are declared hierarchically. In typical embodiments of the present invention, the hierarchical structures of elements in source DTDs and target DTDs are stored and represented in computer memory and through computer user interfaces as tree structures.

In our pseudocode examples, documents have a name, body, and DTD. The parts of a DTD are root and body. In the following examples, the line numbers are for reference and are not part of the example as such:

Example body of a DTD with root BOOK:

```
1. <!ELEMENT BOOK (TITLE,CHAPTER*)>
2. <!ELEMENT TITLE (#PCDATA)>
3. <!ELEMENT CHAPTER (TITLE,TEXT)>
4. <!ELEMENT TEXT (#PCDATA)>
```

Example body of a document named ExampleBOOK having the example DTD set forth just above:

```
1.      <BOOK>
2.      <TITLE>Exemplary Book</TITLE>
```

-continued

| | |
|---|---|
| 3. | <CHAPTER> |
| 4. | <TITLE>Chapter 1</TITLE> |
| 5. | <TEXT>This is the text of Chapter 1.</TEXT> |
| 6. | </CHAPTER> |
| 7. | <CHAPTER> |
| 8. | <TITLE>Chapter 2</TITLE> |
| 9. | <TEXT>This is the text of Chapter 2.</TEXT> |
| 10. | </CHAPTER> |
| 11. | </BOOK> |

Both documents and DTDs contain elements, document elements and DTD elements respectively. The parts of a DTD element are name, skeleton, DTDPath, and repeating. The part called 'repeating' is Boolean valued. The DTDPath is a sequence of names representing a path from the root of a tree (when the DTD is viewed as a tree or in general as a forest of trees).

The occurrence of the character string "TITLE" in line 3 of the example DTD is an example of a DTD element. In the example DTD element of line 3, the name is TITLE, the skeleton is <TITLE></TITLE>, the DTDPath is the sequence <BOOK,CHAPTER,TITLE> and the value of repeating is False. Note that there is another element in the example DTD with the name TITLE, the example in line 2. The example of line 2 has DTDPath <BOOK,TITLE>. The occurrence of the string "CHAPTER*" in line 1 of the example DTD is an example of a DTD element for which the value of repeating is True. The '*' is syntax for repeating content in a DTD element.

More particularly the '*' is XML Recommendation syntax for optional, repeating content, content that can occur zero or more times. Similarly, '+' is XML Recommendation syntax for non-optional repeating content, content that must occur at least once, but can occur one or more times. And '?' is XML Recommendation syntax for optional but non-repeating content, content that can occur zero times or once.

The parts of a document element are name, skeleton, docPath, and value. The docPath is a sequence of <name, integer> pairs. The entire character string of line 8 of the example document is an example of a document element. In the example of line 8, the name is TITLE, the skeleton is <TITLE></TITLE>, the docPath is the sequence <<BOOK,1>,<CHAPTER,2>,<TITLE, 1>>, and the value is "This is the text of Chapter 2." The entire character string of line 2 of the example document is another example of a document element.

Lines 3 through 6 of the example document are further examples of document element. The example document element in lines 3 through 6 is a chapter in a book. In this example, the chapter element has children of title and text, but the chapter itself has no value. In the example of lines 3 through 6 in the example document, the data is all at the leaves of the tree and the value of the element for the chapter is null.

The operator project converts a DocPath to a DTDPath by removing the integer from each <name,integer> pair to produce a sequence of names from the sequence of pairs. For example, project(<<BOOK,1>,<CHAPTER,2>,<TITLE, 1>>)=<BOOK,CHAPTER,TITLE>. Example a projects to example A, example b projects to example B, and example c projects to example C. We also use the operator project to produce a DTDElement from a DocElement by converting the DocPath to a DTDPath, dropping the value, and finding the appropriate value for repeating from the DTD. The operator findNext, operating on a Doc with a pair of parameters consisting of a DTDElement and a possibly null DocElement will produce a possibly null DocElement that is the next Element of the doc after the given DocElement that would project to the given DTDElement, if any (null, otherwise). The operator findNext only uses the dtdPath and docPath parts of its parameters, so we also use it with DTDPath and DocPath parameters instead of DTDElement and DocElement parameters.

The operator insertNext, operating on a Doc doc, with a DTDElement dtdElement as parameter, returns a DocElement that projects to dtdElement after inserting dtdElement.skeleton if necessary. If dtdElement.repeating is True then the DocElement returned must be a result of inserting dtdElement.skeleton., that is, it must have a null value. A pair of docElements is said to be consistent if the shared initial subsequence of their docPaths projects to a sequence that contains the shared initial subsequence of the dtdPaths of their projections as dtdElements. Examples a and b are consistent; but examples a and c are not.

The process of disambiguating references to elements is a process of turning names into DTDElements and then, at conversion time, turning DTDElements into DocElements. The user who types a name that syntactically must refer to one (or more) DocElements but might refer to different DTDElements is prompted to select a DTDPath by pointing to a tree representation of the body of the DTD. Then the user is prompted to provide a selection criterion that will allow the determination of one (or more) specific DocElements that would project to the specified DTDElement. The process is engaged recursively when the user types names while providing the selection criterion.

An Eprogram has two parts: a DTD called dtd and a set of instructions in some programming language called program, where each occurrence of a free variable in program is a Reference and each Reference has two parts: a DTDElement of dtd called dtdElement and a possibly empty Bprogram called bProgram, where a bProgram is an Eprogram and bProgram.program returns a Boolean value. A Vprogram is an Eprogram such that its program returns a character string value. Eprograms are thus hierarchical collections of programs. In an example embodiment of the invention, all DTDs in the hierarchy are identical.

A TargetDTDContext is a collection of parts including a DTD called targetDTD, a DTD called sourceDTD, a DTDPath called targetDTDPath from targetDTD.root to a leaf of targetDTD, and a possibly empty sequence of <DTDElement,DTDElement> pairs called 'association' such that the first member of a pair is a repeating DTDElement from targetDTD and the second member of a pair is either a repeating DTDElement from sourceDTD or null, and such that the first elements of the sequence form the subsequence of repeating dtdElements of targetDTDPath.

A Rule is a collection of parts including a TargetDTDContext called targetDTDContext and a Vprogram called value such that targetDTDContext.sourceDTD and value.dtd are identical.

Evaluating a Vprogram at Conversion Time

At conversion time, references in an Eprogram are evaluated hierarchically. In one example embodiment of the invention, if there is no Bprogram for a Vprogram Reference, a default Bprogram is supplied that always returns True. At conversion time, the value of the first DocElement that projects to the dtdElement of a Reference for which the Bprogram returns True is the value used in any Eprogram as the value of the Reference, In other words, Vprogram References are loaded with the first value for which their Bprograms return True, and then executed to produce a return value. For a lower level Reference (in the Eprogram hierarchy), the value loaded is that of the first DocElement that projects to the dtdElement and is consistent with all of the docElements being used for values for References above this reference in the hierarchy and for which the Bprogram returns True.

Target Ambiguous or Unambiguous, Source Ambiguous or Unambiguous

FIG. 1a is a block diagram of the overall structure of typical exemplary embodiments of the present invention. As shown in FIG. 1a, in typical embodiments, a mapping application (102) produces a map (164) in dependence upon a source DTD (150) and a target DTD (152). Mapping applications of the present invention typically build tree structures from declarations in the DTDs, display versions of the trees to a user (156), and prompt the user for various mapping choices and disambiguating information through a user interface (154). The source DTD (150) governs the structure of source XML documents (158), and the target DTD (152) governs the structure of target XML documents (160). At conversion time, a conversion application (162) creates a target XML document (160) from a source XML document (158) by use of the map (164). As the term is used in this disclosure, and particularly in the perspective of our pseudocode examples, a map is a collection of Rules. In fact, in this disclosure generally, we use the terms 'map' and 'ruleset' as effective synonyms.

Figure 1B:
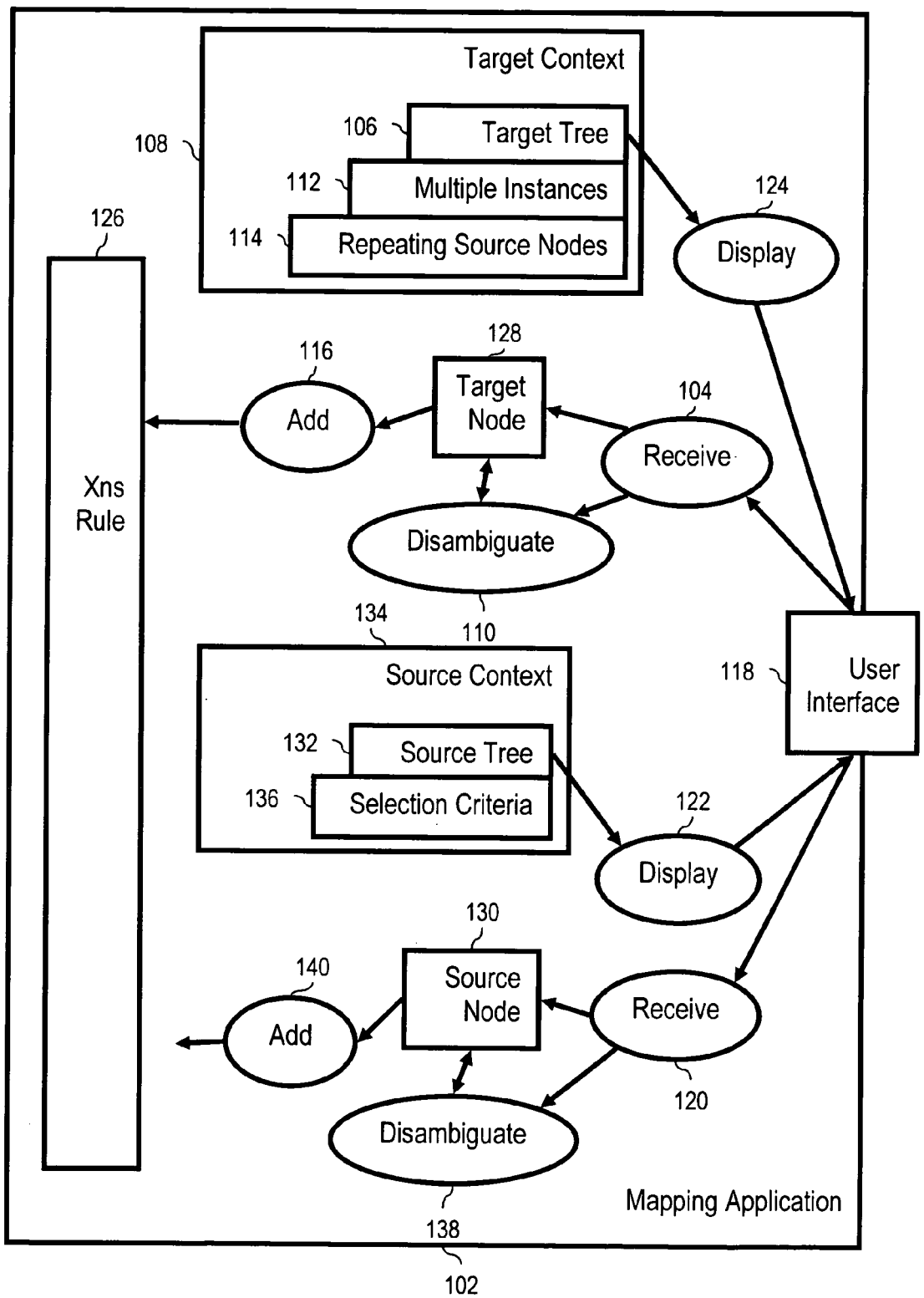
FIG. 1b is a data flow diagram illustrating structure and operation of one or more exemplary embodiments of the present invention.

Turning now to FIG. 1b, an example embodiment of the invention is seen as a method for graphical specification of an XML to XML transformation rule (126). More particularly, an example embodiment of the invention is seen as a method for graphical specification of a Rule.

Exemplary embodiments of the kind shown in FIG. 1b typically implement methods for graphical specification of XML to XML transformation rules where source and target DTDs (150 and 152 on FIG. 1a) are viewed as trees with certain nodes distinguished as repeating nodes (as the trees illustrated in FIGS. 8–12). In such embodiments, a source context consists of a source tree, a determined source subtree (that is, the subtree determined as the part of the tree that is unambiguous), and a (possibly empty) set of associations between source nodes and selection criteria (the associations comprising disambiguating data elements, including, for example, both selection criteria and programmatic applications of selection criteria). A selection criterion is a program for selecting which of potentially multiple instances of the associated XML element in an XML document is meant by a given reference. A source node is ambiguous with respect to a source context if it is not in the determined subtree and if it is either a repeating node not associated with a selection criterion or a descendent of such a node.

In such embodiments, a target context consists of a target tree and a single path (possibly empty) from the root of the tree to some repeating node together with an association for each repeating node on the path, the association either connecting the repeating node to an indication that a single instance is desired or to an indication that multiple instances are desired plus reference to a repeating source node in a source context in which the ancestor of the source node, if any, is unambiguous. A target node is unambiguous with respect to a target context if the context path includes every repeating node on the path between the root and the node (including both root and other nodes).

In exemplary embodiments of the invention an XML document satisfying a DTD is viewed as a tree wherein nodes corresponding to repeating nodes in the DTD may occur multiply, a specific node of an XML document tree corresponding to a second specific node of a DTD tree if the ordered list of names of nodes on the path from the root to the specific node (including the specific node) is identical to the ordered list of names of nodes on the path from the root to the second specific node. With respect to a satisfied DTD, the selection of a specific node in a satisfying XML document is said to determine (the selection of) all nodes in the XML document from which there is possibly empty first path, involving no nodes that correspond to repeating nodes in the DTD, to a node that lies on the path from the root to the specific node. With respect to a satisfied source DTD and a source context, the selection of a specific node in a satisfying XML document is said to recursively determine (the selection of) all nodes in the XML document from which there is a possibly empty first path, involving nodes that are unambiguous with respect to the source context, to a node that lies on the path from the root to the specific node.

In exemplary embodiments of the invention a user-specified selection criterion associated with a user-selected source node in a source context is a program referencing source tree nodes that are unambiguous with respect to the context and returning a Boolean value. In a source document satisfying the source DTD, the user-specified selection criterion designates at most one instance of the XML element corresponding to the associated user-selected source tree node, the designated instance being the first such instance encountered in a left-to-right pass through the source document for which the program returns the value True, when each of its references to a source tree node is replaced by the value, if any, for the corresponding node in the source XML document that is recursively determined by the said designated instance.

Graphical specification means that the user is presented through a user interface with a graphical representation in the form of a tree structure of the governed relations among elements in XML documents and prompted to select a target element to which source elements are to be mapped and source elements to map to the selected target element. To the extent that selected elements are ambiguous, the user is prompted to enter selection criteria, logical relations among variables, sufficient to disambiguate selected elements. To the extent that the selection criteria refer to additional ambiguous elements, the same disambiguation process is applied recursively until all such elements are disambiguated. To the extent that more than one source element is selected for mapping to a target element, the user is prompted to enter operators for combining the source elements, counting, adding, concatenating, and so on.

More particularly, in the perspective of our pseudocode examples above, the user is prompted to select a target DTDElement from a graphical representation of a target DTD. Having chosen a target DTDElement for which execution of the Rule is to provide a value, the user is prompted to enter the program part of a Vprogram and to create References to source DTDElements by selecting them from a graphical representation of a source DTD.

To the extent that multiple combinatorial source elements are ambiguous, they too are recursively disambiguated. This process is repeated until all elements to be mapped are mapped.

Mapping applications (102) of the present invention are computer programs that assemble, into source code files or other mapping technologies, transformation rules comprising user selected target and source elements, selection criteria, and operations on multiple combinatorial source elements. A transformation rule is implemented in any program in any programming language or other mapping technologies for the purpose of composing one, possibly repeating, target leaf node from source leaf nodes. Computer programming languages useful to implement transformation rules of the present invention include C, C++, Java, Visual Basic, Cobol, Fortran, and other languages as will occur to those of skill in the art. The programming language in some embodiments, at least, comprises a very restricted set of operators on character strings or a complete general purpose language.

Users' selections of target elements and source elements along with disambiguating selection criteria and operators combining multiple source elements comprise translation rules. For example, in a translation application created from a mapping application of the present invention the source XML document is parsed and a dummy target XML document with all null values is prepared. Then one-by-one the translation rules are executed. In the perspective of our example pseudocode, an example translation rule to place the value for the first DocElement that projects to a DTDElement VendorName from the source document in the value for a next leaf DocElement in the target document that projects to a repeating DTDElement CustomerName operates like this:

```
DocElement element = sourceXMLDocument.findNext
(VendorName,null);
DocElement target = targetXMLDocument.insertNext(CustomerName);
target.value = element.value;
```

In a trivial case, a user maps a constant to a target leaf node, thus effectively mapping 'zero' source leaf nodes. Embodiments are more useful, however, in mapping at least one source node to a target node, particularly when either the target node or the source node, or both, are ambiguous either because a mapped node is itself repeating or because a mapped node has one or more repeating ancestors.

A node is spoken of in this disclosure as being 'repeating' if it represents an element declared in a DTD as repeating, in our pseudocode terminology, a 'DTDElement.' The nodes themselves of course are merely branches and leaves in tree-type data structures and therefore do not literally themselves 'repeat.' 'Repeating nodes' are nodes that represent repeating elements, and repeating elements do 'repeat' in the sense that they are authorized through their DTD declarations to occur more than once in conforming XML documents.

The declaration form

<!ELEMENT element-name (child-name)> declares only one occurrence of a child element, such that the example declaration <!ELEMENT note (message)> declares the child element 'message' can occur only once inside the 'note' element. Because elements declared in DTDs by such declarations can occur only once in a context, such elements are not considered repeating elements, and nodes representing such elements are not considered repeating nodes.

The declaration form

<!ELEMENT element-name (child-name+)> however, is used to declare that a child element must occur at least once and may occur more than once, such that the example declaration <!ELEMENT note (message+)> declares that the child element 'message' must occur one or more times in the 'note' element. Similarly, the form of declaration <!ELEMENT element-name (child-name*)> declares that a child element can occur zero or more times in an ancestor element, such that the example declaration <!ELEMENT note (message*)> declares that the 'message' child element can occur in the 'note' element zero or more times. Nodes representing elements declared with '+' or '*,' that is, repeating elements, are considered 'repeating nodes,' because the repeating elements so represented can occur more than once in XML documents that comply with DTDs in which the repeating elements are declared.

Embodiments according to FIG. 1b typically include receiving (104) a user's selection of a user-selected, optionally ambiguous, target leaf node (128), from a target tree (106) of an initial target context (108), the target leaf node (128) representing a target XML element to be mapped by the transformation rule (126).

As mentioned earlier, relations among XML elements in DTDs are declared, and therefore structured, hierarchically. This inherent hierarchy lends itself well to representation in tree-style data structures in computer memory and in computer displays, and such structures are used in typical embodiments of the present invention. Although we refer to such structures for convenience in this disclosure as 'trees,' in fact there is no requirement in the present invention for any particular kind of tree structure. Any kind of hierarchical representation will do, indexed, linked lists, standard library container objects, and so on, as will occur to those of skill in the art.

Trees, both target trees and source trees, as stored in computer memory and as displayed through user interfaces are components of a context. Contexts are data structures that include an instance of a tree, indication of ambiguity for each leaf node in the tree, and a collection of disambiguating data elements whose application results in the present state of ambiguity of the tree in the context. An initial target context (108), contains only a tree representing the elements and relations among elements defined in a DTD and indications of ambiguity for each leaf node in the tree. An initial target context contains no disambiguating data elements because none of the ambiguous leaves, if there are any, has yet been disambiguated. Disambiguating data elements include, as will be discussed in more detail below, indications whether repeating target nodes require multiple instances, references to repeating source nodes for repeating target nodes requiring multiple instances, and selection criteria for ambiguous source nodes.

Note that generally, and particularly in the perspective of our pseudocode examples, context is implicit in a Rule. For example, in the prospective of our pseudocode examples, the hierarchical context of selection criteria for ambiguous source nodes is represented by the Vprogram of the Rule in the hierarchy of References and Bprograms.

Embodiments of the kind shown in FIG. 1b typically include receiving (104) a user's selection of a target leaf node (128). Receiving a selection of a target leaf node in such embodiments typically includes scanning through a target DTD and registering in a tree-style data structure the elements declared in the target DTD. The 'target DTD' is a target DTD in the sense that it describes elements, attributes of elements, and relations among elements that a target XML document must comply with. In typical embodiments of the present invention, the elements available for mapping into a target XML document are known because they are the elements declared in a target DTD, scanned into a tree structure and displayed through a user interface, such as a windowing GUI, for selection by a user. Selection is carried out by normal operations of a user interface, including, for example, mouseclick selections, tab key and enter key selections, and so on.

The selected target leaf node is ambiguous if it is itself a repeating node or if it has one or more ancestor nodes that are repeating nodes. If the target leaf node (128) is ambiguous, typical embodiments include disambiguating (110) the target leaf node (128). Disambiguating target leaf nodes is described in detail below.

Typical embodiments of the kind shown in FIG. 1b include adding (116) the (now unambiguous) target leaf node (128) to the transformation rule (126). Typical embodiments also include receiving (120) a user's selection of at least one user-selected, optionally ambiguous, source leaf node (130), from a source tree (132) of an initial source context (134), wherein the source leaf node (130) represents a source XML element to be mapped to the target leaf node by the transformation rule (126).

The user selects "at least one" source leaf node. For brevity and clarity, this disclosure generally speaks of mapping a singular source node to a target node, but there is nothing in the invention itself that limits mappings to a target node to a single source node. Embodiments of the present invention typically support selection of several source nodes to map to one target node and also support specification of operations to be performed on the source nodes to develop a value for insertion into a target node. In fact, it is common for more than one source node to be selected for mapping to a target node, including, for example, adding the values of several source nodes to place a sum in a target node, counting occurrences of source nodes and mapping a total into a target node, concatenating several source nodes into a single target node, and so on. Moreover, recursive disambiguation of the present invention works the same regardless of the number of ambiguous source nodes to be mapped to a target node. Persons of skill in the art will think of many uses for mapping more than one source node to a target node, and all such uses are well within the scope of the present invention.

More particularly, in the perspective of our pseudocode examples, the selection of a source node to map to the selected target node creates a Reference in the Vprogram part of the Rule being specified. The selected source leaf node is ambiguous if it is a repeating DTDElement or has a repeating ancestor in the source DTD. If the source leaf node is ambiguous, typical embodiments include disambiguating (138) the source leaf node (130). Typical embodiments also typically include adding (140) the (now unambiguous) user-selected source leaf node (130) to the transformation rule (126).

Target Unambiguous, Source Ambiguous

Figure 2:
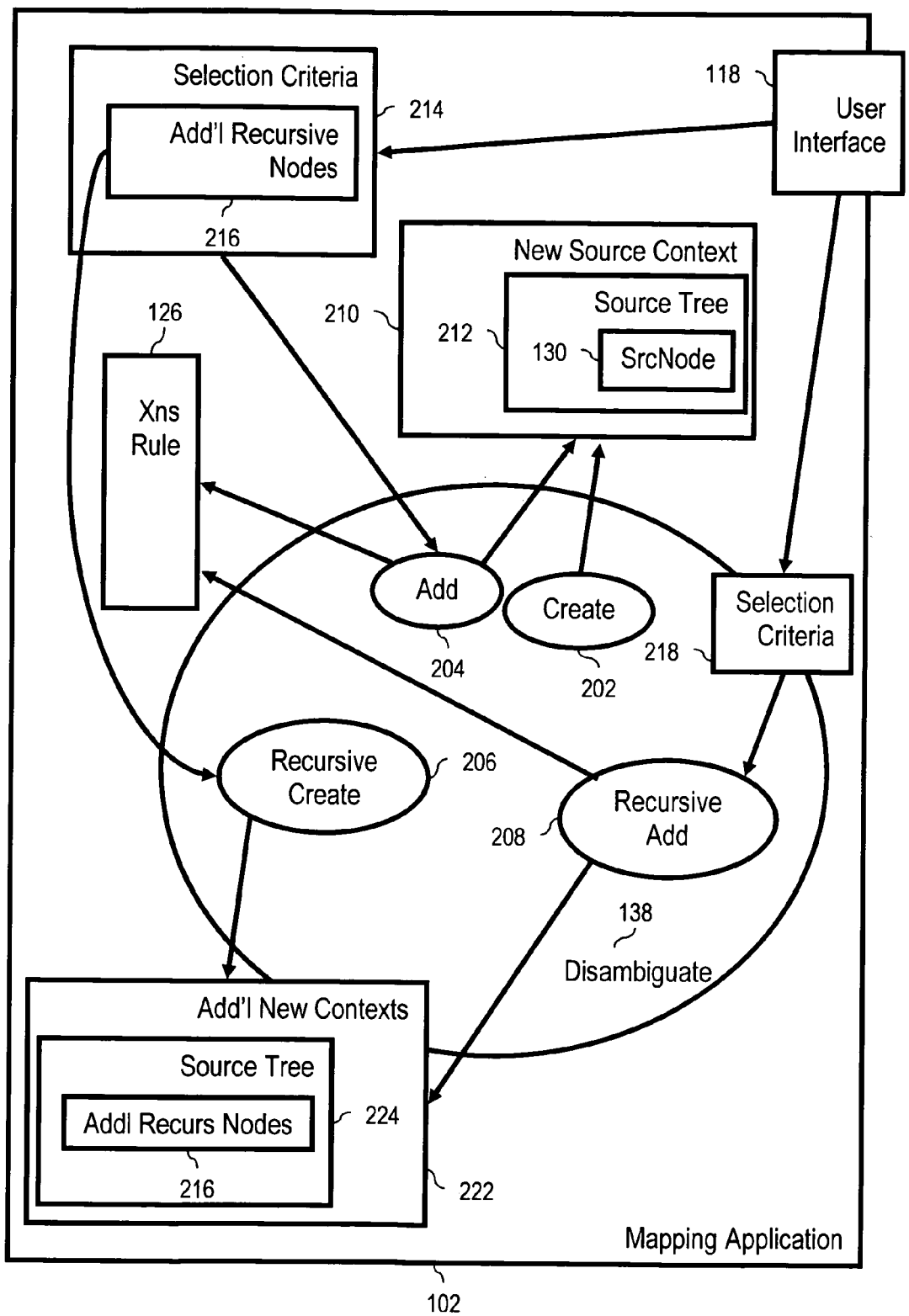
FIG. 2 is a data flow diagram illustrating structure and operation of one or more exemplary embodiments of the present invention.

Turning now to FIG. 2, a further embodiment of the invention is shown in which a selected source leaf node (130) is ambiguous. In such embodiments, disambiguating (138) the source leaf node typically includes creating (202) a new source context (210) for the selected source leaf node (130).

Embodiments of the kind shown in FIG. 2 typically include adding (204) to the new source context and to the transformation rule (126) a user-specified selection criterion (214) for the first source node (130), wherein the selection criterion (214) for the first source node optionally recursively includes one or more additional ambiguous source nodes (216). More particularly, the selection criterion (214) optionally recursively includes one or more additional ambiguous source nodes (216) in the sense that the selection criterion often comprises references to addition source nodes, which may or may not themselves be ambiguous, as well as logical operations upon the additional source nodes.

Embodiments of the kind shown in FIG. 2 typically include recursively creating (206) additional new contexts (222) for the additional ambiguous source nodes (216). Such embodiments typically include recursively adding (208) to the additional new contexts (222) and to the transformation rule (126) user-specified selection criteria (218) for the additional ambiguous source nodes (216).

Still more particularly, in the perspective of our pseudocode examples, when a user adds a new Reference r to the vProgram of a Rule and the Reference r is ambiguous, the user is prompted to add a Bprogram to r. If the new Bprogram includes an ambiguous reference s, the user is recursively prompted to add a Bprogram to s. A Reference r in a (hierarchical) Eprogram is ambiguous if the DTDPath from its dtdElement to the root contains a repeating DTDElement e such that e is not contained in any path from s.dtdElement to root for any Reference s that is either r or an ancestor to r in the Eprogram hierarchy. The Eprogram hierarchy encodes the context.

Figure 3:
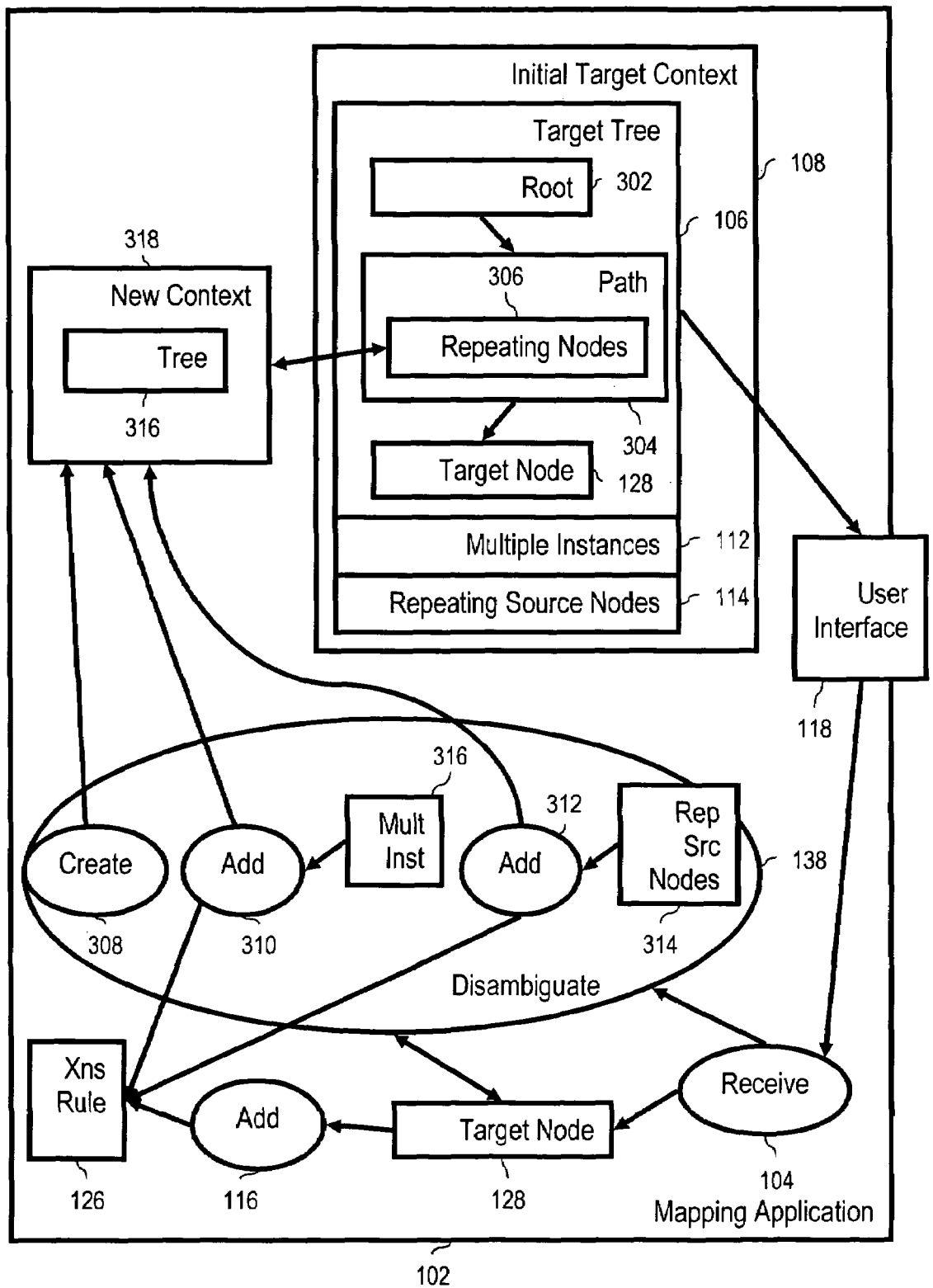
FIG. 3 is a data flow diagram illustrating structure and operation of one or more exemplary embodiments of the present invention.

Target Ambiguous, Source Unambiguous Target Ambiguous Because Target Leaf Has Repeating Ancestors Create A New Context Turning now to FIG. 3, a further embodiment of the present invention is shown in which a target leaf node (128) is ambiguous, and the example embodiment includes receiving (104) a user's selection of the target leaf node. In the illustrated example, receiving a user selection of the target leaf node includes receiving a user's selection of the target leaf node (128), from a target tree (106) of an initial target context (108), the target leaf node (128) representing a target XML element to be mapped by the transformation rule (126). The target tree has a root (302) and a path (304) from the root (302) to the target leaf node (128). In this exemplary embodiment, the path excludes the target leaf node itself, and the path includes one or more repeating nodes (306). It is the presence of these repeating nodes in the path above the target leaf, that is, one or more repeating ancestor nodes, that makes the target leaf note ambiguous.

Embodiments of the kind shown in FIG. 3 typically include disambiguating (138) the target leaf node. Disambiguating the target leaf node typically includes creating (308) a new context (318) for each repeating node (306) in the tree path (304) between the root (302) and the target leaf node (128).

Embodiments of the kind shown in FIG. 3 typically also include adding (310), to each new context (318) and to the transformation rule (126), for each repeating node (306) in the tree path (304) between the root (302) and the target leaf node (128), a user-specified indication (316) whether each such repeating node represents an XML element mapped with multiple instances. In embodiments of this kind, it is an indication that a repeating node is mapped with a single instance of the element it represents that disambiguates target leaf nodes not requiring multiple instances.

Embodiments of the kind shown in FIG. 3 typically also include adding (312), to each new context (318) and to the transformation rule (126), a user-selected repeating source node (314) for each repeating target node (306) in the tree path (304) between the root (302) and the target leaf node (128) that represents an XML element mapped with multiple instances. In embodiments of this kind, it is an identification the addition of a repeating source node for a repeating target ancestor node mapped with multiple instances that disambiguates repeating target ancestor nodes requiring multiple instances.

More particularly, in the perspective of our pseudocode examples, when a user selects a target DTDElement t as the target of a Rule and the selection is ambiguous because there is at least one repeating DTDElement on the path from root to t, the user is prompted to create a TargetDTDContext with targetDTDPath, the path from root to x, where x is the first repeating ancestor of t or t if t is repeating, or to select an already existing TargetDTDContext with targetDTDPath from root to the first repeating ancestor of t. A new TargetDTDContext may be created by selecting a previous TargetDTDContext and extending its path.

Figure 4:
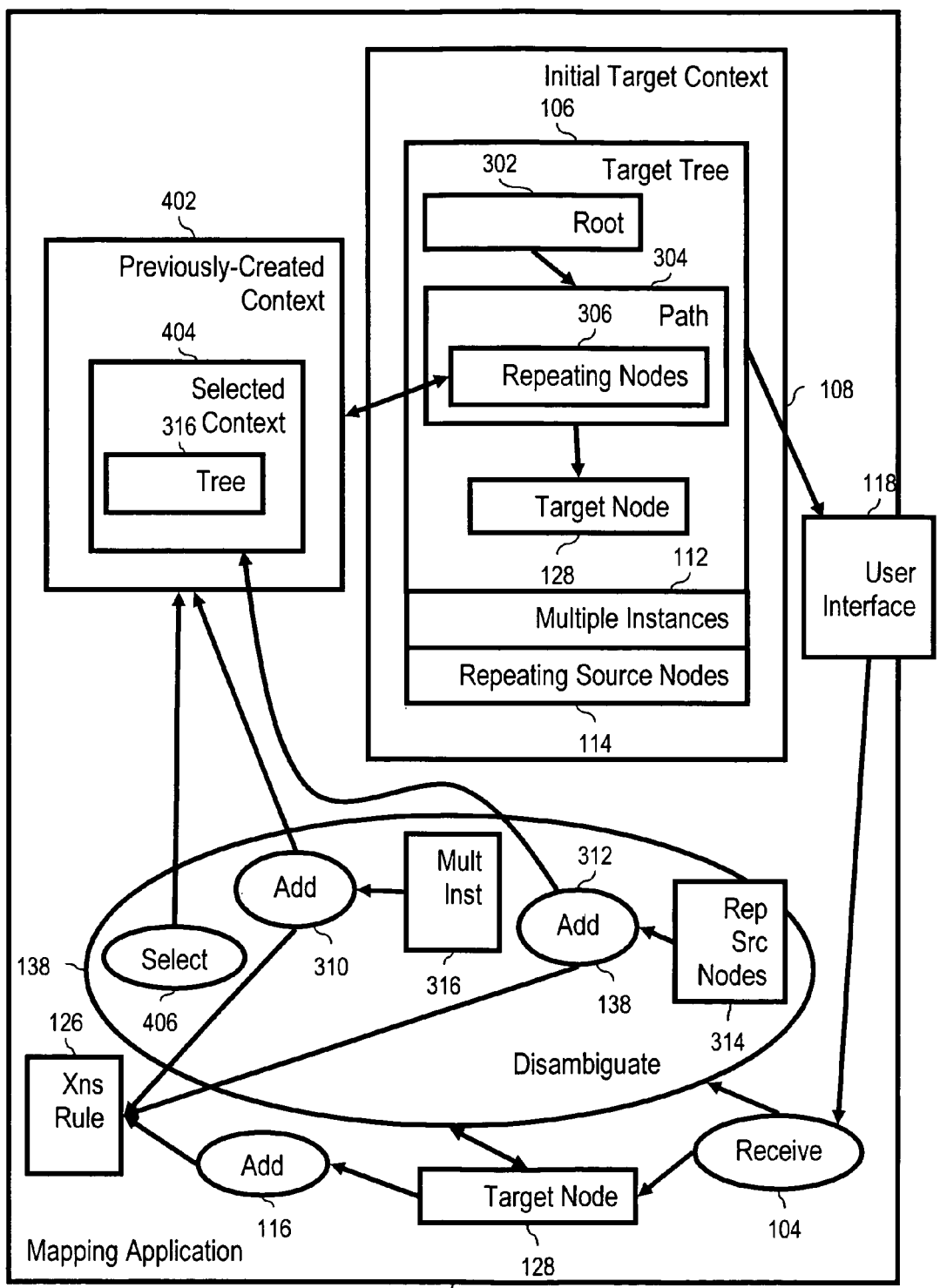
FIG. 4 is a data flow diagram illustrating structure and operation of one or more exemplary embodiments of the present invention.

Target Ambiguous, Source Unambiguous Target Ambiguous Because Target Leaf Has Repeating Ancestors Select Existing Target Context Rather Than Creating a New One Turning now to FIG. 4, a further embodiment of the invention is shown in which a target leaf node (128) is ambiguous, and receiving (104) a user's selection of the target leaf node further comprises receiving a user's selection of the target leaf node (128), from a target tree (106) of an initial target context (108). In this example, the target leaf node (128) represents a target XML element to be mapped by the transformation rule (126). The target tree has a root (302), and the target leaf node has a path (304) from the root (302) to the target leaf node (128). Again in this example the path excludes excluding the target leaf node itself, and the path includes one or more repeating nodes (306) that render the target leaf node ambiguous.

Embodiments according to FIG. 4 typically include disambiguating (138) the target leaf node. Disambiguating the target leaf node in such embodiments typically includes selecting (406), from among previously-created contexts (402), a selected context (404) for at least one repeating node (306) in the tree path (304) between the root (302) and the target leaf node (128).

Embodiments of the kind shown in FIG. 4 typically include adding (310), to each selected context (404) and to the transformation rule (126), for the at least one repeating node (306) in the tree path (304) between the root (302) and the target leaf node (128), a user-specified indication (316) whether each such repeating node represents an XML element mapped with multiple instances. For repeating target leaf nodes not requiring mappings of multiple instances, it is an indication that such a repeating node is not to be mapped with multiple instances that disambiguates the node.

In embodiments of the kind shown in FIG. 4, if the at least one repeating node (306) represents an XML element mapped with multiple instances, then such embodiments typically include adding (312), to each selected context (404) and to the transformation rule (126), a user-selected repeating source node (314) for the at least one repeating node (306). For such repeating ancestor nodes, it is the addition of a corresponding repeating source node that disambiguates a repeating ancestor target node.

Figure 5:
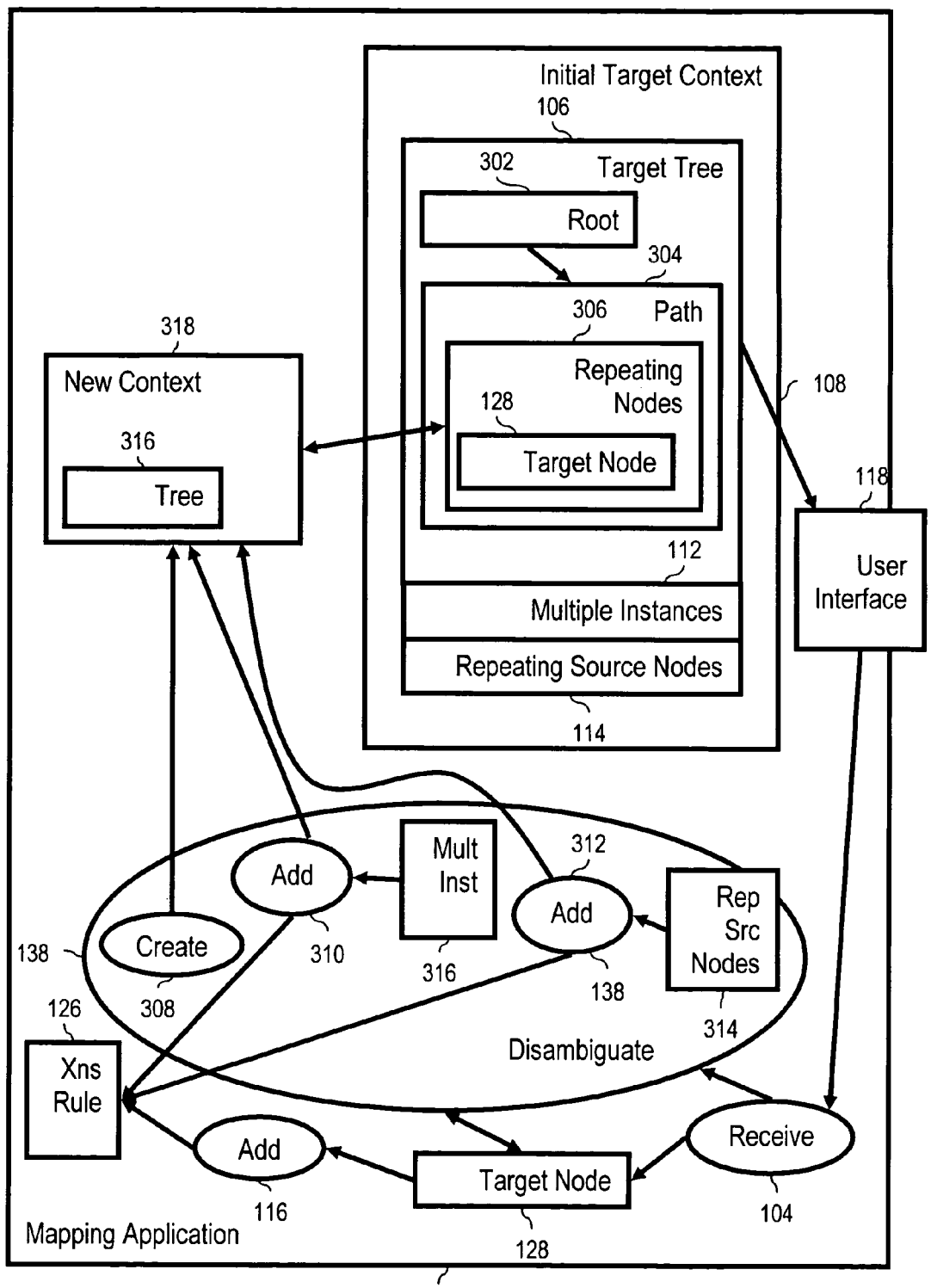
FIG. 5 is a data flow diagram illustrating structure and operation of one or more exemplary embodiments of the present invention.

Target Ambiguous, Source Unambiguous Target Ambiguous Because Target Leaf Itself is Ambiguous, with or without Repeating Ancestors Create New Target Context Turning now to FIG. 5, a further embodiment of the present invention is seen as a method for graphical specification of an XML to XML transformation rule (126). Embodiments according to FIG. 5 typically include receiving (104) a user's selection of a user-selected, ambiguous, target leaf node (128), from a target tree (106) of an initial target context (108), the target leaf node (128) representing a target XML element to be mapped by the transformation rule (126). The target tree has a root (302), and the target leaf node (128) has a path (304) from the root (302) to the target leaf node (128). In this kind of embodiment, the path (304) includes the target leaf node itself (128). The path, including the target leaf node, includes one or more repeating nodes (306), thus making the target leaf node ambiguous. In this kind of embodiment, therefore, the target leaf node is sometimes ambiguous because only the target leaf node itself is repeating, sometimes ambiguous because the target leaf node is repeating and has repeating ancestors, sometimes ambiguous merely because of one or more repeating ancestors.

Embodiments of the kind shown in FIG. 5 typically include disambiguating (138) the target leaf node (128) and adding (116) the (now unambiguous) target leaf node (128) to the transformation rule (126). In such embodiments, disambiguating (138) the target leaf node (128) typically includes creating (308) a new context (318) for each repeating node (306) in the tree path (304) between the root (302) and the target leaf node (128).

Embodiments of the kind shown in FIG. 5 typically include adding (310), to each new context (318) and to the transformation rule (126), for each repeating node (306) in the tree path (304) between the root (302) and the target leaf node (128), a user-specified indication (316) whether each such repeating node represents an XML element mapped with multiple instances. In such embodiments, it is an indication that a repeating node is not to be mapped with multiple instances that disambiguates the repeating target node.

Embodiments of the kind shown in FIG. 5 typically include adding (312), to each new context (318) and to the transformation rule (126), a user-selected repeating source node (314) for each repeating node (306) in the tree path (304) between the root (302) and the target leaf node (128) that represents an XML element mapped with multiple instances. For repeating target nodes requiring multiple instances in this kind of embodiment, it is the addition of an associated repeating source node that disambiguates the repeating target node.

Figure 6:
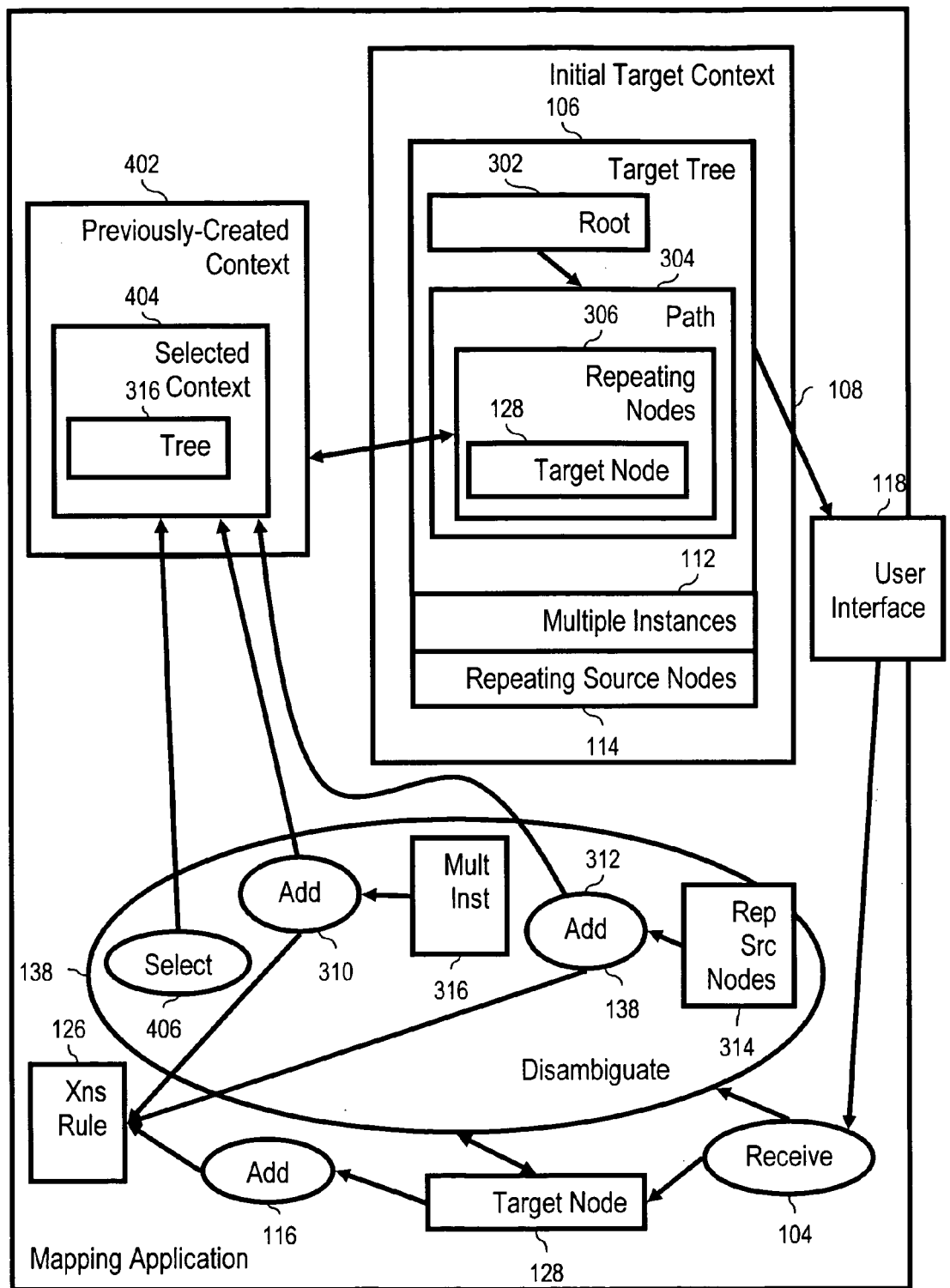
FIG. 6 is a data flow diagram illustrating structure and operation of one or more exemplary embodiments of the present invention.

Target Ambiguous, Source Unambiguous Target
Amhiguous Because Target Leaf Itself is
Ambiguous, with or without Repeating Ancestors
Select Existing Target Context Rather than Creating
a New One Turning now to FIG. 6, a further example embodiment of the present invention is shown in which disambiguating an ambiguous target leaf node includes selecting (406), from among previously-created contexts (402), a selected context (404) for at least one repeating node (306) in the tree path (304) between the root (302) and the target leaf node (128). Such embodiments typically include adding (310), to the selected context (404) and to the transformation rule (126), for the at least one repeating node (306) in the tree path (304) between the root (302) and the target leaf node (128), a user-specified indication (316) whether each such repeating node represents an XML element mapped with multiple instances. For repeating target nodes not requiring multiple instances, it is an indication that the node does not require multiple instances that disambiguates the node.

Embodiments of the kind shown in FIG. 6, if the at least one repeating node (306) represents an XML element mapped with multiple instances, typically include adding (312), to the selected context (404) and to the transformation rule (126), a user-selected repeating source node (314) for the at least one repeating node (306). For repeating target nodes requiring multiple instances, it is the addition of an associated repeating source node that disambiguates the repeating target node.

Target Ambiguous, Source Ambiguous

Figure 7:
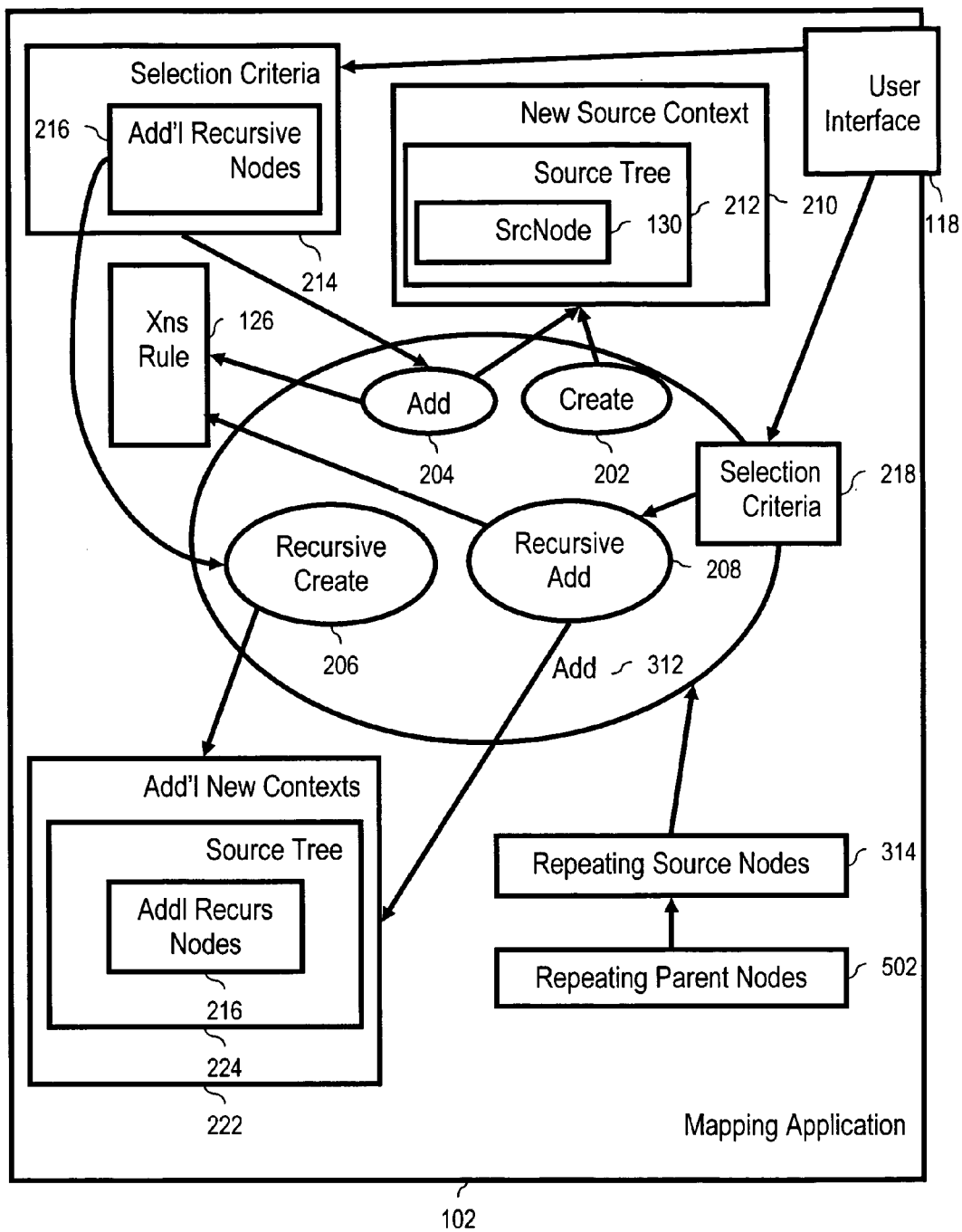
FIG. 7 is a data flow diagram illustrating structure and operation of one or more exemplary embodiments of the present invention.

Turning now to FIG. 7, a further example embodiment of the present invention is shown in which at least one user-selected repeating source node (314) is an ambiguous repeating source node having at least one repeating ancestor node (502). In such embodiments, adding (312) a user-selected repeating source node for each repeating node in the tree path typically includes creating (202) a new source context (210) for the selected source leaf node (130). In such embodiments, adding (312) a user-selected repeating source node for each repeating node in the tree path typically includes adding (204), to the new source context (210) and to the transformation rule (126), a user-specified selection criterion (214) for the first source node, wherein the selection criterion (214) for the first source node optionally recursively includes one or more additional ambiguous source nodes (216). More particularly, the selection criterion (214) optionally recursively includes one or more additional ambiguous source nodes (216) in the sense that the selection criterion often comprises references to addition source nodes, which may or may not themselves be ambiguous, as well as logical operations upon the additional source nodes.

In embodiments of the kind shown in FIG. 7, adding (312) a user-selected repeating source node for each repeating node in the tree path typically includes recursively creating (206) additional new contexts (222) for the additional ambiguous source nodes (216). In such embodiments, adding (312) a user-selected repeating source node for each repeating node in the tree path typically includes recursively adding (208), to the additional new contexts (222) and to the transformation rule (126), user-specified selection criteria (218) for the additional ambiguous source nodes (216).

Exemplary Embodiments in Usage

Figure 8:
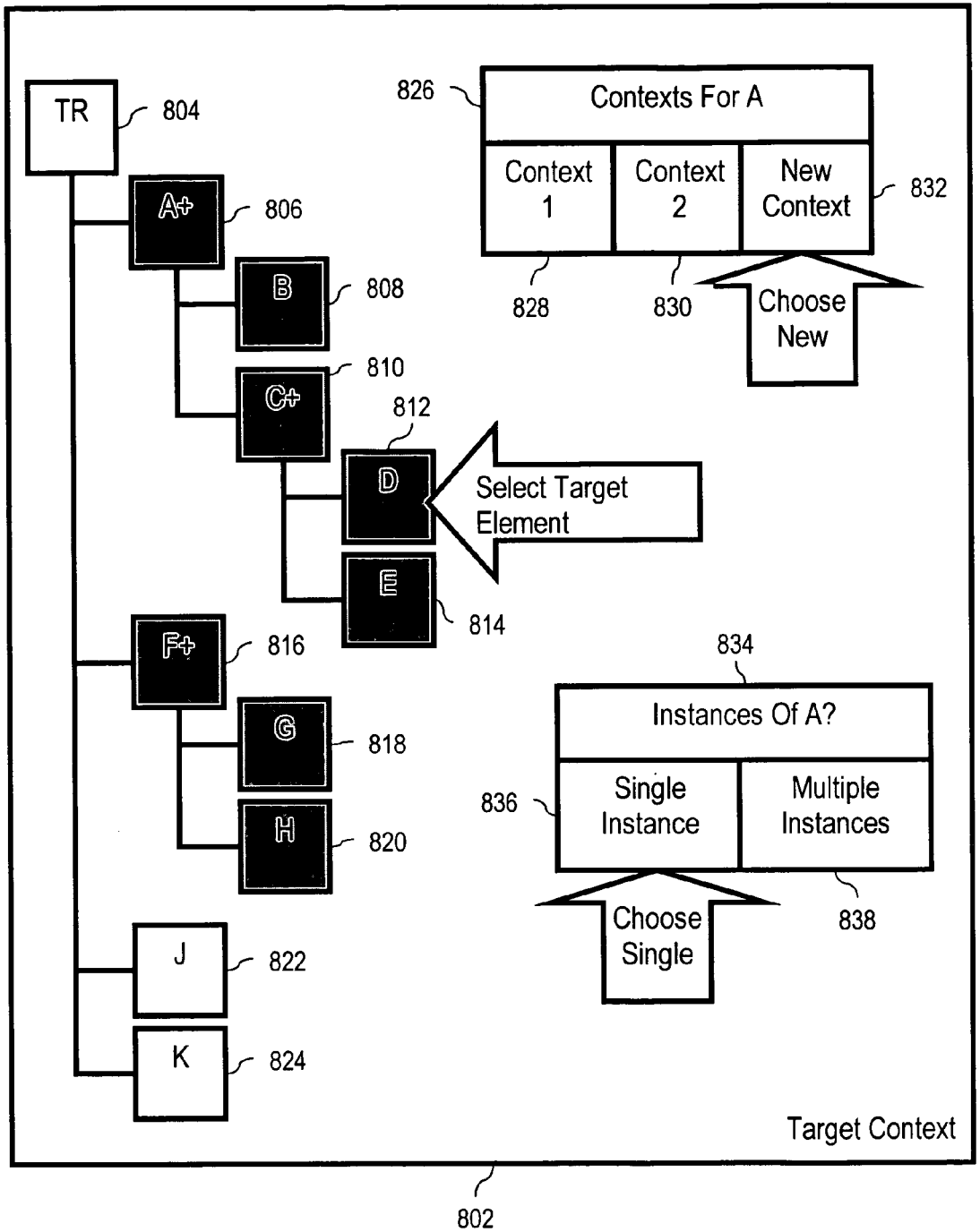
FIG. 8 illustrates a target context of a selected target element D for an exemplary use case.

FIGS. 8–12 illustrate a large running example of an exemplary embodiment of the present invention in operation. FIG. 8 illustrates an initial target context (802) of a selected target element D (812). In the initial context, of course, there is no disambiguating data as yet because no steps have yet been taken to disambiguate element D. Ambiguous nodes in FIGS. 8–12 are indicated by gray backgrounds. In the initial context, nodes A (806), C (810), and F (816) are ambiguous because they represent repeating elements from a target DTD. Their repeating quality is identified by plus signs next to the element names in the node boxes. Nodes B (808), D(812), E(814), G (818), and H (820) are ambiguous because they have repeating ancestor nodes above them in the tree structure.

Element D in the embodiment of FIG. 8 has already been scanned by a mapping application, along with other elements from a target DTD, into a tree structure illustrated in FIG. 8 as including nodes (804–824). The tree structure of FIG. 8 is displayed to a user through a computer user interface in substantially the same format as shown in FIG. 8. The user selects element D for mapping by normal interface operations, such as, for example, in a GUI, a mouseclick on node D (812).

In response to a user's selection of target element D for mapping, the mapping application is programmed to prompt the user to select an existing context for element A (826), if there are any previously-created contexts for element A, or to opt to create a new context for element A. Element D is ambiguous in the initial context because it has two repeating ancestors, elements A (806) and C (810), both indicated as repeating by plus signs. Element A is the first subject of disambiguation because element A is the highest repeating node in the tree above D. In this example, there are two previously-created contexts for A (828, 830), but the user chooses to create a new context (832).

In response to the user's opting to create a new context, the mapping application of the present example is programmed to prompt the user for an indication (834) whether repeating element A is to be mapped with a single instance or multiple instances. As explained above, if the user opts to map A with multiple instances, the mapping application is programmed to prompt for a selection of a repeating source node to supply multiple instances. In this example, however, the user opts to map a single instance (836) of A.

Figure 9:
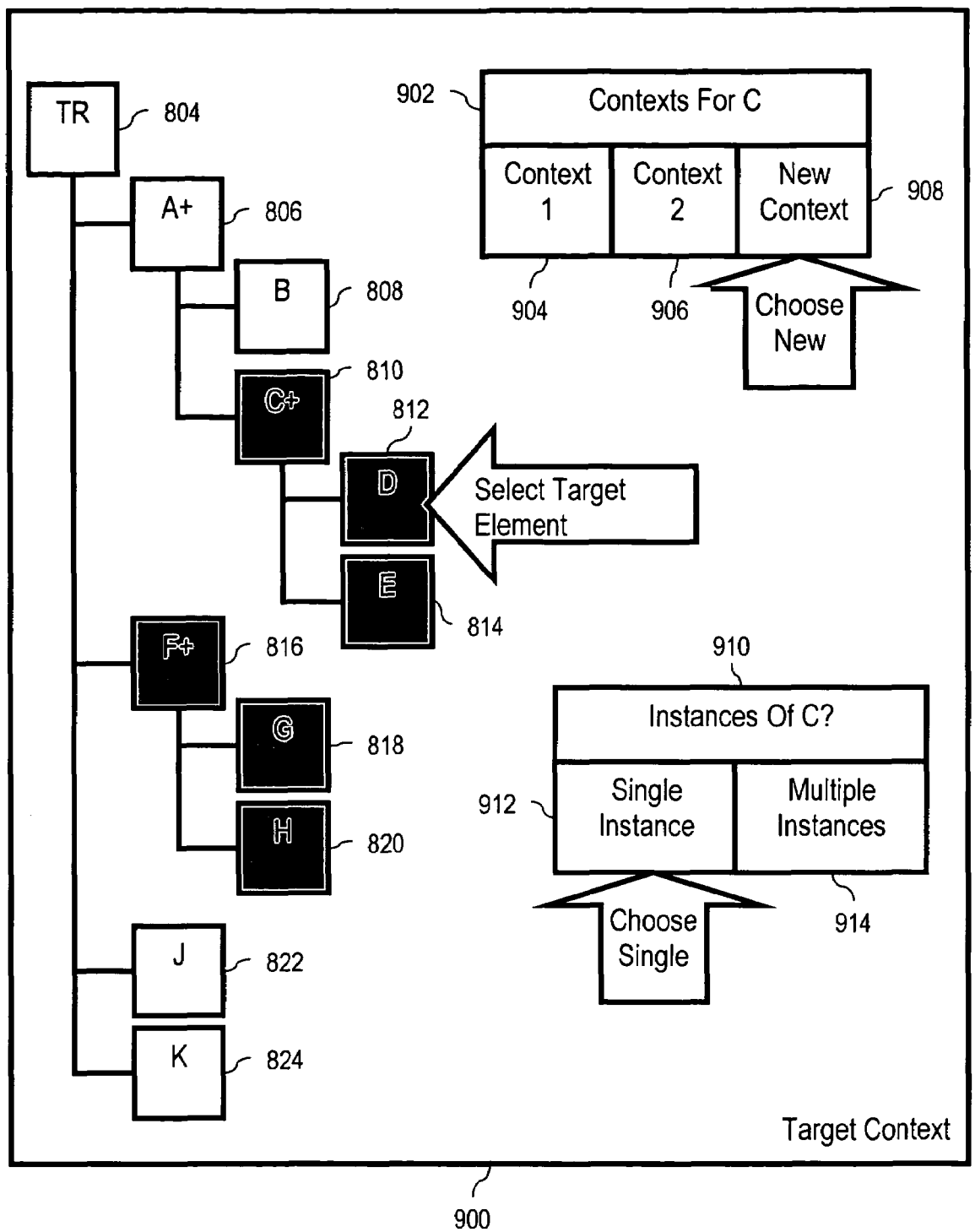
FIG. 9 shows the ambiguity status of the subject tree in a target context after disambiguation of repeating element A in an exemplary use case.

FIG. 9 shows the ambiguity status of the subject tree after disambiguation of repeating element A. In this new context (900), element D is still ambiguous because element D still has an ambiguous ancestor node above it in the tree, that is node C (810). Recursive disambiguation continues. The user again selects element D as a target for mapping, and, because element D still has a repeating ancestor in node C, the mapping application is programmed to prompt the user to select or create a context for C (902). In this example, the user opts to create a new context for C (908). In response, the mapping application is then programmed to prompt for an indication whether C is mapped with a single instance or multiple instances, and again in this example, the user maps element C with a single instance.

Figure 10:
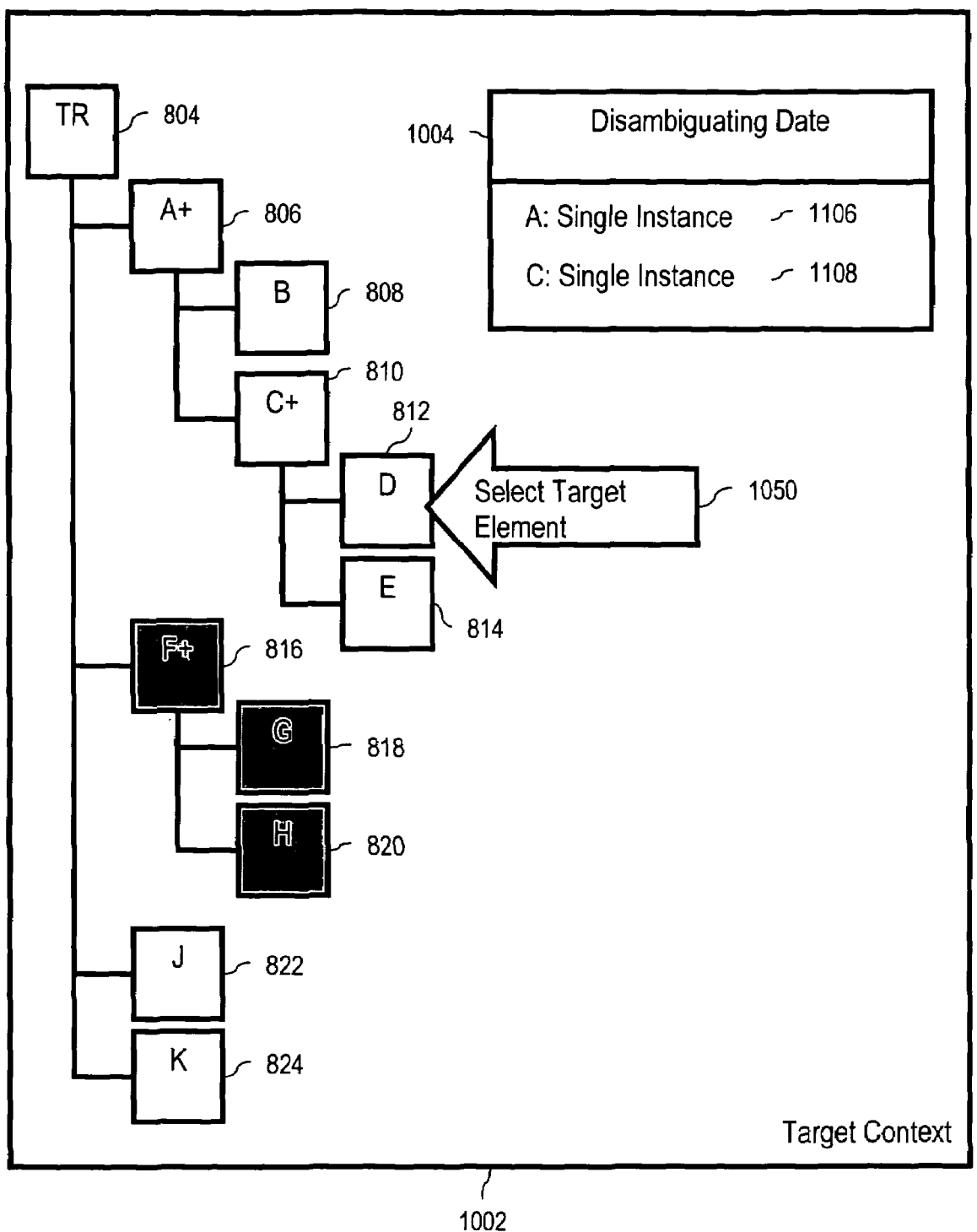
FIG. 10 illustrates a disambiguated status of a target context in an exemplary use case.

FIG. 10 shows a context for D in which D is fully unambiguous. The context in which node D is unambiguous (1002) includes the tree structure (804–824) with indications of ambiguity (gray backgrounds as appropriate) plus the disambiguating data elements, indications that repeating ancestors A and C are to be mapped with single instances (1106, 1108). The indications of ambiguity as gray backgrounds, of course, are for display rather than actual data storage. In an actual data structure in computer memory, ambiguity is represented by a Boolean value, a code in a memory variable, or in other ways as will occur to those of skill in the art, rather than the color gray. Now that D (812) is unambiguous, this time when the user again recursively selects D for mapping (1050), the mapping application is programmed to prompt the user for selection of a source element to map to D.

Figure 11:
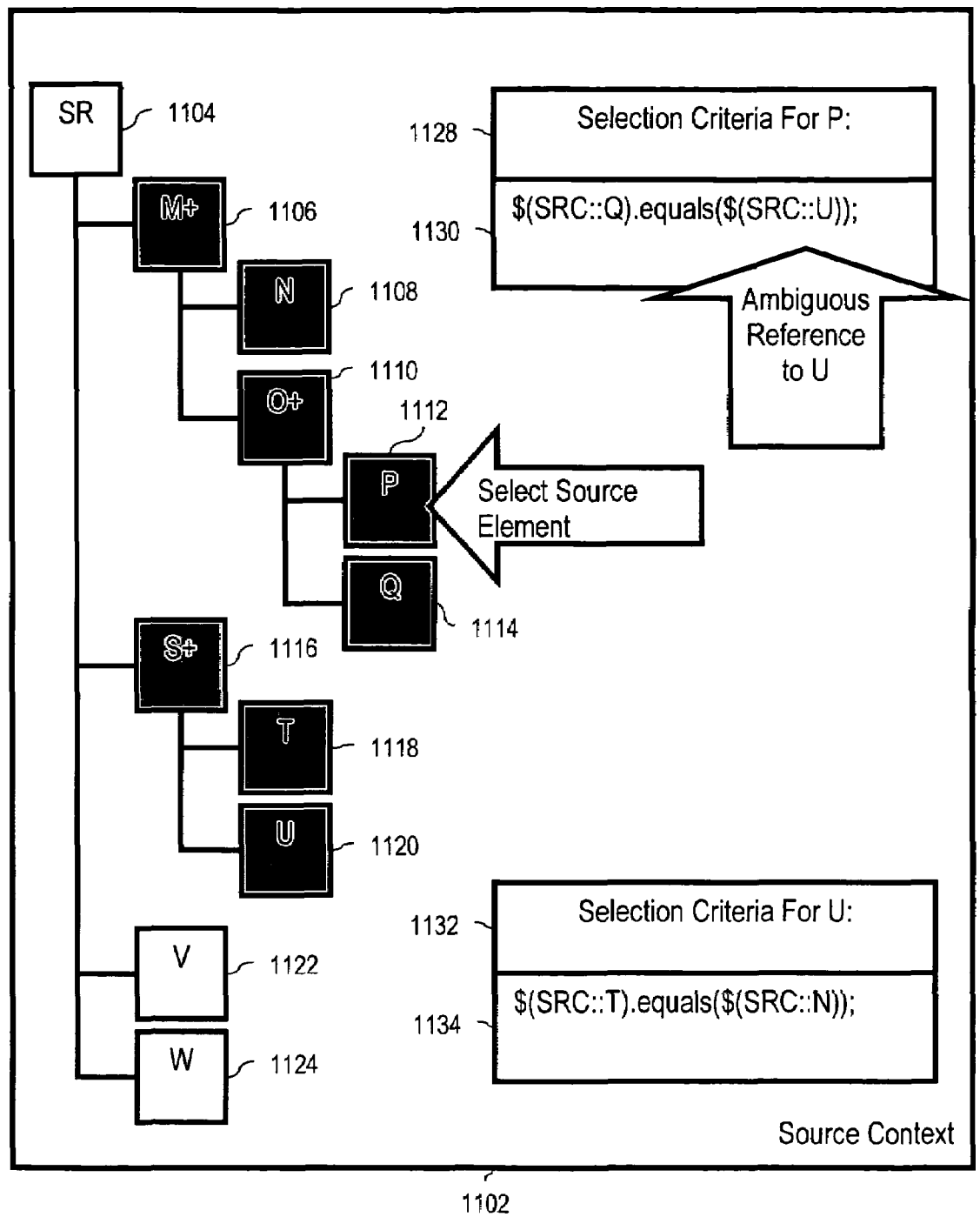
FIG. 11 illustrates a source context in an exemplary use case.

FIG. 11 shows a source tree substantially as it is presented to a user for selection of a source element to map to the target element D. In the example of FIG. 11, the user selects the element represented by node P (1112) to map to target element D. P is ambiguous, having repeating ancestors M (1106) and 0 (1110). In this example, therefore, the mapping application is programmed to prompt (1128) the user to enter selection criteria for element P. The user enters the expression at reference (1130):

$(SRC::Q).equals($(SRC::U));

This particular example is a Java expression for logical equality among the values of elements Q (1114) and U (1120). Java is used merely as an example. Selection criteria can be entered not only in Java, but in computer language or in any format supporting computation.

The character string "$(SRC::Q)" is an example of a way to present a Reference to the user. The "SRC" indicates source, the "$(" . . . ")" pair of strings distinguishes this variable from a normal programming language variable. "Q" represents, in the perspective of our pseudocode examples, the name of a source DTDElement. In general, two more parts could be usefully added to this notation: an index to the DTDPath of the intended DTDElement to distinguish this Reference from References to other DTDElements with the same name; and an index to the Bprogram encoding selection criteria to disambiguate the DTDElement (in this case no index is necessary because this Reference is inside the disambiguating Bprogram. These parts have been suppressed in order reduce clutter in the example.

In this particular example, however, the user has entered into the selection criteria another ambiguous element. Element U (1120) is ambiguous because it has a repeating ancestor, element S (1116). In this example, therefore, the mapping application is programmed to prompt (1132) the user to enter selection criteria for element U. The user enters the expression at reference (1134):

$(SRC::T).equals($(SRC::N));

This example expression is Java for logical equality of the values of the elements T (1118) and N (1108) viewed as strings. Neither T nor N is ambiguous in this context. Disambiguating P by entering selection criteria for it also disambiguated all the ambiguous elements in the source tree above P, and, for that matter, on the same level as P for elements descending from ancestors of P below the source root (1104). Disambiguating P therefore disambiguated element N (1102). Similarly, disambiguating U (1120) also disambiguated T (1118). At this point, therefore, having no more ambiguous elements referenced in disambiguating selection criteria, the process of recursive disambiguation is complete.

Figure 12:
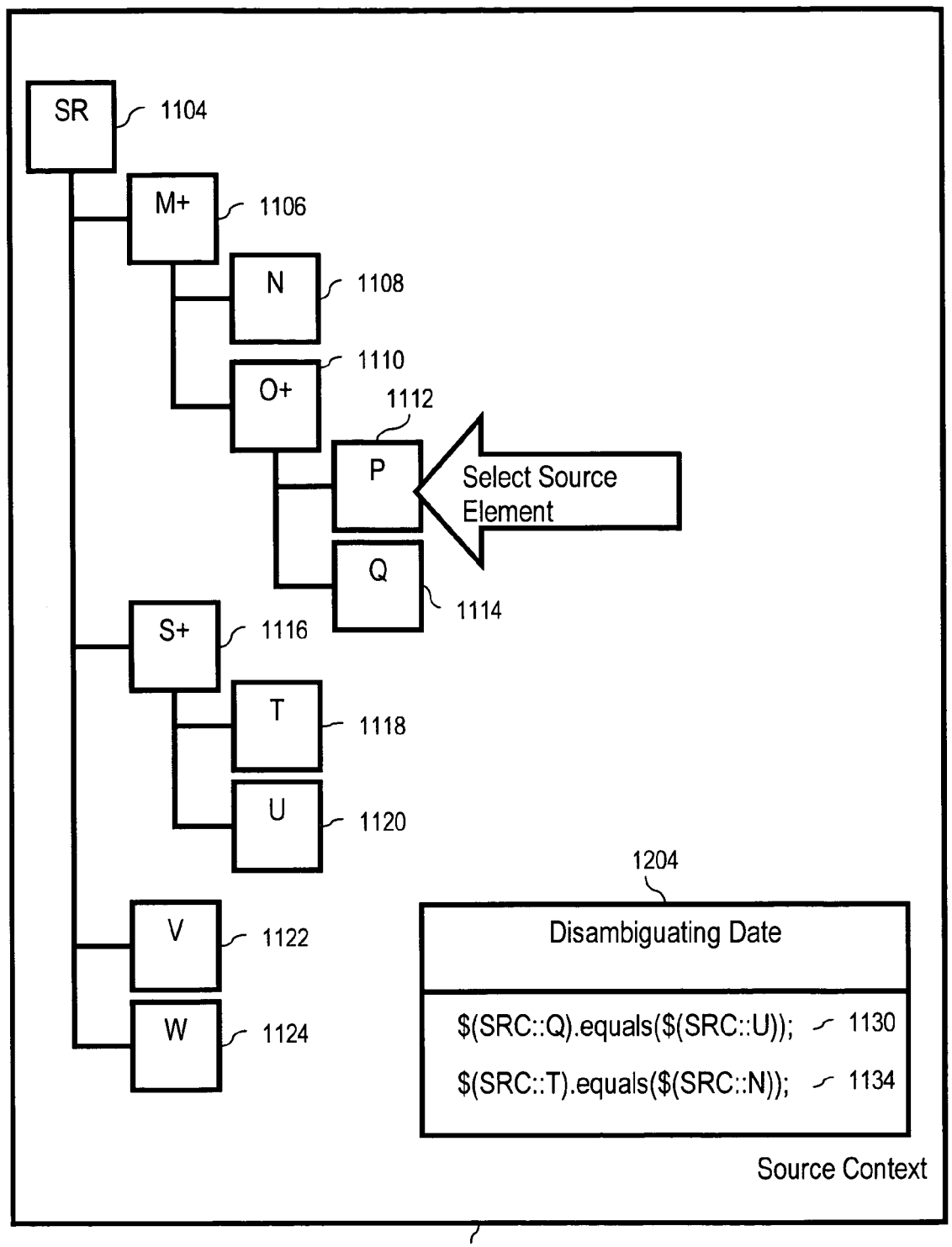
FIG. 12 illustrates results of recursive disambiguation in a source context for an exemplary use case.

FIG. 12 shows the result, a context (1202) in which the selected element P (1112) is unambiguous, plus indications of ambiguity status for the tree in which no elements are presently ambiguous, plus the disambiguating data (1204).

The disambiguating data in this case is the selection criteria (references 1130, 1134):

$(SRC::Q).equals($(SRC::U));

$(SRC::T).equals($(SRC::N));

In response to the user's selection of and disambiguation of source node P (1112) for mapping to target node D (812 on FIG. 10), the mapping application generates the following rule:

In converting a source XML document to a target XML document, read a source element.
if (the name of the source element is P, and, at this point in conversion processing, the value of element Q is equal to the value of element U, and the value of element T is equal to the value of element N)
then write the value of source element P into a target element named D.

Transforming an XML DTD into a Tree Structure Improved for Graphical Representation: DTD to PDTD Conversion This disclosure describes above methods of graphical specification of mapping rules for transforming a source XML document satisfying a source DTD into a target XML document satisfying a target DTD. The discussion above described scanning source DTDs and target DTDs into tree structures for display through user interfaces. If, however, DTDs are scanned directly into trees without further processing, then the tree structures for display will have optional content, repeating content, recursive content, and parameter content that is relatively difficult to display and manipulate directly. Various mapping applications according to embodiments of the present invention, therefore, advantageously simplify such tree structures for use in graphical specification of mapping rules.

More particularly, mapping applications according to embodiments of the present invention typically convert DTDs, both source DTDs and target DTDs, complying with a first, more complex grammar into so-called 'Presentation DTDs' or "PDTDs" complying with a second, simpler grammar. Here is the first grammar:

| | |
|---|---|
| DTD | ::= markupdecl (S markupdecl)* |
| markupdecl | ::= elementdecl \| AttlistDecl |
| elementdecl | ::= '<!ELEMENT' S Name S contentspec S? '>' |
| contentspec | ::= 'EMPTY' \| Mixed \| children |
| Mixed | ::= '(' S? '#PCDATA' ( S? '\|' S? Name)* S? ')*' \| '(' S? '#PCDATA' S? ')' |
| children | ::= ( choice \| seq ) ( '?' \| '*' \| '+' )? |
| choice | ::= '(' S? cp ( S? '\|' S? cp )+ S? ')' |
| cp | ::= ( Name \| choice \| seq ) ( '?' \| '*' \| '+' )? |
| seq | ::= '(' S? cp ( S? ',' S? cp )* S? ')' |
| AttlistDecl | ::= '<!ATTLIST' S Name AttDef* S? '>' |
| AttDef | ::= S Name S AttType S DefaultDecl |
| AttType | ::= StringType \| TokenizedType \| EnumeratedType |
| StringType | ::= 'CDATA' |
| TokenizedType | ::= 'ID' \| 'IDREF' \| 'IDREFS' \| 'ENTITY' \| 'ENTITIES' \| 'NMTOKEN' \| 'NMTOKENS' |
| EnumeratedType | ::= NotationType \| Enumeration |
| NotationType | ::= 'NOTATION' S '(' S? Name ( S? '\|' S? Name )* S? ')' |
| Enumeration | ::= '(' S? Nmtoken ( S? '\|' S? Nmtoken )* S? ')' |
| DefaultDecl | ::= '#REQUIRED' \| '#IMPLIED' \| ( ( '#FIXED' S)? Attvalue ) |

And here is the second grammar:

```
PDTD         ::= elementdecl ( S elementdecl )*
elementdecl  ::= '<!ELEMENT' S Name S contentspec '>'
contentspec  ::= ( seq | '( #PCDATA )' | 'EMPTY' )
seq          ::= '(' S Name ('+')? ( S ',' S Name ('+')? )* S ')'
```

Except as qualified in this disclosure, the meaning of terms in both grammars is the meaning set forth in the XML Recommendation. In fact, readers will note that the first grammar is essentially the markup declaration grammar for DTD according to the XML Recommendation. The DTD markup declaration grammar in the XML Recommendation includes optional entity declarations, notation declaration, processing instructions, and comments, which are not required limitations of the present invention, and for clarity and simplicity are not described here in any detail, although mapping applications that administer such optional declarations are well within the scope of the present invention. Documents corresponding to DTDs, according to embodiments of the present invention, begin with a start-tag corresponding to a name declared in a governing DTD, either a source DTD or a target DTD, and end with a similarly corresponding end-tag.

In the first grammar, S, Name, Nmtoken, and Attvalue represent character strings of specific types. 'S' is white space, for example, and the other items are formed from various characters by various rules as defined in the XML Recommendation.

Our overall approach to XML document conversion in this disclosure is to provide transforming methods from a pair consisting of a DTD satisfying the first grammar and a root (element chosen as root of the tree) to a Presentation DTD (PDTD) that satisfies the second grammar. A tree is a directed acyclic graph containing a unique source node called the root (which has no in-edges) and any number of other nodes with exactly one in-edge. Trees are particularly useful structures for displaying hierarchical data. A tree can be displayed in "outline" form, with the root at the top left and every immediate child (target of an out-edge) of a node displayed below that node and indented one additional unit of space to the right. An additional quality of PDTDs generally is that the directed graph of names with edges corresponding to the child relation as expressed by elementdecls in a PDTD form an acyclic directed graph with a root name as a unique source, so that a PDTD can be presented to the user as a tree by node splitting. In this context, node splitting is the process of creating multiple copies of a node and its out-edges, so that after node splitting, each node has at most one in-edge.

In the following discussion we will ignore white space (S) for simplicity. The treatment of white space will be clear to those of skill in the art and describing it in detail would lengthen this discussion unnecessarily. Both grammars permit optional white space. When we refer to a transformation being invertible, we mean that the original can be recovered from the transformed version except for optional modifications to white space. Non-optional white space, white space required by a grammar, is fully invertible according to embodiments of the present invention.

A sequence is a character string with the form of the production of seq for DTDs according to the XML Recommendation. In the following example declaration, "TITLE, TEXT" is a sequence:

<!ELEMENT DOCUMENT (TITLE, TEXT)>

An imbedded sequence (of a sequence) is a proper substring in content declaration that is also a sequence. In the following example, (EDITOR+, AUTHOR+) is an imbedded sequence:

<!ELEMENT DOCUMENT (TITLE, TEXT, (EDITOR+, AUTHOR+))>

A further example: In the declaration <!ELEMENT A (B,((C+,D)+,E))>, for example, the declaration content for A has the imbedded sequence ((C+,D)+,E), which in turn has the imbedded sequence (C+,D). Note that according to the simplified grammar for PTDTs, PDTDs have no imbedded sequences, whereas a DTD can have an arbitrary nesting of sequences. Readers can therefore expect to find disclosed below in this specification ways of converting imbedded sequences found in DTDs to other forms of content declaration, such as subsequences, to be expressed in PDTDs.

An imbedded repetition is an occurrence of a sequence or Name followed immediately by the operator '+' (or '*') inside the outer parentheses of a sequence. In the following example, EDITOR+ and AUTHOR+ are imbedded repetitions:

<!ELEMENT DOCUMENT (TITLE, TEXT, (EDITOR+, AUTHOR+))>.

In the following example, EDITOR+, AUTHOR+, and "(EDITOR+, AUTHOR+)+", all three, are imbedded repetitions:

<!ELEMENT DOCUMENT (TITLE, TEXT, (EDITOR+, AUTHOR+)+)>.

When an imbedded sequence is not an imbedded repetition, we remove it by removing its outer parentheses. Thus in the example declaration of content (B,((C+,D)+,E)), we remove the outer parentheses from its imbedded sequence ((C+,D)+,E), producing (B,(C+,D)+,E). This sequence still has an imbedded subsequence (C+,D)+, which, in this case, is an imbedded repetition.

A sequence or repetition with only one member is called a singleton sequence or singleton repetition, respectively. A sequence or repetition with more than one member is called a compound sequence or compound repetition, respectively.

In the special case of a singleton imbedded repetition of the form (name)+, we can also simply remove the parentheses. Thus if the sequence were (B,(D)+,E), we would remove the parentheses around D and produce the subsequence (B,D+,E), which has no imbedded sequences. Likewise, if the sequence were (B,(C+)+,E), we would remove the parentheses and convert ++ to +, producing (B,C+,E). The 'one or more' repetition operator '+' is idempotent.

Imbedded compound repetitions, however, typically are removed by demotion, replacing an imbedded sequence comprising an imbedded compound repetition with a new Name and declaring the new Name with the imbedded sequence. Thus we convert <!ELEMENT A (B,((C+,D)+,E))>, for example, to two declarations. One, containing the new subsequence (B, IMREP+, E):

<!ELEMENT A (B, IMREP+,E)> and the second:

<!ELEMENT IMREP (C+, D)>.

In this example, ((C+,D)+ is the imbedded compound repetition, and IMREP is the new Name, a so-called compound repetition demotion element name, generated to represent the imbedded compound repetition.

An imbedded leaf is an occurrence of "#PCDATA" within a sequence that is not a singleton. DTDs may have imbedded leaves but PDTDs, according to their simpler grammar, have no imbedded leaves. Accordingly, readers can expect us to show in this disclosure, at least one way of converting or demoting imbedded leaves for use in PDTDs.

Further Introductory Overview of DTD to PDTD Conversion

Figure 13:
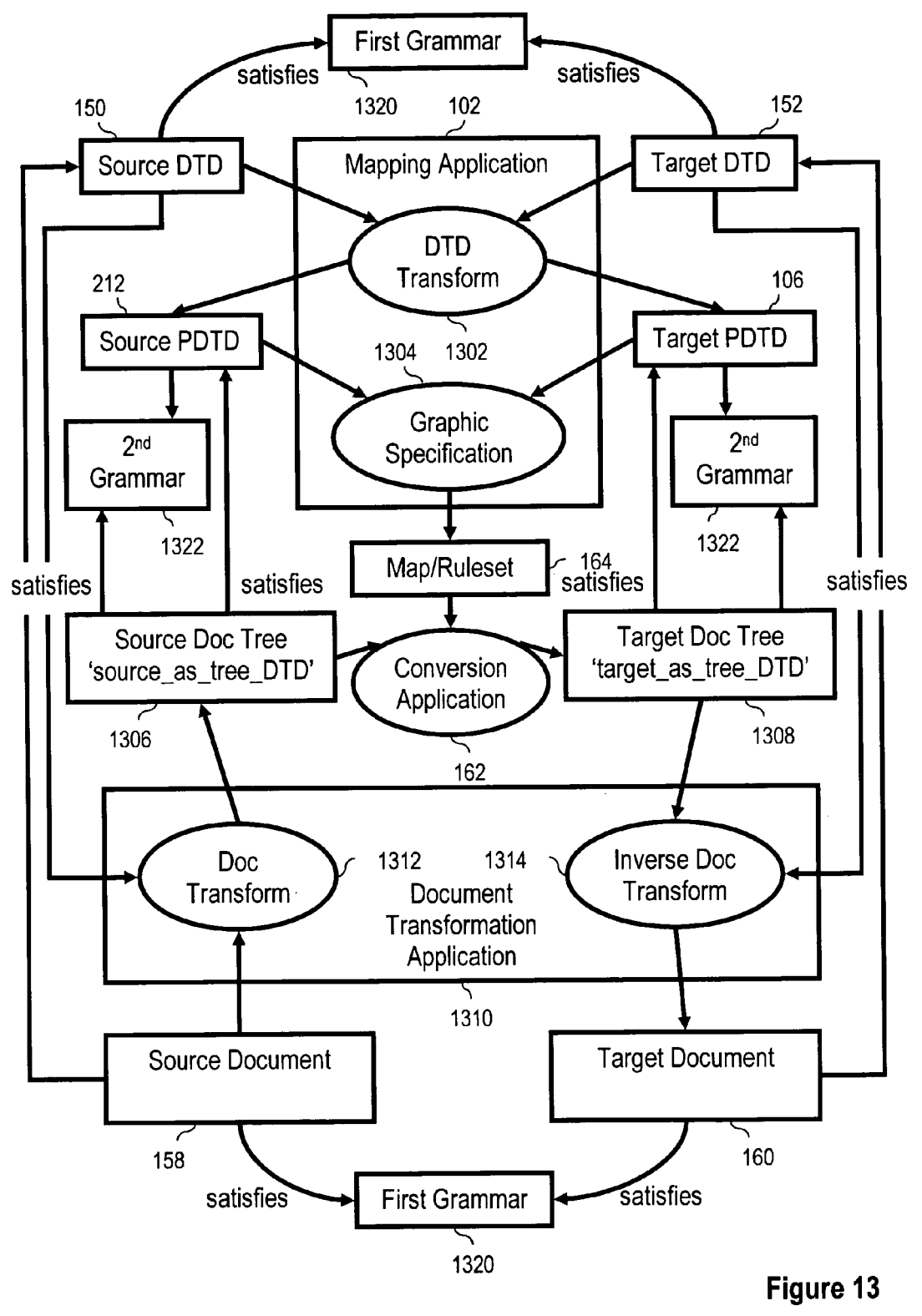

FIG. 13 is a data flow and relational diagram depicting a further exemplary embodiment of methods and structures, useful in various embodiments of the present invention, for graphic specification of mapping rules, DTD transformation, and document transformation. Among other things, a DTD transformation function (1302) according to FIG. 13 accepts, as input DTDs, source DTDs (150) and target DTDs (152) meeting the first grammar (1320) and creates as outputs source and target PDTDs (212, 106).

The source PDTDs (212) and target PDTDs (106) are the same data structures referred to above as 'source trees' and 'target trees.' In the following discussion, we wish to emphasize their nature as different types of DTDs implementing a kind of grammar, so we refer to these structures as 'PDTDs' rather than 'source trees' and 'target trees.' PDTDs maintain, however, their important purpose as data structures to be used advantageously for tree-style displays of relations among XML elements for graphical, user-specified mapping rules for XML to XML transformation.

As will be explained in more detail below, the grammar-to-grammar transformation that is useful for DTD simplification is also useful for XML document transformation. The grammar-to-grammar transformation method in fact supports DTD transformation so that, given a DTD (and root) embodiments of the invention can produce the corresponding PDTD. The grammar-to-grammar transformation also supports document transformation so that, given an XML document satisfying the original DTD with the root tag as the first element tag, embodiments of the invention can produce an XML document satisfying the corresponding PDTD. The grammar-to-grammar transformation methodology also supports inverse document transformation so that, given a DTD, a corresponding PDTD, and a document that was produced by the document transformation, embodiments can produce a target XML document that satisfies a target DTD.

FIG. 13 depicts all these relationships. The method of FIG. 13 includes DTD transformation (1302), from DTDs (150, 152) satisfying a first grammar (1320) to PDTDs (212, 106) satisfying a second grammar (1322). The method of FIG. 13 includes graphic specification (1304) of mapping rules (164) carried out in dependence upon the PDTDs (212, 106) which are utilized for graphic representation of source and target trees.

At document transformation time, the method of FIG. 13 includes using a document transformation application (1310) to transform (1312) a source document (158) meeting the first grammar (1320) into a source document tree (1306) meeting the second grammar (1322). The method of FIG. 13 includes also the process of converting (162) the source document tree (1306) into a target document tree (1308) according to the mapping rules (164). The mapping rules (164) were developed in dependence upon the PDTDs satisfying the simpler second grammar (1322), and their application results in a target document tree (1308) satisfying the second grammar (1322). The method of FIG. 13 includes also the inverse document transformation. That is, the document transformation application (1310) includes 'inversely' transforming a target document tree (1308) meeting the simplified second grammar (1322) into a target XML document meeting the full first grammar (1320).

Readers will have noticed by now that both grammars are described technically as grammars of DTDs:

DTD::=markupdecl (S markupdecl)* and

PDTD::=elementdecl (S elementdecl)*

So that readers may be wondering why we speak of XML documents as 'satisfying' these grammars. XML documents can satisfy these grammars because DTD grammars are XML document grammars. More particularly, in the words of the XML Recommendation itself, "Definition: The XML document type declaration ("DTD") contains or points to markup declarations that provide a grammar for a class of documents." That is, the declaration in a DTD, although clearly providing a grammar of DTDs, also provide a grammar for XML documents.

In the terminology of the XML recommendation, XML documents satisfying the production for 'document' are said to be well-formed. The production for 'document' within the meaning of the XML recommendation includes the overall grammar for XML documents. Documents that meet whatever additional constraints may be set forth in a particular DTD are said to be 'valid.'

In the terminology of the XML Recommendation, therefore, it would be correct to say that source XML documents (158) useful with embodiments of the present invention typically are 'wellformed' with respect to the first grammar and typically are 'valid' with respect to a source DTD (150). Similarly, it is advantageous through the use of various embodiments of the present invention to produce target XML documents (160) that are 'well-formed' with respect to the first grammar (1320) and 'valid' with respect to a target DTD (152).

Source document trees (1306), are formed from a source document (158) so as to be 'well-formed' with respect to the second grammar (1322). Formed from source documents that are well-formed with respect to a first grammar that is a super-set of the second grammar, source document trees (1306) are typically well-formed also with respect to the first grammar (1320). Formed to be well-formed according to the second grammar (1322), just as the source PDTD implements the second grammar, source document trees (1306) are also expected therefore to be 'valid' with respect to the source PDTD. Similarly formed in dependence upon mapping rules (164) defined in dependence upon a target PDTD (106) implementing the second grammar (1322), target document trees (1308) are expected to be well-formed with respect to the second grammar (1322) and are expected to be 'valid' with respect to the target PDTD.

In this disclosure, we are concerned primarily with methods, systems, and products for XML document transformation. We are not primarily concerned with the precise, technical terminology of the XML Recommendation, which sometimes is not exactly a perfect model of clarity. In this disclosure, therefore, we adopt the somewhat more mathematical term 'satisfy' to describe relations among grammars, DTDs, and documents. Documents well-formed with respect to a grammar are said to 'satisfy' the grammar.

Documents that are valid with respect to a DTD or PDTD are said to 'satisfy' the DTD or PDTD. And so on.

Further Discussion of DTD to PDTD Transformation

Figure 14:
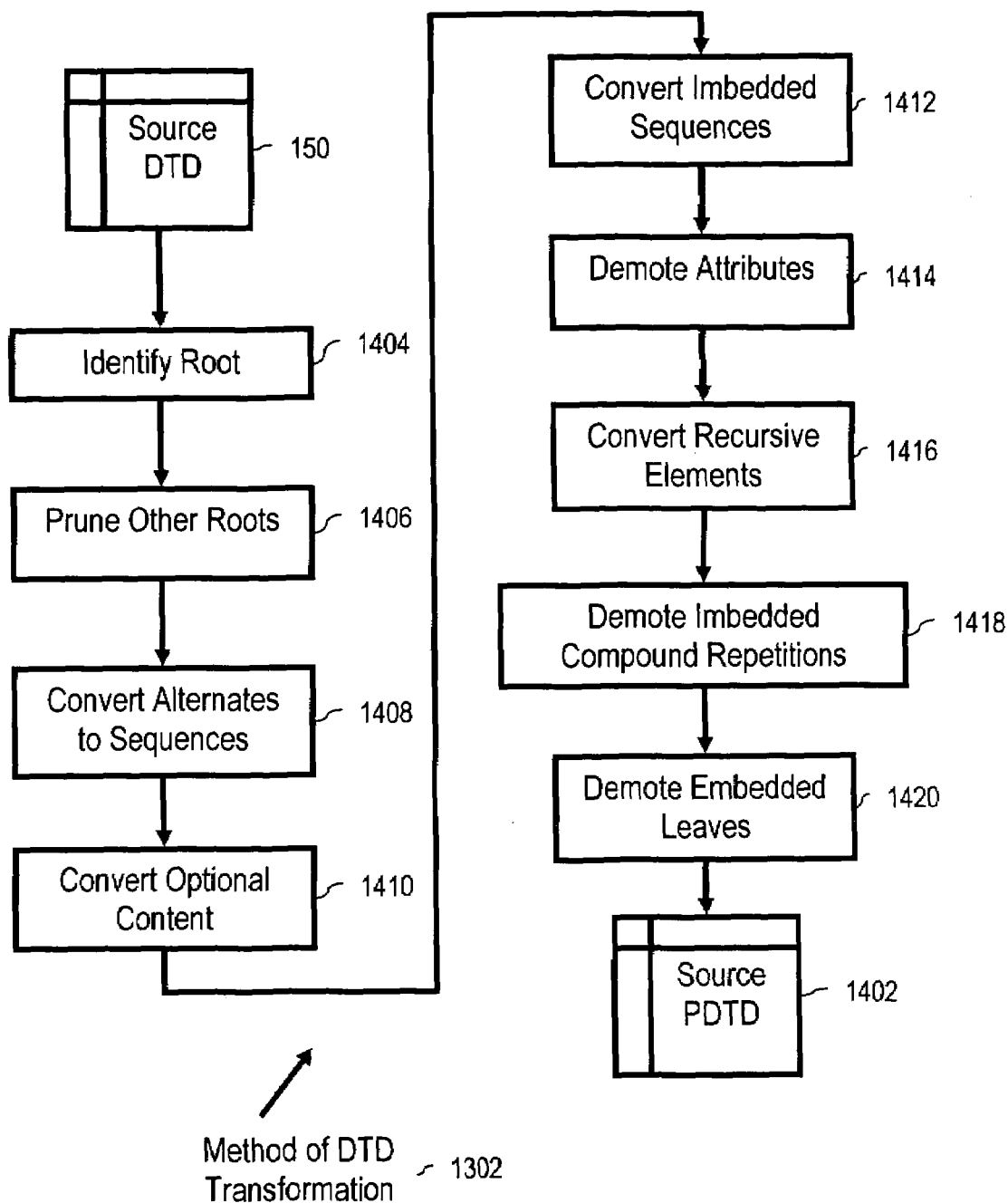
FIG. 14 is a flow chart depicting a method of DTD transformation.

FIG. 14 sets forth a flow chart depicting a method (1302) of DTD transformation, that is, a method for transforming a user-supplied DTD (150) satisfying a first XML grammar as reference 1320 on FIG. 13) into a PDTD (1402) satisfying a second XML grammar (as reference 1322 on FIG. 13). In the method of FIG. 14, a grammar useful as the first grammar is the first, more complex, DTD grammar set forth above in this disclosure, and a grammar useful as the second grammar is the second, simpler PDTD grammar set forth above in this disclosure.

The method of FIG. 14 includes identifying (1404), for the PDTD, a root element from the DTD; pruning (1406) from the DTD root elements other than the identified root element; and converting (1408) DTD declarations of alternate content to sequences, including replacing occurrences of '|' with ','. The method of FIG. 14 also includes converting (1410) DTD declarations of optional content to mandatory content, including removing occurrences of '?' and changing occurrences of '*' to '+'; converting (1412) DTD declarations of imbedded sequences to subsequences, including removing parentheses surrounding imbedded sequences, converting "++" to "+", and optionally demoting imbedded compound repetitions (1418); and demoting (1414) attribute definitions of DTD elements having attributes to children of the DTD elements having attributes. It is not necessary to perform the step of demoting compound repetitions (1418) before converting recursive declarations (1416) since it must be performed after as well; however, performing it twice will simplify the already complex task of converting recursive declarations (1416) by providing simpler declarations.

The method of FIG. 14 also includes converting (1416) recursive declarations to repetitions; demoting (1418) compound repetitions from elements having compound repetitions; and demoting (1420) imbedded leaves from elements having imbedded leaves, wherein imbedded leaves comprises instances of #PCDATA in any declaration of any form except #PCDATA.

In the method of FIG. 14, identifying (1404) a root element for the PDTD can include programmatically scanning the DTD for the root element for the PDTD, identifying the first root element identified in the DTD as the root element for the PDTD. Alternatively, identifying (1404) a root element for the PDTD can comprise receiving a user's selection of a root element for the PDTD, where the user enters the user's selection of root element through conventional user interaction with, for example, a GUI. In fact, even when the root is programmatically selected, it is advantageous within the method of FIG. 14 to prompt a user to confirm the application's selection of the root.

In addition to selecting a root, it is typically considered advantageous to prune a DTD of alternative roots if there are any, that is, roots other than the selected root. Leaving roots other than the selected root in the DTD can result in a PDTD that is a forest, a group or set of trees, rather than a single tree. In most embodiments of the present invention, it is considered advantageous to administer PDTDs as single trees. An exemplary method of pruning alternative roots is to scan through the DTD marking for inclusion in the PDTD the element declaration of the root, attribute lists of the root, children of the selected root, and attributes of children of the selected root, then discarding all element declarations and attribute declarations not marked for inclusion. More particularly, in pseudocode expression:
let e be the elementdecl for the root;
iterate until e has no referent (
  mark e for processing;
  mark the elementdecls for the children of Name of e for processing;
  mark the Attlistdecls for attributes of the Name of e for processing;
  mark e for inclusion;
  let e be the first elementdecl or Attlistdecl marked for processing and not for inclusion)
discard all elementdecls and Attlistdecls not marked for inclusion.

An example of pruning alternative roots begins with the following example DTD:

```
<!ELEMENT DOCUMENT ( TITLE , TEXT, ( EDITOR* |
AUTHOR* )? )>
<!ATTLIST DOCUMENT LANGUAGE ( English , Other ) #IMPLIED>
<!ELEMENT TITLE ( #PCDATA )>
<!ELEMENT TEXT ( #PCDATA | EMPHASIS)*>
<!ELEMENT EMPHASIS ( TEXT* )>
<!ELEMENT CHAPTER ( #PCDATA )>
<!ELEMENT EDITOR ( #PCDATA )>
<!ELEMENT AUTHOR ( #PCDATA )>
```

Assume that the selected root is 'DOCUMENT,' and note that the element declaration for 'CHAPTER' is nowhere included in the declaration content of other elements, making it an alternative root. After pruning, the DTD has this form:

```
<!ELEMENT DOCUMENT ( TITLE , TEXT , ( EDITOR* |
AUTHOR* )? )>
<!ATTLIST DOCUMENT LANGUAGE ( English , Other ) #IMPLIED>
<!ELEMENT TITLE ( #PCDATA )>
<!ELEMENT TEXT ( #PCDATA | EMPHASIS)*>
<!ELEMENT EMPHASIS ( TEXT* )>
<!ELEMENT EDITOR ( #PCDATA )>
<!ELEMENT AUTHOR ( #PCDATA )>
```

The method of FIG. 14 includes converting (1408) DTD declarations of alternate content to sequences, including replacing occurrences of '|' with ','. The method of FIG. 14 also includes converting (1410) DTD declarations of optional content to mandatory content, including removing occurrences of '?' and changing occurrences of '*?' to '+'. Beginning with the example DTD just above, the DTD we just pruned, note that it contains an alternation operator '|' in the first line, an option operator '?' in the first line, two optional repetition operators '*' in the first line, and an optional repetition operator '*' in the fifth line. Converting the alternates and options gives the example DTD the following form:

```
<!ELEMENT DOCUMENT ( TITLE , TEXT , ( EDITOR+ ,
AUTHOR+ ))>
<!ATTLIST DOCUMENT LANGUAGE ( English , Other ) #IMPLIED>
<!ELEMENT TITLE ( #PCDATA )>
<!ELEMENT TEXT ( #PCDATA , EMPHASIS )+>
<!ELEMENT EMPHASIS ( TEXT+ )>
<!ELEMENT EDITOR ( #PCDATA )>
<!ELEMENT AUTHOR ( #PCDATA )>
```

Figure 15:
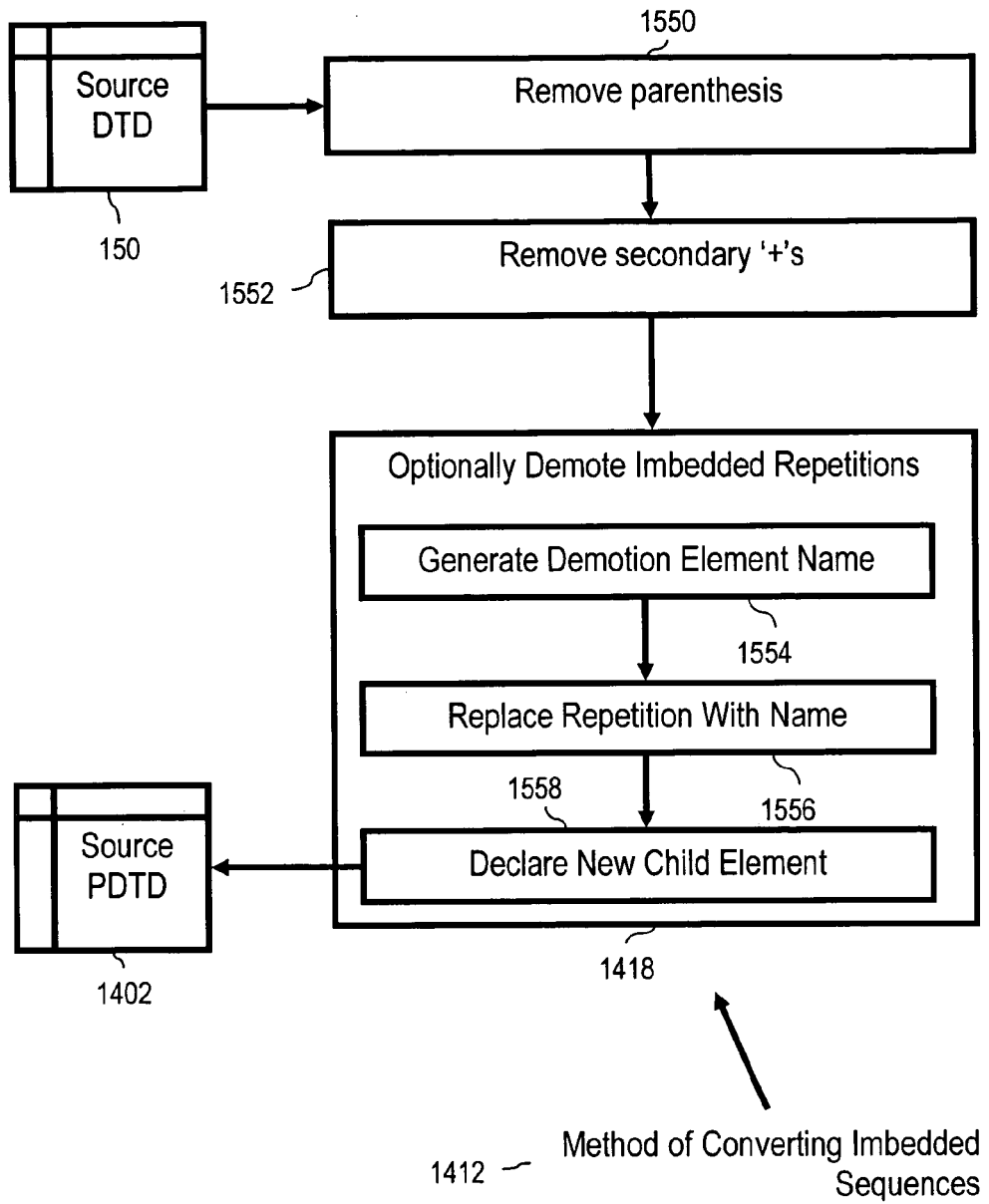
FIG. 15 is a flow chart depicting a method of converting imbedded sequences to subsequences.

The method of FIG. 14 includes converting imbedded sequences (1412) to subsequences. FIG. 15 sets forth a flow chart depicting a method of converting(1412) imbedded sequences that includes removing (1550) surrounding parentheses from imbedded sequences that are not imbedded repetitions or are singleton repetitions. The method of FIG. 15 includes removing (1552) any secondary '+'s created by removing the parenthesis.

More particularly, in pseudocode expression, converting imbedded sequences can be implemented as:

remove the outer parentheses from all imbedded sequences that are not followed by '+';
remove the outer parentheses from all imbedded singleton repetitions;
replace any occurrences of "++" by "+";
demote imbedded compound repetitions; /*optional step*/

Also in pseudocode expression, demoting imbedded compound repetitions can be implemented as:

```
let i=1;
let s be the first imbedded repetition
iterate while s has a referent(
    replace s with "IMSEQ"+i+"+";
    remove the last '+' from s;
    add a new elementdecl "<!ELEMENT IMSEQ"+i+" "+s+">";
    increment i by 1;
    let s be the first imbedded repetition;)
```

Continuing our DTD example, beginning with the DTD just above, note that there is an imbedded sequence in the first line, "(EDITOR+, AUTHOR+)":

<!ELEMENT DOCUMENT (TITLE, TEXT, (EDITOR+, AUTHOR+))> for which converting the imbedded sequence yields the following form of DTD:

<!ELEMENT DOCUMENT ( TITLE , TEXT , EDITOR+ , AUTHOR+ )>
<!ATTLIST DOCUMENT LANGUAGE ( English , Other ) #IMPLIED>
<!ELEMENT TITLE ( #PCDATA )>
<!ELEMENT TEXT ( #PCDATA , EMPHASIS )+>
<!ELEMENT EMPHASIS ( TEXT+ ) >
<!ELEMENT EDITOR ( #PCDATA )>
<!ELEMENT AUTHOR ( #PCDATA )>

The method of FIG. 15 optionally includes demoting imbedded compound repetitions (1418). Demoting imbedded compound repetitions (1418) includes generating (1554) compound repetition demotion element names; replacing (1556) an imbedded compound repetition with a compound repetition demotion element name; and declaring (1558) a new child element having as its element name the compound repetition demotion element name and having as its content the compound repetition. The compound repetition demotion element name typically has a form that identifies the new child element as a compound repetition demotion child. An example of such a compound repetition demotion element name is "IMSEQ." To the extent that it is necessary to demote more than one imbedded compound repetition, the demotions can be distinguished by concatenating an identifying integer to the compound repetition demotion element name, thereby creating a unique compound repetition demotion element name for each instance of demotion. It is typically correct to describe this step of demoting imbedded compound repetitions as optional in the sense that it can advantageously be carried out later, as described in detail below.

Figure 16:
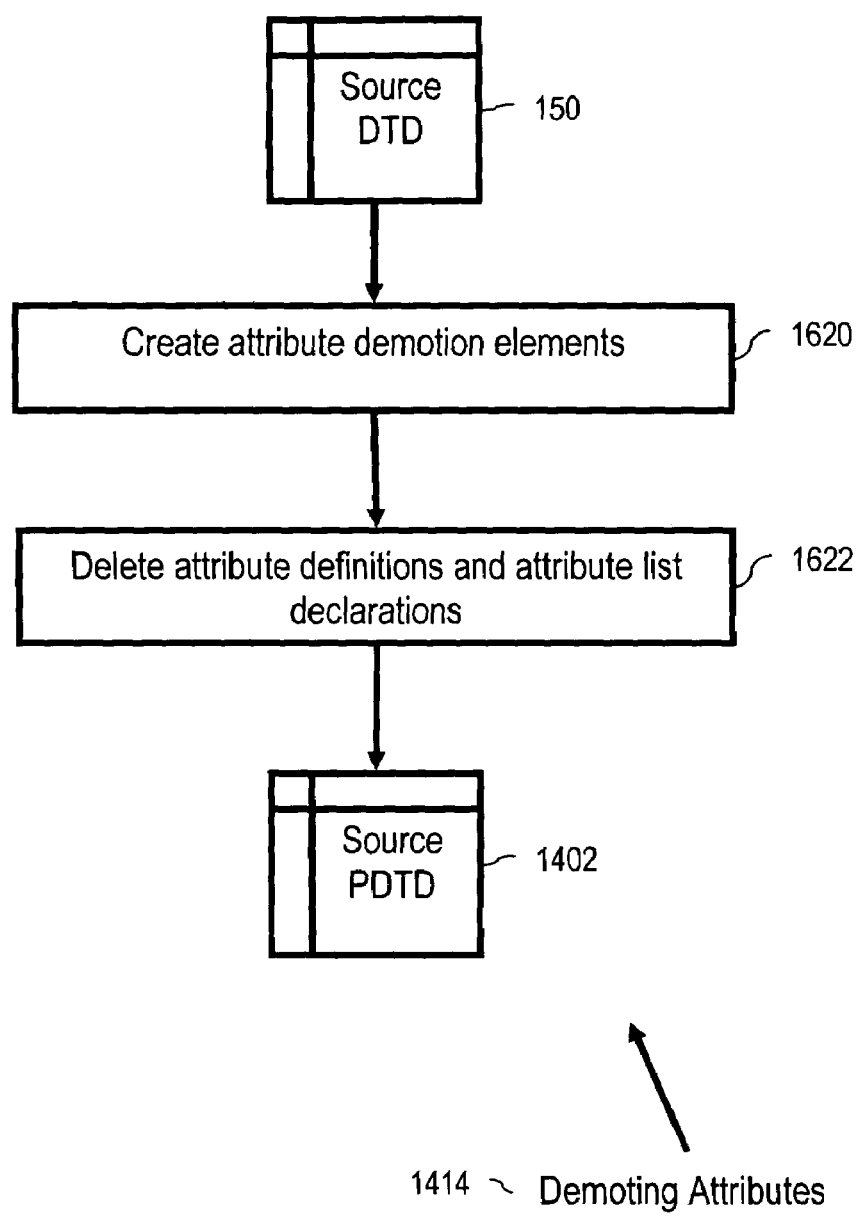
FIG. 16 is a flow chart depicting a method of demoting attribute definitions of DTD elements

The method of claim 14 includes demoting (1414) attribute definitions of DTD elements having attributes to children of the DTD elements having attributes. FIG. 16 sets forth a flow chart depicting a method of demoting (1414) attribute definitions of DTD elements, including creating (1620) attribute demotion elements, the attribute demotion elements having unique names identifying the attribute demotion elements as attribute demotion elements and deleting (1622) the attribute definitions and attribute lists of the attribute definitions. More particularly, in pseudocode expression, demoting attribute definitions can be implemented as:

```
for each Attlistdecl a (
    let e be the elementdecl for the Name of a;
    for each Attdef d in a (
        let t be the Name of d;
        modify t so that it indicates that it was generated from the
            original t but does not
        duplicate any element Name; /* e.g. use t+n where t+n
            does not appear as an
        element Name */
        add t to the beginning of the sequence of e, creating the
            sequence if necessary ;
        add a new elementdecl "<!ELEMENT "+t+"(#PCDATA)>";)
    remove a)
```

Continuing our DTD example, note that the DTD just above, after converting its imbedded sequence, still contains a declaration of an attribute list:

<!ATTLIST DOCUMENT LANGUAGE (English, Other) #IMPLIED> for which demoting attribute definitions produces the following form of DTD:

<!ELEMENT DOCUMENT ( LANGUAGE , TITLE , TEXT, EDITOR+, AUTHOR+ )>
<!ELEMENT LANGUAGE ( #PCDATA )>
<!ELEMENT TITLE ( #PCDATA )>
<!ELEMENT TEXT ( #PCDATA, EMPHASIS )+>
<!ELEMENT EMPHASIS ( TEXT+ )>
<!ELEMENT EDITOR ( #PCDATA )>
<!ELEMENT AUTHOR ( #PCDATA )> in which the attribute list named 'LANGUAGE' has been replaced with an element declaration for 'LANGUAGE' having content of '#PCDATA.'

Figure 17:
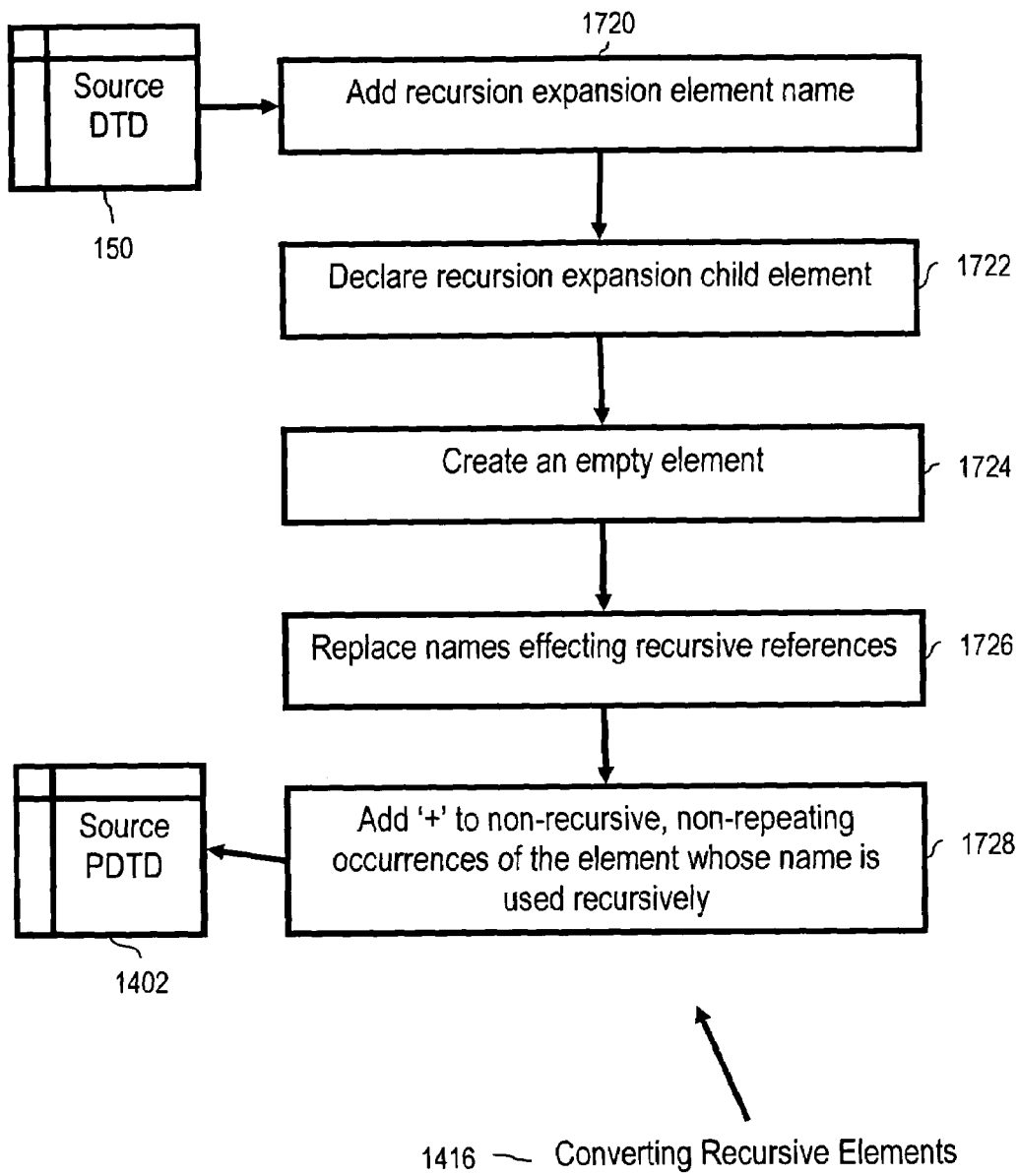
FIG. 17 is a flow chart depicting a method of converting recursive elements.

The method of FIG. 14 includes converting (1416) recursive children elements in DTD declarations to non-recursive children. FIG. 17 sets forth a flow chart depicting a method of converting recursive elements, including adding (1720) recursion expansion element names to sequences for DTD declarations having recursive children; creating (1722) recursion expansion children having the recursion expansion element names identifying the recursion expansion children as recursion expansion children; creating (1724) empty elements having names identifying them as empty elements; and replacing (1726) names effecting recursive references in recursive children with names of empty elements. An example of a recursion expansion name identifying a recursion expansion child as such is 'RECURSION.' An example of a name identifying an empty element as such is 'IMEMPTY.'

FIG. 17 sets forth a flow chart depicting a method of converting recursive elements comprising converting (1416) recursions to repetitions, that is, converting recursive references to declarations of repeating content. More particularly, the method of FIG. 17 includes adding (1720) a recursion expansion element name to a DTD declaration of an element whose name is used recursively. An element name is said to be 'used recursively' when the element name occurs in content declaration of the element or of the element's descendents.

The method of FIG. 17 includes declaring (1722) a recursion expansion child element having the recursion expansion element name identifying the recursion expansion child element as a recursion expansion child element and having content of "#PCDATA." An example of a recursion expansion name identifying a recursion expansion child as such is 'RECURSION.' The fact that the content of the recursion expansion child element is #PCDATA means that the recursion expansion child element is a leaf in the PDTD tree structure.

The method of FIG. 17 includes creating (1724) an empty element having a name identifying the empty element as an empty element and replacing (1726) names effecting recursive references, in content declarations of recursive descendants, with the name of the empty element. An example of a name identifying an empty element as such is 'IMEMPTY.'

The method of FIG. 17 also includes adding (1728) '+' to all non-recursive, non-repeating occurrences of the element whose name is used recursively. This latter step of adding '+'s is the reason that this particular process is referred to generally as converting recursions to repetitions.

More particularly, in pseudocode expression, converting recursions to repetitions can be implemented as:

```
let G be the directed graph with Names as nodes and edges
corresponding to the child
relation;
let e be the elementdecl with Name r where r is the first node of G
to be reached twice by
a depth first search of G from the root;
iterate while e has a referent(
    if it is not already there, add the Name "RECURSION" to the
    beginning of the
    sequence of e, creating the sequence if necessary;
    if it is not already there, add '+' to the first (non-
    recursive) reference to r;
    remove the child occurrence of r to which the edge that completes
    the cycle
    corresponds;
    if the removal of r leaves an empty sequence replace it by
    "IMEMPTY" and if it is not
    already there add a new elementdecl "<!ELEMENT IMEMPTY
    EMPTY>";
    update G;
    let e be the elementdecl with Name r where r is the first node of G
    to be reached twice
    by a depth first search of G from the root)
if the name "RECURSION" was added and if it is not already there
add the elementdecl
"<!ELEMENT RECURSION (#PCDATA)>";
```

In the following example DTD block, the 'EMPHASIS' element has child content 'TEXT' effecting a recursive reference to the element 'TEXT':

```
<!ELEMENT TEXT ( #PCDATA, EMPHASIS )+>
<!ELEMENT EMPHASIS ( TEXT+ )>
```

Converting the recursive element yields the following DTD block:

```
<!ELEMENT TEXT ( RECURSION , ( #PCDATA , EMPHASIS )+ )>
<!ELEMENT RECURSION ( #PCDATA )>
<!ELEMENT EMPHASIS (IMEMPTY+)>
<!ELEMENT IMEMPTY EMPTY>
``` in which the added recursion expansion element name is 'RECURSION,' the new recursion expansion child is the element named 'RECURSION,' the replacement for the ('TEXT') name effecting recursion is the name of an empty element 'IMEMPTY,' and the new empty element is the new element named 'IMEMPTY.']

Note that if the root element of the DTD appears in declarations within the DTD, this recursion must be handled as a special case, by first introducing a new root element whose only child is the old root element. This special step is necessary in order to declare the old root element repeating.

Continuing our ongoing DTD example, beginning with the following block in which attribute definitions are already demoted but the 'TEXT' recursion still exists:

```
<!ELEMENT DOCUMENT ( LANGUAGE , TITLE , TEXT, EDITOR+,
AUTHOR+ )>
<!ELEMENT LANGUAGE ( #PCDATA )>
<!ELEMENT TITLE ( #PCDATA )>
<!ELEMENT TEXT ( #PCDATA, EMPHASIS )+>
<!ELEMENT EMPHASIS ( TEXT+ )>
<!ELEMENT EDITOR ( #PCDATA )>
<!ELEMENT AUTHOR ( #PCDATA )>
``` removing the recursion produces this form of DTD:

```
<!ELEMENT DOCUMENT ( LANGUAGE , TITLE , TEXT+ ,
EDITOR+ , AUTHOR+ )>
<!ELEMENT LANGUAGE ( #PCDATA )>
<!ELEMENT TITLE ( #PCDATA )>
<!ELEMENT TEXT ( RECURSION , ( #PCDATA , EMPHASIS )+ )>
<!ELEMENT RECURSION ( #PCDATA )>
<!ELEMENT EMPHASIS (IMEMPTY+)>
<!ELEMENT IMEMPTY EMPTY>
<!ELEMENT EDITOR ( #PCDATA )>
<!ELEMENT AUTHOR ( #PCDATA )>
```

Figure 18:
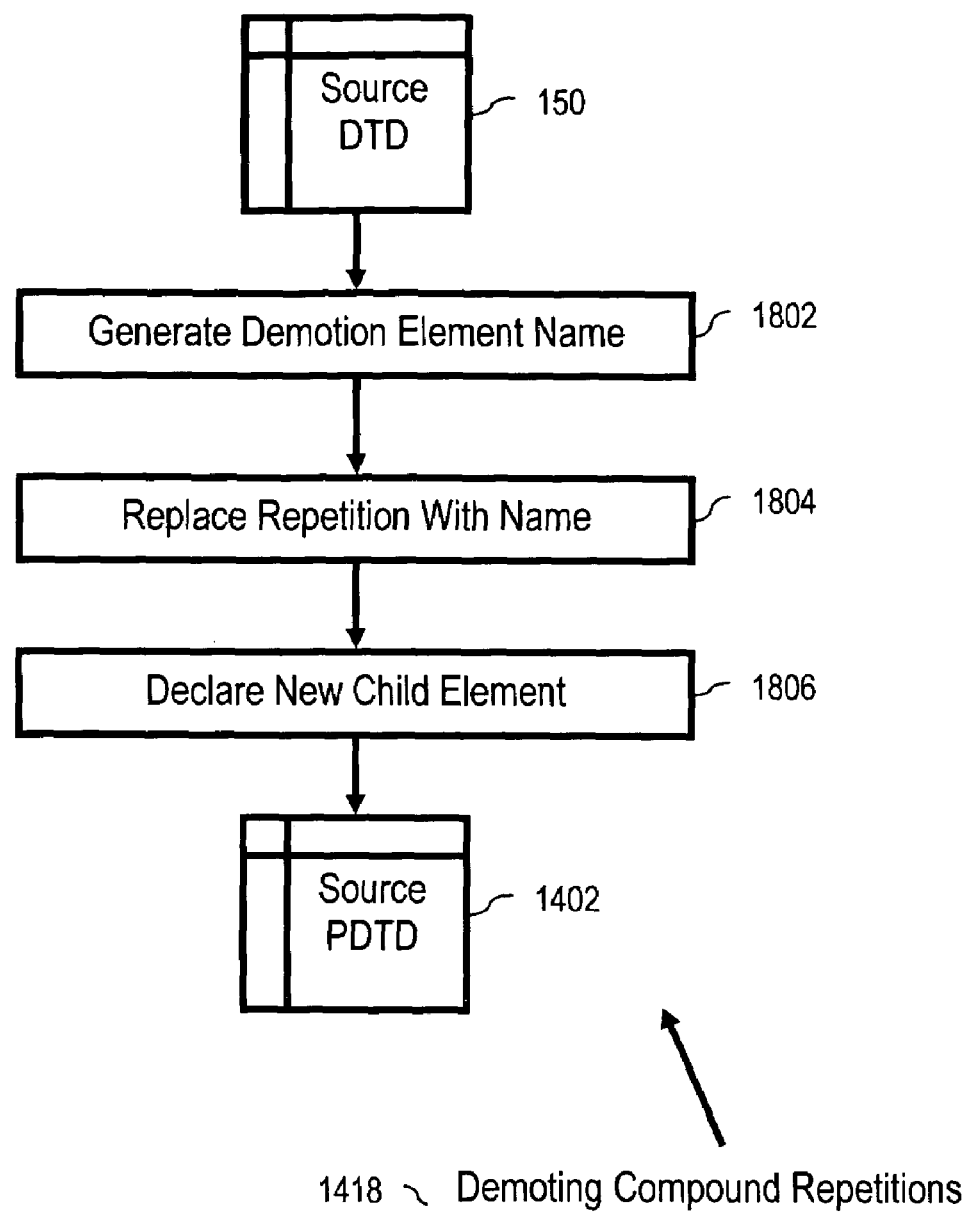
FIG. 18 is a flow chart depicting a method of demoting compound repetitions.

The method of FIG. 14 includes demoting (1418) imbedded compound repetitions from elements having imbedded compound repetitions. Recall that a compound repetition is a repeating sequence having more than one member, e.g. of the form '(x,y)+' with the '+' outside the sequence declaration, that is, outside the parenthesis denoting a sequence as content within an element declaration in a DTD. FIG. 18 sets forth a flow chart depicting a method of demoting (1418) imbedded compound repetitions from element declarations having imbedded compound repetitions including generating (1802) compound repetition demotion element names. The method of FIG. 18 includes replacing (1804) a compound repetition with a compound repetition demotion element name and declaring (1806) a new child element having as its element name the compound repetition demotion element name and having as its content the compound repetition. The compound repetition demotion element name typically has a form that identifies the new child element as a compound repetition demotion child. An example of a name identifying a compound repetition demotion child element as such is 'IMREP.' Thus for example we convert the declaration having the imbedded compound repetition (C+,D)+:

<!ELEMENT A (B,((C+,D)+,E))>, for example, into two declarations: a first, containing the new replacement subsequence (B, IMREP+, E):

<!ELEMENT A (B, IMREP+,E)> and a second, the new child element, the compound repetition demotion child:

<!ELEMENT IMREP (C+, D)>, having IMREP as the compound repetition demotion element name.

The method of FIG. 14 includes demoting (1420) imbedded leaves from elements having imbedded leaves. An imbedded leaf is a instance of PCDATA inside a repeating sequence, as in this declaration:

<!ELEMENT TEXT (RECURSION, (#PCDATA, EMPHASIS)+)> where the #PCDATA is an imbedded leaf. That is, an imbedded leaf is an instance of #PCDATA not immediately surrounded by parentheses. Instances of #PCDATA occurring as proper substrings of DTD declarations are also considered imbedded leaves.

Figure 19:
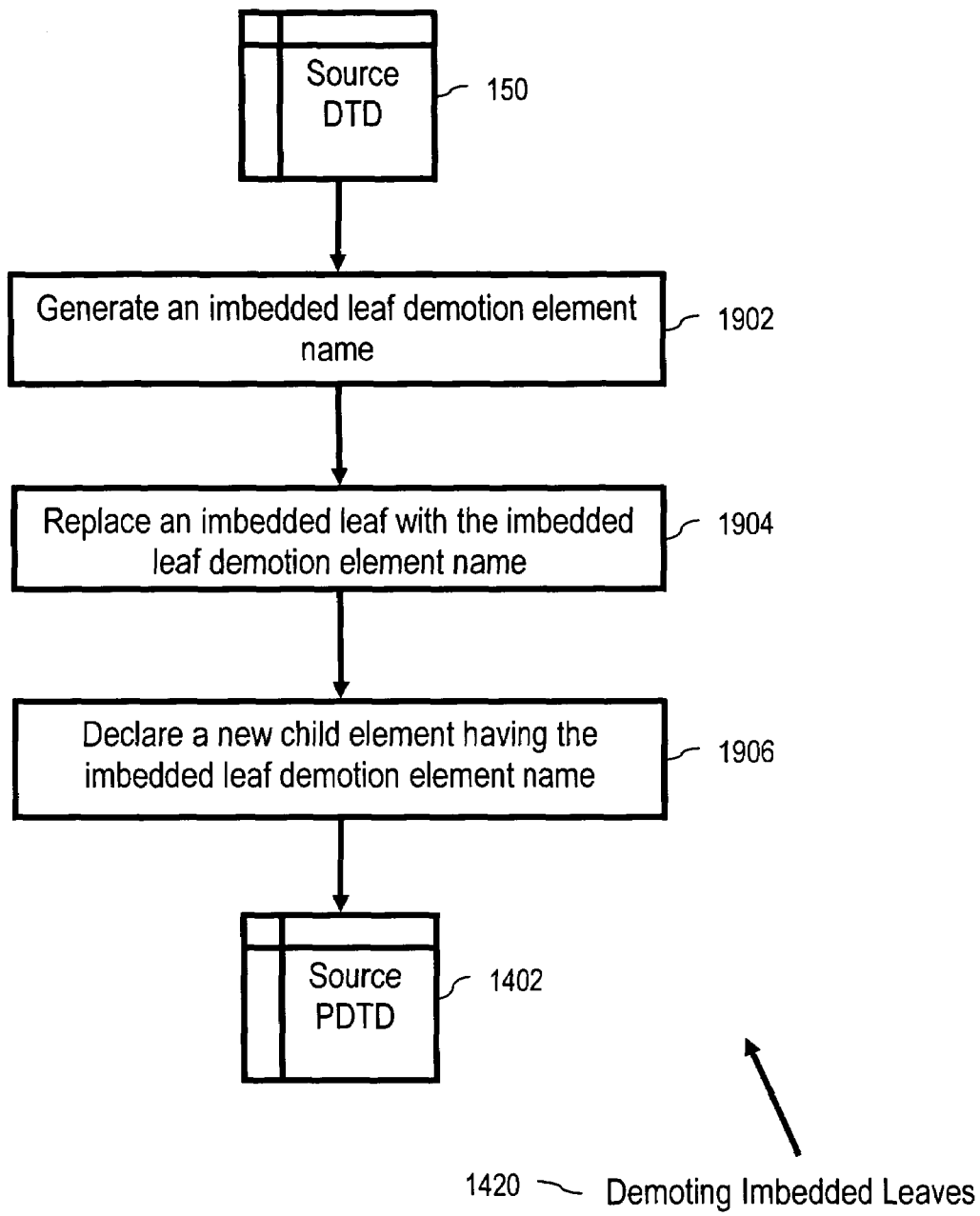
FIG. 19 is a flow chart depicting a method of demoting imbedded leaves.

FIG. 19 sets forth a flow chart depicting a method of demoting (1420) imbedded leaves including generating (1902) an imbedded leaf demotion element name, such as, for example, "IMPCDATA." The method of FIG. 19 includes replacing (1904) a imbedded leaf with the imbedded leaf demotion element name and declaring (1906) a new child element having as its element name the imbedded leaf demotion element name and having as its content #PCDATA. The imbedded leaf demotion element name typically has a form that identifies the new child element as a imbedded leaf demotion child, such as, for example, "IMPCDATA."

Demoting (1418 on FIG. 18) compound repetitions and demoting (1420) imbedded leaves can be implemented, for example, in accordance with the following pseudocode:

if imbedded leaves exist add a new elementdecl "<!ELEMENT IMPCDATA (#PCDATA)>";
let i=1;
let s be the first imbedded compound repetition;
iterate while s has a referent(
    replace s with "IMREP"+i+"+";
    remove the last '+' from s;
    add a new elementdecl "<!ELEMENT IMREP"+i+" "+s+">";
    increment i by 1;
    let s be the first imbedded compound repetition)
remove any unnecessary parentheses in singleton repetitions.

If the generated element Names are already in use, distinctive variations are employed. For example, let n be the first integer for which the string "IM"+n does not occur in the original DTD. Use "IM"+n+"SEQ" in place of "IMSEQ", "IM"+"n"+"REP" in place of "IMREP", and "IM"+n+"PCDATA" in place of "IMPCDATA".

Continuing our ongoing DTD example, recall that this is the form of the DTD after converting recursive elements:

<!ELEMENT DOCUMENT ( LANGUAGE , TITLE , TEXT+ , EDITOR+ , AUTHOR+ )>
<!ELEMENT LANGUAGE ( #PCDATA )>
<!ELEMENT TITLE ( #PCDATA )>
<!ELEMENT TEXT ( RECURSION , ( #PCDATA , EMPHASIS )+ )>
<!ELEMENT RECURSION ( #PCDATA )>
<!ELEMENT EMPHASIS (IMEMPTY+)>
<!ELEMENT IMEMPTY EMPTY>
<!ELEMENT EDITOR ( #PCDATA )>
<!ELEMENT AUTHOR ( #PCDATA )>

After demote imbedded leaves and compound repetitions, our example DTD now has the following form, which, as explained below, is the desired PDTD:

<!ELEMENT DOCUMENT ( LANGUAGE , TITLE , TEXT+ , EDITOR+ , AUTHOR+ )>
<!ELEMENT LANGUAGE ( #PCDATA )>
<!ELEMENT TITLE ( #PCDATA )>
<!ELEMENT TEXT ( RECURSION , IMREP1+ )>
<!ELEMENT IMREP1 ( IMPCDATA , EMPHASIS )>
<!ELEMENT RECURSION ( #PCDATA )>
<!ELEMENT IMPCDATA ( #PCDATA )>
<!ELEMENT EMPHASIS (IMEMPTY+)>
<!ELEMENT IMEMPTY EMPTY>
<!ELEMENT EDITOR ( #PCDATA )>
<!ELEMENT AUTHOR ( #PCDATA )>

At this point in processing our example DTD, processing is complete. That is, in terms of the method of FIG. 14, we have completed transforming a user-supplied DTD (150) satisfying a first XML grammar as reference 1320 on FIG. 13) into a PDTD (1402) satisfying a second XML grammar (as reference 1322 on FIG. 13). The last form of DTD just above is the PDTD satisfying the second, simpler grammar set forth above in this disclosure, namely:

```
PDTD         ::= elementdecl ( S elementdecl )*
elementdecl  ::= '<!ELEMENT' S Name S contentspec '>'
contentspec  ::= ( seq | '( #PCDATA )' | 'EMPTY' )
seq          ::= '(' S Name ('+')? ( S ',' S Name ('+')? )* S ')'
```

The order in which the steps of DTD to PDTD conversion are carried out is not a limitation of the present invention, and some of useful steps are advantageously treated as optional depending on the configuration of particular embodiments. There are various orders and various combinations of optional steps that produce useful results. As an aid to understanding, a further exemplary set of steps, comprising steps 1 through 6 below, for DTD to PDTD is presented here, continuing with reference to FIG. 14:

Step 1: Optionally identify (1404) a root. Note that this optional step can comprise selecting an existing root or creating a new meta-root to cover other roots in embodiments that discover the presence of more than one root in a DTD. For example, in a DTD having two elements that are not descendants of any other elements, that is, the following 'roots':

```
<!ELEMENT Root-1 (SomeItem)>
<!ELEMENT Root-2 (SomeOtherItem)>
``` embodiments can declare and use as the single root for the DTD and the new PDTD:

```
<!ELEMENT SuperRoot (Root-1, Root-2)>
```

In this example, step 1 optionally includes pruning (1406) roots other than a selected root. Pruning roots can comprise deleting them from the DTD or ignoring them in the process of converting the DTD to a PTDT. It should be clear that one sense in which pruning is optional is that it is rendered unnecessary if, in a DTD comprising more than one root, a meta-root or superroot is created to comprise the other roots.

Step 2: Convert (1408) alternations to sequences, that is, convert alternation operators '|' to sequence operators ','. In this example, step 2 includes converting (1410) optional content to mandatory content by replacing the 'zero or more' operator '*' with the 'one or more' operator '+' and deleting occurrences of the 'zero or one' operator '?'.

Step 3: Convert (1412) imbedded sequences that are not compound repetitions by deleting opening and closing imbedded parentheses, and, to the extent that such deletions bring together two 'one or more' operators, that is, two plus marks, delete one of them.

More particularly, given this element declaration having an embedded sequence (EDITOR+, AUTHOR+)+:

```
<!ELEMENT DOCUMENT (TITLE, TEXT, (EDI-
    TOR+, AUTHOR+)+)>,
``` removing imbedded parenthesis yields:

```
<!ELEMENT DOCUMENT (TITLE, TEXT, EDI-
    TOR+, AUTHOR++)>,
``` thus creating a double occurrence of the 'one or more' operator, the plus mark, so that deleting one of the doubled plus marks then yields this:

```
<!ELEMENT DOCUMENT (TITLE, TEXT, EDI-
    TOR+, AUTHOR+)>
``` for the PDTD.

To the extent that a DTD includes imbedded compound repetitions, such as:

```
<!ELEMENT DOCUMENT (TITLE, (TEXT,((EDI-
    TOR+, AUTHOR)+, PUBLISHER))>,
```

Step 3 in this example can include optionally demoting (1418) the imbedded compound repetition (EDITOR+, AUTHOR)+by use of a compound repetition demotion element name, such as, for example, IMSEQ, to produce the following two declarations for the PDTD:

```
<!ELEMENT A (B, IMREP+ ,E)>
<!ELEMENT DOCUMENT (TITLE, TEXT, IMSEQ+,
    PUBLISHER))>,
and
<!ELEMENT IMSEQ (EDITOR+, AUTHOR)>.
```

Demoting (1418) the imbedded compound repetition is said to be optional at this point in this example because it could be carried out also in step 6 below. To the extent that demoting (1418) the imbedded compound repetition is carried out at this point in processing, a particular form of compound repetition demotion element name such as IMSEQ may advantageously be utilized to distinguish the point in processing where the demotion of the imbedded compound repetition was carried out. To the extent this demotion is carried out later, such as in step 6, it is advantageous to utilize some other demotion element name, such as, for example IMREP, to mark the point in processing where the demotion is carried out.

Step 4: Demote (1414) attributes from element declarations, including creating attribute demotion elements, deleting the attribute definitions and attribute lists of the attribute definitions, and so on. Step 5: Convert (1416) recursions to repetitions, using RECURSION and IMEMPTY, and so on.

Step 6: In this example, to the extent that imbedded sequences were not converted in Step 3, step 6 advantageously includes converting (1412) convert imbedded sequences that are not compound repetitions, deleting parenthesis, and deleting any resulting double plus marks. To the extent that imbedded compound repetitions exist that were not demoted in step 3, step 6 can advantageously include demoting (1418) imbedded compound repetitions, using a compound repetition demotion element name different from any compound repetition demotion element name that might have been used in step 3, if any, such as, for example, "IMREP," if "IMSEQ" were used in step 3. Step 6 also advantageously includes demoting (1420) any imbedded leaves still present in the source DTD under conversion, including using IMPCDATA as an imbedded leaf demotion element name, and so on.

XML to XML Document Transformation According to Graphically Specified Rules

Above in this disclosure we described how to transform DTDs into forms suitable for display as trees, forms called 'Presentation DTDs' or 'PDTDs,' We described using graphical specification methods to produce a set of rules for transforming an XML source document that satisfies one PDTD into an XML target document that satisfies another PDTD. We now describe methods for transforming an XML source document that satisfies a source DTD into an XML target document that satisfies a target DTD by first transforming the source document into a source document tree that satisfies a corresponding source PDTD, then transforming this document according to a set of rules into a target document tree satisfying a target PDTD, and finally transforming the resulting target document tree into an XML target document that satisfies the target DTD. For this purpose, we assume the existence of a source DTD named sourceDTD, a target DTD named targetDTD, PDTDs named source_as_tree_DTD and target_as_tree_DTD, and a set of XML-XML transformation rules named ruleset, the ruleset referring to a set of named target DTD contexts, and each rule being produced by our graphic specification techniques operating on source_as_tree_DTD and target_as_tree_DTD.

FIG. 13 is a data flow and relational diagram depicting a further exemplary embodiment of methods and structures, useful in various embodiments of the present invention, for graphic specification of mapping rules, DTD transformation, and document transformation. Among other things, FIG. 13 depicts an exemplary method for transforming a source XML document (158) satisfying a source DTD (150) into a target XML document (160) satisfying a target DTD (152). The method of XML document transformation depicted in FIG. 13 includes transforming (1312) the source XML document (158) into a source document tree (1306), wherein the source XML document (158) satisfies a first XML grammar (1320) and the source document tree (1306) satisfies a second XML grammar (1322). The document transformation method of FIG. 13 also includes converting (162) the source document tree (1306) into a target document tree (1308) satisfying the second XML grammar (1322) and transforming (1314) the target document tree (1308) into the target XML document (160), wherein the target XML document (160) satisfies the first XML grammar (1320).

For use in further discussion and explanation, we provide an example XML notation for rulesets and target DTD contexts. Many other notations and representations would serve the same purpose. Our exemplary notations is:

Document Transformation, from XML Source Document to Source Document Tree

Figure 20:
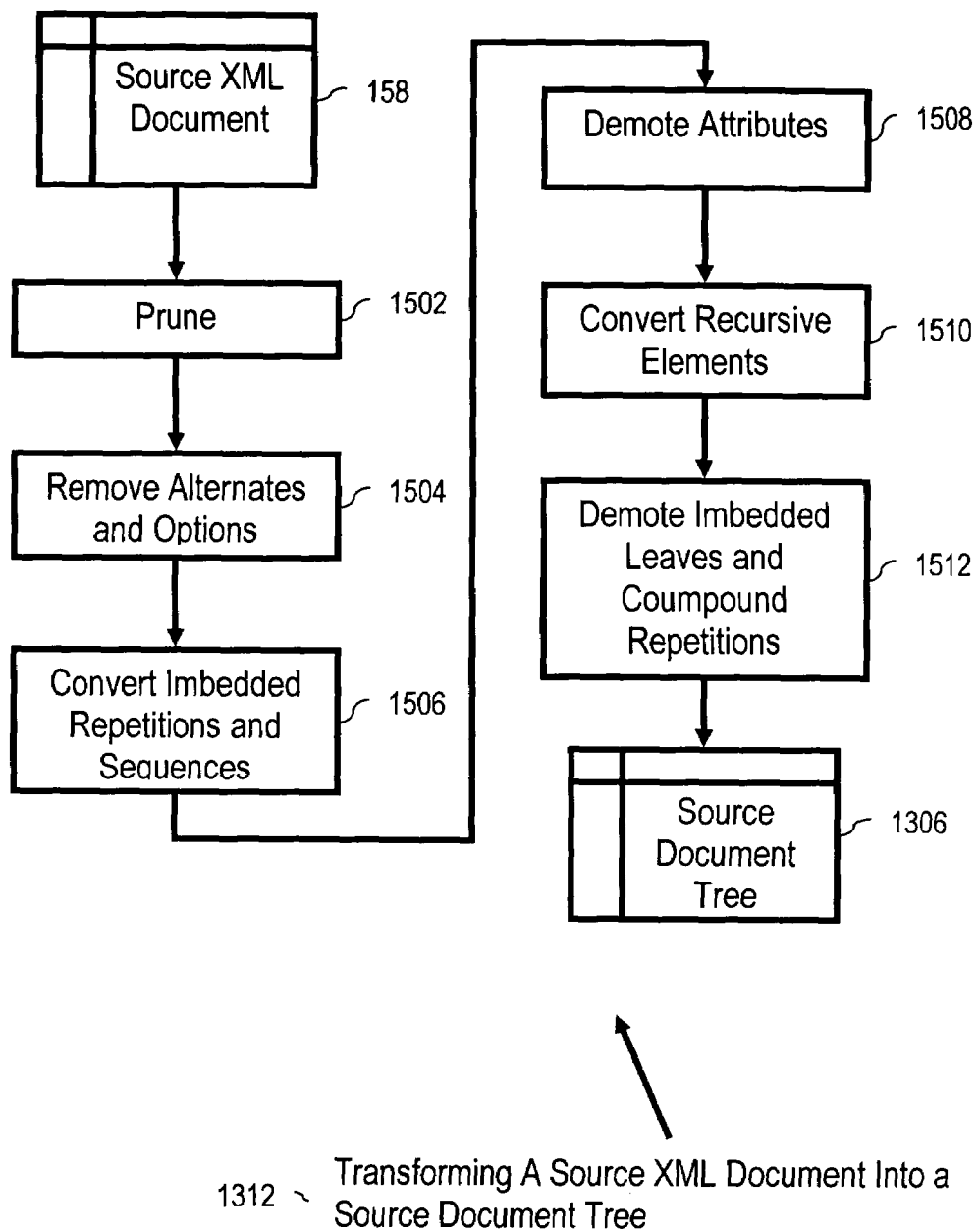
FIG. 20 is a flow chart depicting an exemplary method of transforming a source XML document into a source document tree.

The document transformation method of FIG. 13 includes transforming (1312) the source XML document (158) into a source document tree (1306). FIG. 20 sets forth a flow chart depicting an exemplary method of transforming (1312) a source XML document into a source document tree. The method of FIG. 20 includes pruning (1502) the source XML document, removing (1504) alternates and options, converting (1506) imbedded repetitions and sequences, demoting (1508) attributes, converting (1510) recursive child elements, and demoting (1512) imbedded leaves and compound repetitions.

Pruning (1502) the source XML document typically includes selecting a root element for the target XML document and deleting all XML elements that are outside matching root tags in the source XML document. This pruning step is a parallel step in the document domain as the earlier pruning step describes for the DTD domain. In this pruning step for XML documents, a 'matching root tag' is a matching set of a start-tag and an end-tag identifying an XML element that is not included in any other XML element in the source XML document. An XML document, consistent with the definition in the XML Recommendation, is a set of XML elements identified by the presence of an XML prolog. There is no particular correspondence between XML documents and files. One XML document may encompass several files. One file may contain several XML documents. Note also that the XML prolog is definitional. There is no particular limitation in the present invention that an XML prolog be included in processing.

Regarding invertibility, there is no limitation that pruning be invertible. It is well within the invention to process one XML document at a time with only one root element. Full invertibility of pruning implies processing forests in addition to trees, an approach that is optional, not required, but well within the scope of the invention.

An example of pruning in the document domain is the following. Assume beginning with the following XML document (the line numbers below are for reference and not part of the XML):

| | |
|---|---|
| 1. | <rootElement> |
| 2. | <child1>data for child1</child1> |
| 3. | <child2>data for child2</child2> |
| 4. | </rootElement> |
| 5. | <anyOtherElement>data</anyOtherElement> |

```
<!ELEMENT Ruleset (RULE+)>
<!ELEMENT RULE ( TARGET_DTD_CONTEXT , TARGET_ELEMENT,
    VPROGRAM )>
<!ELEMENT VPROGRAM ( #PCDATA | REFERENCE )+ >
<!ELEMENT REFERENCE ( SOURCE_ELEMENT , BPROGRAM? )>
<!ELEMENT BPROGRAM ( #PCDATA | REFERENCE )+ >
<!ELEMENT TARGET_DTD_CONTEXT ( #PCDATA )>
<!ELEMENT TARGET_ELEMENT ( #PCDATA )>
<!ELEMENT TargetDTDContext (TARGET_DTD , SOURCE_DTD , ASSOCIATE* )>
<!ELEMENT ASSOCIATE ( TARGET_ELEMENT , SOURCE_ELEMENT )>
<!ELEMENT TARGET_DTD ( #PCDATA )>
<!ELEMENT SOURCE_DTD ( #PCDATA )>
<!ELEMENT TARGET_ELEMENT ( #PCDATA )>
<!ELEMENT TARGET_ELEMENT ( #PCDATA )>
```

-continued

```
6.      <rootElement>
7.      </rootElement>
```

Then prune by removing all lines after line 4, resulting in the following pruned XML document:

```
8.      <rootElement>
9.      <child1>data for child1</child1>
10.     <child2>data for child2</child2>
11.     </rootElement>
```

Removing (1504) alternates and options typically includes adding start-tags and end-tags with null content for each missing, non-recursive XML element in the source XML document, including identifying missing, non-recursive elements in dependence upon the source DTD.

More particularly, removing alternates and options typically includes adding start-tags and endtags, with a reserved symbol representing null between tags for leaves, for each missing element, except for missing recursive calls which should be ignored. A 'missing element' is an element declared as optional or alternative in a DTD that in fact has been excluded from an XML document that satisfies the DTD. The use of a reserved symbol gives this step invertibility. The reserved null symbol is one that does not otherwise occur as a value in the XML document, although it may occur as a substring of a value, e.g., "_" or "_"+n+"_".

An example of removing alternates and options is the following. Assume beginning with the following XML segment:

```
<root>
<A>
<B>data for B</B>
</A>
</root>
``` satisfying the DTD

```
<!ELEMENT root (A,D?)>
<!ELEMENT A (B | C)>
``` so that B and C are alternates and D is optional. Then removing alternates and options results in the following XML segment:

```
<root>
<A>
<B>data for B</B>
<C>_</C>
</A>
<D>_</D>
</root>
```

Converting (1506) imbedded repetitions and sequences typically includes creating repeating children elements, adding start-tags and end-tags for children elements, and deleting imbedded repetitions and sequences.

Here, as a further aid to understanding, is an example of converting (1506) imbedded repetitions and sequences. If we converted the imbedded sequence in

<!ELEMENT A (B, (C, D), E)> by simply removing parentheses to produce

<!ELEMENT A (B, C, D, E)> then there is no work to do in the document transformation. Likewise, if we converted the imbedded singleton repetition in

<!ELEMENT A (B, (C)+, D)> by simply removing parentheses to produce

<!ELEMENT A (B, C+, D)> then there is no work to do in the document transformation. If, however, we converted the imbedded compound repetition in

<!ELEMENT A (B, (C, D)+, E)> by generating a new element IMREP and producing

```
<!ELEMENT A (B, IMREP+, E)>
<!ELEMENT IMREP (C, D)>
``` then we would convert the XML segment

```
<A>
<B>data for B</B>
<C>data1 for C</C>
<D>data1 for D</D>
<C>data2 for C</C>
<D>data2 for D</D>
<E>data for E</E>
</A>
``` into the XML segment

```
<A>
<B>data for B</B>
<IMREP>
<C>data1 for C</C>
<D>data1 for D</D>
</IMREP>
<IMREP>
<C>data2 for C</C>
<D>data2 for D</D>
</IMREP>
<E>data for E</E>
</A>.
```

Demoting (1508) attributes of elements having attributes to children of the elements having attributes typically includes adding start- and end-tags identifying new attribute demotion elements incorporating attribute names as the names of the new elements, inserting attribute values as element values, and deleting the attributes. In other words, for each attribute, add start-tags and end-tags separated by a value, if a value is present, or separated by the reserved symbol for null if no value is present. Note that the value at this point is encoded as PCDATA, and the encoding is invertible to produce the attribute value.

An example of demoting attributes is the following. Assume beginning with the following XML segment:

```
<A B="value for B" C="value for C">
value for A
</A>
``` in which B and C are attributes. Then demoting attributes results in the following XML segment:

```
<A>
    <B>value for B</B>
    <C>value for C</C>
    value for A
</A>
```

Converting (1510) recursive children elements in DTD declarations to non-recursive children typically includes adding new recursion expansion elements having names identifying them as recursion expansion elements, names such as, for example, 'RECURSION.' More particularly, converting recursive elements can be implemented, for example, in accordance with the following pseudocode:

```
for each element Name r that has been declared recursively(
    add <RECURSION>,</RECURSION> tags separated by the
    reserved symbol for null
    after each occurrence of <r>;
    for each string e beginning with <r>, ending with </r>, and
    nested inside a larger such
    string(
        encode the path to e in a string and replace the null
    symbol between the
        "RECURSION" tags at the beginning of e with this string;
        move e so that it occurs as a top level repetition of r;))
```

As will be described in more detail below, the encoded path is used to invert the recursion conversion.

An example of converting recursions to repetitions is the following. Assume beginning with the following XML segment:

```
<A>
    <B>
        <A>
            <B>
                <A>value for A</A>
            </B>
        </A>
    </B>
</A>
```

Converting the recursive references to A into repetitions results in the following XML segment:

```
<A>
    <RECURSION>_</RECURSION>
    <B>
```

-continued

```
        <IMEMPTY/>
    </B>
</A>
<A>
<RECURSION>A1,B1</RECURSION>
    <B>
        <IMEMPTY/>
    </B>
</A>
<A>
<RECURSION>A1,B1,A1,B1</RECURSION>
value for A
</A>.
```

Demoting (1512) imbedded leaves and compound repetitions typically includes adding an imbedded leaf demotion tag, such as, for example, <IMPCDATA>, to demote imbedded leaves and adding a compound repetition demotion tag, such as, for example, <IMREPn> tags, to demote compound repetitions. An example of demoting (1512) imbedded leaves and compound repetitions is the following. Assume beginning with the following XML segment:

```
<A>
    <B>data1 for B</B>
    <C>data1 for C</C>
    <B>data2 for B</B>
    <C>data2 for C</C>
    data for A
</A>
``` in which the next to the last line is an imbedded leaf and (B,C)+ is a compound repetition in the corresponding DTD. Then demoting imbedded leaves and compound repetitions results in the following XML segment:

```
<A>
    <IMREP>
        <B>data1 for B</B>
        <C>data1 for C</C>
    </IMREP>
    <IMREP>
        <B>data2 for B</B>
        <C>data2 for C</C>
    </IMREP>
    <IMPCDATA>data for A</IMPCDATA>
</A>
```

Because each of these steps (except pruning) is invertible, the entire transformation is invertible. Pruning and demoting imbedded leaves in particular are optional steps designed to give a very simple PDTD or display tree. The remaining method steps work without them. If pruning is not used, the resulting document tree may result in a display that is a forest rather than a tree. If demoting imbedded leaves is not used, the resulting document tree may display some leaves without names. The order in which the steps are carried out is not a limitation of the present invention. There are various orders that produce the same results. It is particularly advantageous that embodiments according to the present invention demote attributes invertibly at the document level. Invertibility means that no substantive information is lost during a document transformation to an interim form matching a simpler grammar, application of transformation rules, and inverse transformation back to full XML grammar. Optional insertions of white space may be lost, but required white space is preserved.

Ruleset Application

FIG. 13 is a data flow and relational diagram depicting a further exemplary embodiment of methods and structures, useful in various embodiments of the present invention, for graphic specification of mapping rules, DTD transformation, and document transformation. Among other things, FIG. 13 depicts an exemplary method of document transformation, a method for transforming a source document tree into a target document tree. This disclosure, in the following discussion, explains document transformation by reference to the following exemplary data structures:

The following discussion of document transformation uses this example source PDTD, sometimes referred to by the abbreviation "SP":

```
<!ELEMENT A (B+, G)>
<!ELEMENT B (C+, F)>
<!ELEMENT C (D, E)>
<!ELEMENT D (#PCDATA)>
<!ELEMENT E (#PCDATA)>
<!ELEMENT F (#PCDATA)>
<!ELEMENT G (#PCDATA)>
```

The following discussion of document transformation uses this example source document tree:

```
<A>
 <B>
  <C>
   <D>111</D>
   <E>112</E>
  </C>
  <C>
   <D>121</D>
   <E>122</E>
  </C>
  <F>1</F>
 </B>
 <B>
  <C>
   <D>211</D>
   <E>212</E>
  </C>
  <C>
   <D>221</D>
   <E>222</E>
  </C>
  <F>2</F>
 </B>
 <G>111</G>
</A>
```

The following discussion of document transformation uses this example target PDTD, sometime referred by the abbreviation "TP":

```
<!ELEMENT P (Q+, U+)>
<!ELEMENT Q (R, S, T)>
<!ELEMENT R (#PCDATA)>
<!ELEMENT S (#PCDATA)>
<!ELEMENT T (#PCDATA)>
<!ELEMENT U (V, W)>
```

```
<!ELEMENT V (#PCDATA)>
<!ELEMENT W (#PCDATA)>
```

The following discussion of document transformation refers to an example ruleset, set forth below, which in turn refers to the following example target DTD contexts:

```
Tdc1:
    <TargetDTDContext>
        <TARGET_DTD>TP</TARGET_DTD>
        <SOURCE_DTD>SP</SOURCE_DTD>
        <ASSOCIATE>
            <TARGET_ELEMENT>Q</TARGET_ELEMENT>
            <SOURCE_ELEMENT>B</SOURCE_ELEMENT>
        </ASSOCIATE>
    </TargetDTDContext>
Tdc2:
    <TargetDTDContext>
        <TARGET_DTD>TP</TARGET_DTD>
        <SOURCE_DTD>SP</SOURCE_DTD>
        <ASSOCIATE>
            <TARGET_ELEMENT>U</TARGET_ELEMENT>
            <SOURCE_ELEMENT>B</SOURCE_ELEMENT>
        </ASSOCIATE>
    </TargetDTDContext>
```

The following discussion of document transformation refers to the following example ruleset:

```
<Ruleset>
    <RULE>
        <TARGET_DTD_CONTEXT>Tdc1</TARGET_DTD_CONTEXT>
        <TARGET_ELEMENT>R</TARGET_ELEMENT>
        <VPROGRAM>
        return
            <REFERENCE>
                <SOURCE_ELEMENT>D</SOURCE_ELEMENT>
            </REFERENCE>
        </VPROGRAM>
    </RULE>
    <RULE>
        <TARGET_DTD_CONTEXT>Tdc1</TARGET_DTD_CONTEXT>
        <TARGET_ELEMENT>S</TARGET_ELEMENT>
        <VPROGRAM>
        return
            <REFERENCE>
                <SOURCE_ELEMENT>E</SOURCE_ELEMENT>
            </REFERENCE>
        </VPROGRAM>
    </RULE>
    <RULE>
        <TARGET_DTD_CONTEXT>Tdc1</TARGET_DTD_CONTEXT>
        <TARGET_ELEMENT>R</TARGET_ELEMENT>
        <VPROGRAM>
        return
            <REFERENCE>
                <SOURCE_ELEMENT>F</SOURCE_ELEMENT>
            </REFERENCE>
            +
            <REFERENCE>
                <SOURCE_ELEMENT>G</SOURCE_ELEMENT>
            </REFERENCE>
            ;
        </VPROGRAM>
    </RULE>
    <RULE>
        <TARGET_DTD_CONTEXT>Tdc2</TARGET_DTD_CONTEXT>
```

-continued
```
        <TARGET_ELEMENT>V</TARGET_ELEMENT>
        <VPROGRAM>
        if(
        <REFERENCE>
        <SOURCE_ELEMENT>D</SOURCE_ELEMENT>
        </REFERENCE>
        .equals(
        <REFERENCE>
        <SOURCE_ELEMENT>G</SOURCE_ELEMENT>
        </REFERENCE>
        )) return
        <REFERENCE>
        <SOURCE_ELEMENT>E</SOURCE_ELEMENT>
        </REFERENCE>
        ; else return "";
        </VPROGRAM>
    </RULE>
    <RULE>
        <TARGET_DTD_CONTEXT>Tdc2</TARGET_
        DTD_CONTEXT>
        <TARGET_ELEMENT>W</TARGET_ELEMENT>
        <VPROGRAM>
        return
        <REFERENCE>
        <SOURCE_ELEMENT>F</SOURCE_ELEMENT>
        </REFERENCE>
        </VPROGRAM>
    </RULE>
</Ruleset>
```

Figure 21:
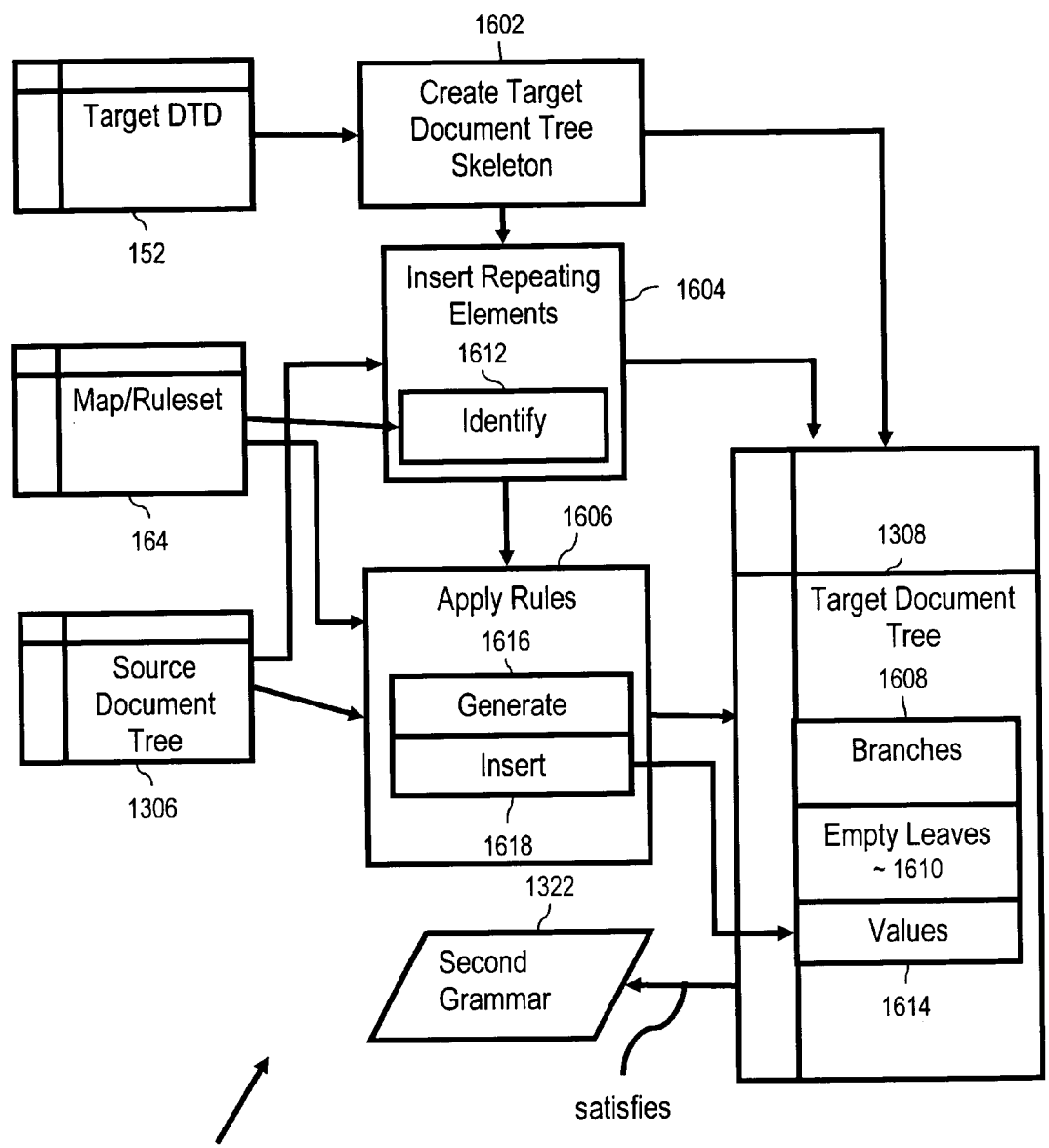
FIG. 21 is a flow chart depicting an exemplary method of converting a source document tree into a target document tree.

The document transformation method of FIG. 13 includes converting (162) a source document tree (1306) into a target document tree (1308). FIG. 21 sets forth a flow chart depicting an exemplary method of converting (162) a source document tree (1306) into a target document tree (1308) that includes creating (1602) the target document tree (1308) in a form that satisfies the second XML grammar (1322) and has tags containing only branches (1608) of children tags and leaves (1610) with null content. The form of the target document tree having tags containing only branches and leaves with the null symbol as value (an empty tag of the form, e.g. <IMEMPTY/> with no value is used when the corresponding element is declared EMPTY) is often referred to as a 'skeleton.'

For clarity in the following explanation, although it is not a limitation of the invention, we assume that all document element Names are unique. In the examples to follow, we sometimes refer to document elements by their complete path from root to element.

Creating the skeleton target skeleton, is typically carried out in the manner described by the following pseudocode:

Let s be the string consisting of a start-tag for the root followed by an end-tag for the root;
Let t be the first substring of s consisting of a start-tag followed immediately by the corresponding end-tag;
Iterate while t has a referent

```
{
    If the element name of t is declared as
    #PCDATA in the PDTD, insert a null
        symbol between the start- and end-tags;
    Else if the element name of t is declared as
    a sequence in the PDTD, insert start-
        and end-tags for each child;
    Else if the element name of t is declared as
    EMPTY in the PDTD, convert t to an
        empty tag by dropping the end-tag and
        inserting '/'as the next to last
        character of the start-tag;
```

-continued
```
    Let t be the first substring of s consisting
        of a start-tag followed immediately by
            the corresponding end-tag;
}
```

In our example, the skeleton produced by this method will be:

```
<P>
    <Q>
        <R>_</R>
        <S>_</S>
        <T>_</T>
    </Q>
    <U>
        <V>_</V>
        <W>_</W>
    </U>
</P>
```

Create Target Document Tree Skeleton and Expand it to Create a Target Document Tree The target document tree skeleton is the document with the reserved null symbol at every leaf that would satisfy the result of removing every '+' from the target document tree. The method of FIG. 21 includes inserting (1604) into the target document tree (1308) repeating elements in dependence upon corresponding element of the source document tree (1306), including identifying (1612) the corresponding elements from the transformation rules (164). Inserting target document tree (1308) repeating elements in dependence upon corresponding elements of the source document tree (1306) can be implemented, for example, by counting the number of occurrences of a corresponding source element and putting that number of blank target elements into the target skeleton.

The purpose is to arrange for the sources of repetition in the target document as specified by the Target DTD Contexts. The Associate pairs of a Target DTD Context describe a mapping from a sequence of nested repetitions in the source to a sequence of nested repetitions in the target. For each Target DTD Context tdcn in the ruleset, use the associate pairs of tdcn to construct a sequence of restrictions of source_as_tree_Doc and to expand the skeleton to include repetitions corresponding to each restriction. A "restriction" is a document produced from source_as_tree_Doc by successive removal of blocks. A block is a portion of the document starting with a start-tag, ending with a corresponding end-tag, and containing no other occurrences of either tag.

The process is defined by induction on the number of Associate pairs (T(1),S(1)),(T(2),S(2)),etc. If there are no pairs, then evaluation is done using source_as_tree_Doc. Assume there is at least one pair. If S(1) is the null symbol, then source_as_tree_Doc is the restriction corresponding to S(1) and it is associated with one new skeleton T(1) block, the original skeleton T(1) block is discarded if it still exists. If S(1) is a source element such that T(1) and S(1) are associated. By assumption T(1) is the repeating element closest to the root. If x is an element, an x block is a block beginning with <x> and ending with </x>. For each S(1) block, create a restriction in which it is the only S(1) block.

For each such restriction, create every restriction with no multiple occurrences of blocks inside the S(1) block, ignoring multiple occurrences of an S(2) block (if any, where S(2) is the source element associated with the second target element T(2)). The resulting set of restrictions is the set of restrictions corresponding to S(1). Each one is associated with a new skeleton T(1) block in the skeleton target. If the original skeleton T(1) block still exists, it is discarded.

Now assume that the set of restrictions corresponding to S(n) has been produced and each has been associated with a skeleton T(n) block. If there is no T(n+1), we are done. Assume T(n+1) exists. Then if S(n+1) is "_", then the same set of restrictions corresponds to S(n+1) and each is associated with the corresponding single skeleton T(n+1) block. If S(n+1) is a source element, then for each restriction corresponding to S(n) and for each S(n+1) block s, create a restriction in which s is the only S(n+1) block. For each such restriction, create every restriction with no multiple occurrences of blocks inside the S(n+1) block, ignoring multiple occurrences of an S(n+2) block (if any). The resulting set of restrictions is the set of restrictions corresponding to S(n+1). Each one is associated with a new skeleton T(n+1) block inside the corresponding skeleton T(n) block.

In the exemplary target DTD context "Tdc1," there is just one associated pair: (Q,B). In exemplary target DTD context "Tdc2," there is just one associated pair: (U,B). In both cases the set of restrictions is as follows:

1.
```
<A>
    <B>
        <C>
            <D>111</D>
            <E>112</E>
        </C>
        <F>1</F>
    </B>
    <G>111</G>
</A>
```
2.
```
<A>
    <B>
        <C>
            <D>121</D>
            <E>122</E>
        </C>
        <F>1</F>
    </B>
    <G>111</G>
</A>
```
3.
```
<A>
    <B>
        <C>
            <D>211</D>
            <E>212</E>
        </C>
        <F>2</F>
    </B>
    <G>111</G>
</A>
```
4.
```
<A>
    <B>
        <C>
            <D>221</D>
            <E>222</E>
        </C>
        <F>2</F>
    </B>
    <G>111</G>
</A>
```

The skeleton is expanded to contain four repetitions of each target leaf block for each rule:

```
<P>
    <Q>
        <R>_</R>
        <S>_</S>
        <T>_</T>
    </Q>
    <Q>
        <R>_</R>
        <S>_</S>
        <T>_</T>
    </Q>
    <Q>
        <R>_</R>
        <S>_</S>
        <T>_</T>
    </Q>
    <Q>
        <R>_</R>
        <S>_</S>
        <T>_</T>
    </Q>
    <U>
        <V>_</V>
        <W>_</W>
    </U>
    <U>
        <V>_</V>
        <W>_</W>
    </U>
    <U>
        <V>_</V>
        <W>_</W>
    </U>
    <U>
        <V>_</V>
        <W>_</W>
    </U>
</P>
```

Then values are computed according to the VPROGRAMs of the rules applied to each of the four restrictions. The final result is the following example form of target document tree:

```
<P>
    <Q>
        <R>111</R>
        <S>112</S>
        <T>1111</T>
    </Q>
    <Q>
        <R>121</R>
        <S>122</S>
        <T>1111</T>
    </Q>
    <Q>
        <R>211</R>
        <S>212</S>
        <T>2111</T>
    </Q>
    <Q>
        <R>221</R>
        <S>222</S>
        <T>2111</T>
    </Q>
    <U>
        <V>112</V>
        <W>1</W>
    </U>
</P>
```

Note that the rule with target element V only returns a string value with positive length when source element D equals source element G in the restriction, which only happens in restriction 1; so there is only one V block. Since the rule with target element W has the same target DTD context, there is only one W block.

Appliction of Rules in the Ruleset

The method of FIG. 21 also includes applying (1606) graphically specified transformation rules (164) to elements of the source document tree (1306), including generating (1616) element values (1614) and inserting (1618) the element values into the target document tree (1308). More particularly, the step of applying graphically specified transformation rules to elements of the source document tree is carried out as follows:

Apply the set of rules that have tdcn to each member of the sequence to replace the null symbol in the appropriate target element with the result of the Vprogram in the rule. For each rule with tdcn. Let x be its target element. By the previous construction and the assumption that x is a descendant of T(n) for some n, each skeleton x block (<x>_</x>) is associated with one specific restriction R.

For each skeleton x block use the associated restriction R to evaluate the Vprogram producing a string value v which replaces "_" in the x block. Evaluate each reference with no Bprogram that has a unique value in R. Enumerate as R(1), R(2), etc. the restrictions of R that have no repetitions of any block. In the enumeration step, any consistently applied order may be used provided it exhausts all possibilities.

Iterate until all references are evaluated: Evaluate each reference with a Bprogram that contains no unevaluated references with Bprograms using the first restriction R(i) for which the Bprograms returns true, unless there is no such R(i), in which case, use the null value "_". If the Vprogram returns a string value with positive length, place this value in the x block; otherwise, remove the skeleton x block (and any blocks corresponding to the application of rules with the same target DTD context to this restriction) unless it is the last one and must remain to satisfy target_as_tree_DTD.

Detailed examples of rule application are set forth below in this disclosure.

Figure 22:
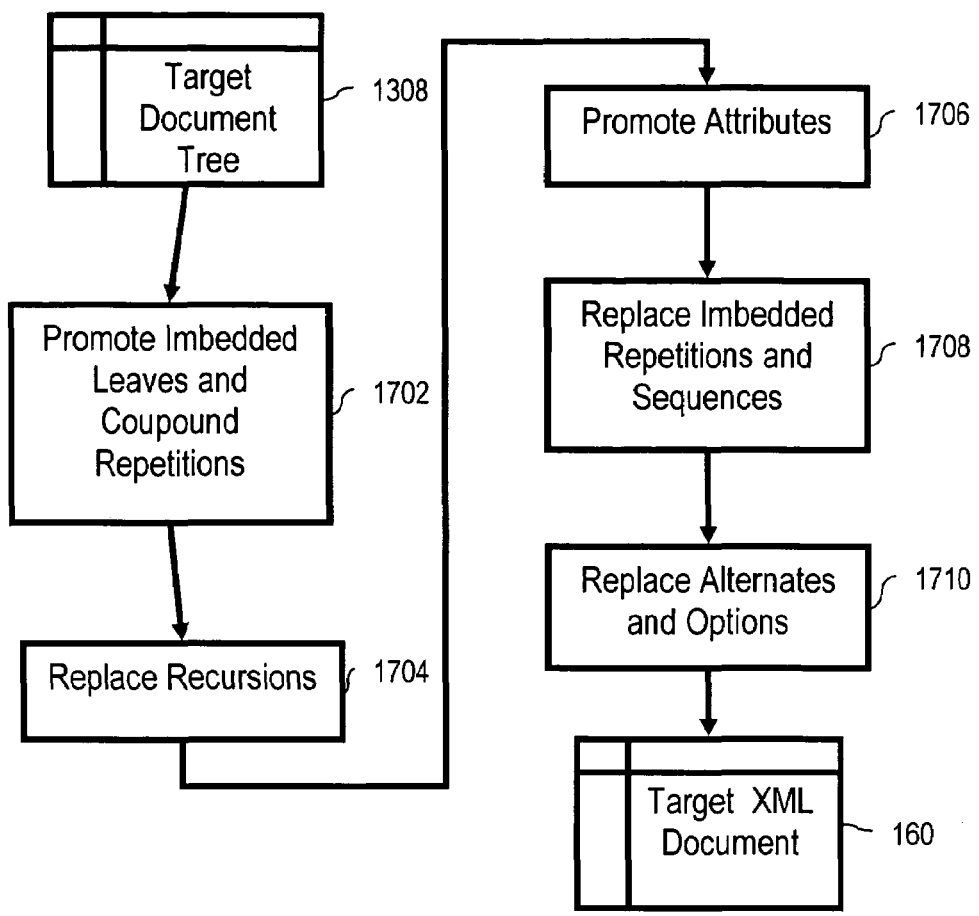
FIG. 22 is a flow chart depicting a method of transforming a target document tree into a target XML document.

Inverse Document Transformation, from Target Document Tree to XML Target Document The document transformation method of FIG. 13 includes transforming (1314) a target document tree (1308) into a target XML document (160). This process is an inverse of the process of transforming (1312) the source XML document (158) into a source document tree (1306). FIG. 22 sets forth a flow chart depicting a method of transforming (1314) a target document tree (1308) into a target XML document (160) that includes promoting (1702) imbedded leaves and compound repetitions, replacing (1704) recursions, promoting (1706) attributes, replacing (1708) imbedded sequences, and replacing (1710) alternates and options.

Promoting (1702) imbedded leaves and compound repetitions typically includes removing IMPCDATA tags and IMREPn tags. Promoting imbedded leaves and compound repetitions is in inverse of demoting imbedded leaves and compound repetitions described in detail above in this disclosure. An example of promoting imbedded leaves and compound repetition is the following. Assume beginning with the following XML segment:

```
<A>
    <IMPCDATA>data</IMPCDATA>
    <B>data for B</B>
    <IMREP>
        <C>data1c</C>
        <D>data1d</D>
    </IMREP>
    <IMREP>
        <C>data2c</C>
        <D>data2d</D>
    </IMREP>
</A>
``` in which <IMPCDATA>data</IMPCDATA> is a block corresponding to a demoted imbedded leaf and

```
<IMREP>
    <C>data1c</C>
    <D>data1d</D>
</IMREP>
<IMREP>
    <C>data2c</C>
    <D>data2d</D>
</IMREP>
``` is a sequence of repeating blocks corresponding to a demoted compound repetition. Then promoting imbedded leaves and compound repetitions results in the following XML segment:

```
<A>
    data
    <B>data for B</B>
    <C>data1c</C>
    <D>data1d</D>
    <C>data2c</C>
    <D>data2d</D>
</A>
```

Replacing (1704) recursions typically includes moving blocks in which the first child is named RECURSION to be attached at a place in the tree indicated by the data content stored between the start- and end-tags for RECURSION and removing the RECURSION blocks. The blocks with shorter paths in the RECURSION block are moved before blocks with longer such paths. Each path expression in a RECURSION block encodes exactly the information needed to determine a unique location for placing the moved block that satisfies the recursive DTD. An example of replacing recursions is the following. Assume a recursive DTD as follows:

```
<!ELEMENT A (R)>
<!ELEMENT R (B, R)>
<!ELEMENT B (#PCDATA)>
```

Assume beginning with the following XML document:

```
<A>
    <R>
        <RECURSION>_</RECURSION>
```

-continued

```
      <B>_</B>
   </R>
   <R>
      <RECURSION>A,R</RECURSION><B>_</B>
   </R>
   <R>
      <RECURSION>A,R,R</RECURSION>
      <B>data</B>
   </R>
</A>
``` in which the R blocks are repetitions encoding recursion. The null RECURSION block is moved producing:

```
<A>
   <R>
      <B>_</B>
   </R>
   <R>
      <RECURSION>A,R</RECURSION>
      <B>_</B>
   </R>
   <R>
      <RECURSION>A,R,R</RECURSION>
      <B>data</B>
   </R>
</A>
```

The next R block (without its RECURSION block) is moved to the position A,R producing:

```
<A>
   <R>
      <B>_</B>
      <R>
         <B>_</B>
      </R>
   </R>
   <R>
      <RECURSION>A,R,R</RECURSION>
      <B>data</B>
   </R>
</A>
```

The last R block (without its RECURSION block) is moved to the position A,R,R producing:

```
<A>
   <R>
      <B>_</B>
      <R>
         <B>_</B>
         <R>
            <B>data</B>
         </R>
      </R>
   </R>
</A>
```

Promoting (1706) attributes typically includes moving attributes back inside element tags. Promoting attributes is an inverse for the process of demoting attributes described in detail above in this disclosure. Promoting attributes is typically carried out by moving attributes back inside their parent element tags and reversing any encoding introduced by the demoting process to make the attribute values PCDATA. An example of promoting attributes is the following. Assume beginning with the following XML segment:

```
<A>
   <B>datab</B>
   <C>datac</C>
</A>
``` in which B is a demoted attribute. Then promoting attributes results in the following XML segment:

```
<A B="datab">
   <C>datac</C>
</A>
```

Replacing (1708) imbedded repetitions and sequences typically includes removing remaining IMSEQn tags. Replacing imbedded repetitions and sequences is an inverse of the process of converting imbedded repetitions and sequences as described in detail above in this disclosure. It works exactly the same way that step (1702) above works.

Replacing (1710) alternates and options typically includes removing optional blocks with null symbol values and removing all but the first of each set of alternatives. Replacing alternates and options is an inverse of the process of converting alternates and options described in detail above in this disclosure. An example of replacing alternates and options is the following. Assume the following target DTD:

```
<!ELEMENT A ((B | C), D?)>
<!ELEMENT B (#PCDATA)>
<!ELEMENT C (#PCDATA)>
<!ELEMENT D (#PCDATA)>
```

Assume beginning with the following XML segment:

```
<A>
   <B>_</B>
   <C>data</C>
   <D>_</D>
</A>
``` in which

```
<B>_</B>
<C>data</C>
``` is a converted alternate and <D>_</D> is a converted option. Then replacing alternates and options results in the following XML segment:

```
<A>
   <C>data</C>
</A>
```

A Further, More Detailed Example of Document Transformation

We now present a further, more detailed example of document transformation, converting the following source XML document having a single root element named "DOCUMENT."

sourceDoc:

```
<DOCUMENT LANGUAGE="English">
  <TITLE>Example</TITLE>
  <CHAPTER>
    <TITLE>Chapter 1</TITLE>
    <SECTION>
      <TEXT>
        This is
        <EMPHASIS>
          <TEXT>
            text from
            <EMPHASIS>
              <TEXT>
                the first section of
              </TEXT>
            </EMPHASIS>
            the first chapter.
          </TEXT>
        </EMPHASIS>
      </TEXT>
    </SECTION>
    <SECTION>
      <TEXT>
        This is unemphasized text from ch. 1: sec. 2.
      </TEXT>
    </SECTION>
    <AUTHOR>Arther Chapwon</AUTHOR>
  </CHAPTER>
  <CHAPTER>
    <TITLE>Chapter 2</TITLE>
    <SECTION>
      <TEXT>
        This is unemphasized text from ch. 2: sec. 1.
      </TEXT>
    </SECTION>
    <AUTHOR>Arther Chaptoo</AUTHOR>
    <AUTHOR>Bill Chaptoo</AUTHOR>
  </CHAPTER>
  <EDITOR>Ed One</EDITOR>
  <EDITOR>Ed Two</EDITOR>
</DOCUMENT>
```

The source XML document of the current example satisfies the following source DTD:

Source DTD (root element named "DOCUMENT"):

```
<!ELEMENT DOCUMENT (TITLE , ABSTRACT? ,
CHAPTER*, (EDITOR* |
AUTHOR*)? )>
<!ATTLIST DOCUMENT LANGUAGE ( English ,
Other ) #IMPLIED>
<!ELEMENT TITLE ( #PCDATA )>
<!ELEMENT ABSTRACT ( SECTION )>
<!ELEMENT CHAPTER ( TITLE , SECTION+,
AUTHOR* )>
<!ELEMENT SECTION ( TITLE? , TEXT )>
<!ELEMENT TEXT ( #PCDATA |
EMPHASIS )*>
<!ELEMENT EMPHASIS ( TEXT* )>
<!ELEMENT EDITOR ( #PCDATA )>
<!ELEMENT AUTHOR ( #PCDATA )>
```

Converting the source DTD to a PDTD results in the following source PDTD:

source_as_tree_DTD:

```
<!ELEMENT DOCUMENT (LANGUAGE , TITLE ,
ABSTRACT , CHAPTER+,
EDITOR+ , AUTHOR+ )>
<!ELEMENT LANGUAGE ( #PCDATA )>
<!ELEMENT TITLE ( #PCDATA )>
<!ELEMENT ABSTRACT ( SECTION )>
<!ELEMENT CHAPTER ( TITLE , SECTION+ ,
AUTHOR+ )>
<!ELEMENT SECTION ( TITLE , TEXT+ )>
<!ELEMENT TEXT ( RECURSION , IMREP1+ )>
<!ELEMENT IMREP1 (IMPCDATA , EMPHASIS )>
<!ELEMENT RECURSION ( #PCDATA )>
<!ELEMENT IMPCDATA ( #PCDATA )>
<!ELEMENT EMPHASIS IMEMPTY+>
<!ELEMENT IMEMPTY EMPTY>
<!ELEMENT EDITOR ( #PCDATA )>
<!ELEMENT AUTHOR ( #PCDATA )>
```

The target DTD to be satisfied by the source XML document after conversions to a target document is the following, a target DTD having a single root element named "PAPER":

targetDTD (root element named "PAPER"):

```
<!ELEMENT PAPER ( TITLE , AUTHINDEX* ,
SECTION+ )>
<!ELEMENT TITLE (#PCDATA)>
<!ELEMENT AUTHINDEX ( AUTHOR , CHAPTER_
TITLE )>
<!ELEMENT SECTION ( TITLE?, CHAPTER_
TITLE? , TEXT+ )>
<!ELEMENT CHAPTER_TITLE ( #PCDATA )>
<!ELEMENT AUTHOR ( #PCDATA )>
<!ELEMENT TEXT ( EMPHASIS_LEVEL,
#PCDATA )>
<!ELEMENT EMPHASIS_LEVEL ( #PCDATA )>
```

The target PDTD resulting from conversions of the target DTD is the following:

target_as_tree_DTD:

```
<!ELEMENT PAPER ( TITLE , AUTHINDEX+ ,
SECTION+ )>
<!ELEMENT TITLE ( #PCDATA )>
<!ELEMENT AUTHINDEX ( AUTHOR , CHAPTER_
TITLE )>
<!ELEMENT SECTION ( TITLE , CHAPTER_
TITLE , TEXT+ )>
<!ELEMENT CHAPTER_TITLE ( #PCDATA )>
<!ELEMENT AUTHOR ( #PCDATA )>
<!ELEMENT TEXT ( EMPHASIS_LEVEL,
IMPCDATA )>
<!ELEMENT IMPCDATA ( #PCDATA )>
<!ELEMENT EMPHASIS_LEVEL ( #PCDATA )>
```

The ruleset for the current example, set forth below, makes use of the following target DTD contexts:

```
tdc1:
<TARGET_DTD>target_as_tree_DTD</TARGET_DTD>
<SOURCE_DTD>source_as_tree_DTD</SOURCE_DTD>
tdc2:
<TARGET_DTD>target_as_tree_DTD</TARGET_DTD>
<SOURCE_DTD>source_as_tree_DTD</SOURCE_DTD>
```

-continued

```
<ASSOCIATE>
 <TARGET_ELEMENT>PAPER.AUTHINDEX</TARGET_
 ELEMENT>
 <SOURCE_ELEMENT>DOCUMENT.AUTHOR </SOURCE_
 ELEMENT>
</ASSOCIATE>
tdc3:
<TARGET_DTD>target_as_tree_DTD</TARGET_DTD>
<SOURCE_DTD>source_as_tree_DTD</SOURCE_DTD>
<ASSOCIATE>
 <TARGET_ELEMENT>PAPER.AUTHINDEX</TARGET_
 ELEMENT>
 <SOURCE_ELEMENT>DOCUMENT.EDITOR </SOURCE_
 ELEMENT>
</ASSOCIATE>
tdc4:
<TARGET_DTD>target_as_tree_DTD</TARGET_DTD>
<SOURCE_DTD>source_as_tree_DTD</SOURCE_DTD>
<ASSOCIATE>
 <TARGET_ELEMENT>PAPER.AUTHINDEX</TARGET_
 ELEMENT>
 <SOURCE_ELEMENT>DOCUMENT.CHAPTER.
```

-continued

```
 AUTHOR</SOURCE_ELEMENT>
</ASSOCIATE>
tdc5:
<TARGET_DTD>target_as_tree_DTD</TARGET_DTD>
<SOURCE_DTD>source_as_tree_DTD</SOURCE_DTD>
<ASSOCIATE>
 <TARGET_ELEMENT>PAPER.SECTION</TARGET_
 ELEMENT>
 <SOURCE_ELEMENT>DOCUMENT.CHAPTER</SOURCE_
 ELEMENT>
</ASSOCIATE>
<ASSOCIATE>
 <TARGET_ELEMENT>PAPER.SECTION.TEXT</TARGET_
 ELEMENT>
 <SOURCE_ELEMENT>DOCUMENT.CHAPTER.SECTION.TEXT
   </SOURCE_ELEMENT>
</ASSOCIATE>
```

The conversion ruleset for the current example is the following:

```
<RuleSet>
    <RULE>
     <TARGET_DTD_CONTEXT>tdc1</TARGET_DTD_CONTEXT>
     <TARGET_ELEMENT>PAPER.TITLE</TARGET_ELEMENT>
     <VPROGRAM>
      return
      <REFERENCE>
       <SOURCE_ELEMENT>DOCUMENT.TITLE</SOURCE_ELEMENT>
      </REFERENCE>
      ;
     </VPROGRAM>
    </RULE>
    <RULE>
     <TARGET_DTD_CONTEXT>tdc2</TARGET_DTD_CONTEXT>
     <TARGET_ELEMENT>PAPER.AUTHINDEX.AUTHOR</TARGET_ELEMENT>
     <VPROGRAM>
      if
      <REFERENCE>
       <SOURCE_ELEMENT>DOCUMENT.AUTHOR</SOURCE_ELEMENT>
      </REFERENCE>
      .equals("_") return NULL; else return
      <REFERENCE>
       <SOURCE_ELEMENT>DOCUMENT.AUTHOR</SOURCE_ELEMENT>
      </REFERENCE>
      ;
     </VPROGRAM>
    </RULE>
    <RULE>
     <TARGET_DTD_CONTEXT>tdc2</TARGET_DTD_CONTEXT>
     <TARGET_ELEMENT>PAPER.AUTHINDEX.CHAPTER_TITLE</TARGET_ELEM
    ENT>
     <VPROGRAM>
      if
      <REFERENCE>
       <SOURCE_ELEMENT>DOCUMENT.AUTHOR</SOURCE_ELEMENT>
      </REFERENCE>
      .equals("_") return NULL; else return
      <REFERENCE>
       <SOURCE_ELEMENT>DOCUMENT.TITLE</SOURCE_ELEMENT>
      </REFERENCE>
      ;
     </VPROGRAM>
    </RULE>
    <RULE>
     <TARGET_DTD_CONTEXT>tdc3</TARGET_DTD_CONTEXT>
     <TARGET_ELEMENT>PAPER.AUTHINDEX.AUTHOR</TARGET_ELEMENT>
     <VPROGRAM>
      return
      <REFERENCE>
       <SOURCE_ELEMENT>DOCUMENT.EDITOR</SOURCE_ELEMENT>
      </REFERENCE>
```

-continued

```
    ;
   </VPROGRAM>
  </RULE>
  <RULE>
   <TARGET_DTD_CONTEXT>tdc3</TARGET_DTD_CONTEXT>
   <TARGET_ELEMENT>PAPER.AUTHINDEX.CHAPTER_TITLE</TARGET_ELEMENT>
   <VPROGRAM>
    return
    <REFERENCE>
     <SOURCE_ELEMENT>DOCUMENT.TITLE</SOURCE_ELEMENT>
    </REFERENCE>
    ;
   </VPROGRAM>
  </RULE>
  <RULE>
   <TARGET_DTD_CONTEXT>tdc4</TARGET_DTD_CONTEXT>
   <TARGET_ELEMENT>PAPER.AUTHINDEX.AUTHOR</TARGET_ELEMENT>
   <VPROGRAM>
    return
    <REFERENCE>
<SOURCE_ELEMENT>DOCUMENT.CHAPTER.AUTHOR</SOURCE_ELEMENT>
    </REFERENCE>
    ;
   </VPROGRAM>
  </RULE>
  <RULE>
   <TARGET_DTD_CONTEXT>tdc4</TARGET_DTD_CONTEXT>
<TARGET_ELEMENT>PAPER.AUTHINDEX.CHAPTER_TITLE</TARGET_ELEMENT>
   <VPROGRAM>
    return
    <REFERENCE>
     <SOURCE_ELEMENT>DOCUMENT.CHAPTER.TITLE</SOURCE_ELEMENT>
    </REFERENCE>
    ;
   </VPROGRAM>
  </RULE>
  <RULE>
   <TARGET_DTD_CONTEXT>tdc5</TARGET_DTD_CONTEXT>
<TARGET_ELEMENT>PAPER.SECTION.TEXT.EMPHASIS_LEVEL</TARGET_ELEMENT>
   <VPROGRAM>
    if (
    <REFERENCE>
     <SOURCE_ELEMENT>DOCUMENT.CHAPTER.SECTION.TEXT.RECURSION
     </SOURCE_ELEMENT>
    </REFERENCE>
    .equals("_") | !
    <REFERENCE>
<SOURCE_ELEMENT>DOCUMENT.CHAPTER.AUTHOR</SOURCE_ELEMENT>
     <BPROGRAM>
      return (!
      <REFERENCE>
<SOURCE_ELEMENT>DOCUMENT.CHAPTER.AUTHOR</SOURCE_ELEMENT>
      </REFERENCE>
       .equals("_") );
     </BPROGRAM>
    </REFERENCE>
    .equals("_") ) return "0"; else return "1";
   </VPROGRAM>
  </RULE>
  <RULE>
   <TARGET_DTD_CONTEXT>tdc5</TARGET_DTD_CONTEXT>
   <TARGET_ELEMENT>PAPER.SECTION.TEXT.IMPCDATA</TARGET_ELEMENT>
   <VPROGRAM>
    return
    <REFERENCE>
<SOURCE_ELEMENT>DOCUMENT.CHAPTER.SECTION.TEXT.IMREP1.IMPCDATA
    </SOURCE_ELEMENT>
    </REFERENCE>
    ;
   </VPROGRAM>
  </RULE>
  <RULE>
   <TARGET_DTD_CONTEXT>tdc5</TARGET_DTD_CONTEXT>
   <TARGET_ELEMENT>PAPER.SECTION.TITLE</TARGET_ELEMENT>
```

```
    <VPROGRAM>
      return
      <REFERENCE>
<SOURCE_ELEMENT>DOCUMENT.CHAPTER.SECTION.TITLE</SOURCE_ELE
MENT>
      </REFERENCE>
      ;
    </VPROGRAM>
  </RULE>
  <RULE>
    <TARGET_DTD_CONTEXT>tdc5</TARGET_DTD_CONTEXT>
    <TARGET_ELEMENT>PAPER.SECTION.CHAPTER_TITLE</TARGET_ELEMENT
>
    <VPROGRAM>
      return
      <REFERENCE>
        <SOURCE_ELEMENT>DOCUMENT.CHAPTER.TITLE</SOURCE_ELEMENT>
      </REFERENCE>
      ;
    </VPROGRAM>
  </RULE>
</RuleSet>
```

Transformation From Raw Source XML Document to a Source Tree Document

Because the example source document contains only a single root element, there is no need in this example to identify a root or to prune away other roots. We therefore exclude the steps of identifying a root and pruning from the present example.

In converting the source XML document to a source tree document, we first convert alternates and options: each missing optional element and each missing (non-recursive) alternative is replaced in skeleton format (with the null symbol as data). The declaration <!ELEMENT EMPHASIS (TEXT*)>is recursive so when TEXT is missing from EMPHASIS it is not replaced. The result of converting alternates and options is:

```
<DOCUMENT LANGUAGE="English">
  <TITLE>Example</TITLE>
  <ABSTRACT>_</ABSTRACT>
  <CHAPTER>
    < TITLE>Chapter 1</TITLE>
    <SECTION>
      <TITLE>_</TITLE>
      <TEXT>
        This is
        <EMPHASIS>
          <TEXT>
            text from
            <EMPHASIS>
              <TEXT>
                the first section of
                <EMPHASIS/>
              </TEXT>
            </EMPHASIS>
            the first chapter.
          </TEXT>
        </EMPHASIS>
      </TEXT>
    </SECTION>
    <SECTION>
      <TITLE>_</TITLE>
      <TEXT>
        This is unemphasized text from ch. 1: sec. 2.
        <EMPHASIS/>
      </TEXT>
    </SECTION>
```

```
    <AUTHOR>Arther Chapwon</AUTHOR>
  </CHAPTER>
  <CHAPTER>
    < TITLE>Chapter 2</TITLE>
    <SECTION>
      <TEXT>
        This is unemphasized text from ch. 2: sec. 1.
        <EMPHASIS/>
      </TEXT>
    </SECTION>
    <AUTHOR>Arther Chaptoo</AUTHOR>
    <AUTHOR>Bill Chaptoo</AUTHOR>
  </CHAPTER>
  <EDITOR>Ed One</EDITOR>
  <EDITOR>Ed Two</EDITOR>
  <AUTHOR>_</AUTHOR>
</DOCUMENT>
```

We next convert imbedded sequences and optionally demote imbedded compound repetitions. We skip the optional part, and there is no work to do for the imbedded sequence conversion (it has no effect on the document, only on the DTD). The next step is demoting attributes, which produces:

```
<DOCUMENT>
  <LANGUAGE>English</LANGUAGE>
  <TITLE>Example</TITLE>
  <ABSTRACT>_</ABSTRACT>
  <CHAPTER>
    < TITLE>Chapter 1</TITLE>
    <SECTION>
      <TITLE>_</TITLE>
      <TEXT>
        This is
        <EMPHASIS>
          <TEXT>
            text from
            <EMPHASIS>
              <TEXT>
                the first section of
                <EMPHASIS/>
              </TEXT>
            </EMPHASIS>
            the first chapter.
```

```
            </TEXT>
          </EMPHASIS>
        </TEXT>
      </SECTION>
      <SECTION>
        <TITLE>_</TITLE>
        <TEXT>
          This is unemphasized text from ch. 1: sec. 2.
          <EMPHASIS/>
        </TEXT>
      </SECTION>
      <AUTHOR>Arther Chapwon</AUTHOR>
    </CHAPTER>
    <CHAPTER>
      < TITLE>Chapter 2</TITLE>
      <SECTION>
        <TEXT>
          This is unemphasized text from ch. 2: sec. 1.
          <EMPHASIS/>
        </TEXT>
      </SECTION>
      <AUTHOR>Arther Chaptoo</AUTHOR>
      <AUTHOR>Bill Chaptoo</AUTHOR>
    </CHAPTER>
    <EDITOR>Ed One</EDITOR>
    <EDITOR>Ed Two</EDITOR>
    <AUTHOR>_</AUTHOR>
</DOCUMENT>
```

We next convert the recursion to a repetition of TEXT blocks. We encode paths using only as many letters of the element name as are necessary to distinguish it, producing:

```
<DOCUMENT>
  <LANGUAGE>English</LANGUAGE>
  <TITLE>Example</TITLE>
  <ABSTRACT>_</ABSTRACT>
  <CHAPTER>
    < TITLE>Chapter 1</TITLE>
    <SECTION>
      <TITLE>_</TITLE>
      <TEXT>
        <RECURSION>_</RECURSION>
        This is
        <EMPHASIS/>
      </TEXT>
      <TEXT>
        <RECURSION>D,C,TE,E</RECURSION>
        text from
        <EMPHASIS/>
        the first chapter.
      </TEXT>
      <TEXT>
        <RECURSION>D,C,TE,E,TE,E</RECURSION>
        the first section of
        <EMPHASIS/>
      </TEXT>
    </SECTION>
    <SECTION>
      <TITLE>_</TITLE>
      <TEXT>
        <RECURSION>_</RECURSION>
        This is unemphasized text from ch. 1: sec. 2.
        <EMPHASIS/>
      </TEXT>
    </SECTION>
    <AUTHOR>Arther Chapwon</AUTHOR>
  </CHAPTER>
  <CHAPTER>
    < TITLE>Chapter 2</TTTLE>
    <SECTION>
      <TEXT>
        <RECURSION>_</RECURSION>
        This is unemphasized text from ch. 2: sec. 1.
        <EMPHASIS/>
      </TEXT>
    </SECTION>
    <AUTHOR>Arther Chaptoo</AUTHOR>
    <AUTHOR>Bill Chaptoo</AUTHOR>
  </CHAPTER>
  <EDITOR>Ed One</EDITOR>
  <EDITOR>Ed Two</EDITOR>
  <AUTHOR>_</AUTHOR>
</DOCUMENT>
```

We next perform the final demotions of imbedded compound repetitions and imbedded leaves, producing:

```
source_as_tree_Doc ("_" is null symbol):
<DOCUMENT>
  <LANGUAGE>English</LANGUAGE>
  <TITLE>Example</TITLE>
  <ABSTRACT>_</ABSTRACT>
  <CHAPTER>
    < TITLE>Chapter 1</TITLE>
    <SECTION>
      <TITLE>_</TITLE>
      <TEXT>
        <RECURSION>_</RECURSION>
        <IMREP1>
          <IMPCDATA>This is </IMPCDATA>
          <EMPHASIS/>
        </IMREP1>
      </TEXT>
      <TEXT>
        <RECURSION> D.C.TE.E.TE </RECURSION>
        <IMREP1>
          <IMPCDATA>text from</IMPCDATA>
          <EMPHASIS />>
        </IMREP1>
        <IMREP1>
          <IMPCDATA>the first chapter.</IMPCDATA>
          <EMPHASIS/>
        </IMREP1>
      </TEXT>
      <TEXT>
        <RECURSION>D.C.TE.E.TE.E.TE</RECURSION>
        <IMREP1>
          <IMPCDATA>the first section of </IMPCDATA>
          <EMPHASIS/>
        </IMREP1>
      </TEXT>
    </SECTION>
    <TITLE>_</TITLE>
    <TEXT>
      <RECURSION>_</RECURSION>
      <IMREP1>
        <IMPCDATA>This is unemphasized text from
        ch. 1: sec. 2. </IMPCDATA>
        <EMPHASIS/>
      </IMREP1>
    </TEXT>
    </SECTION>
    <AUTHOR>Arther Chapwon</AUTHOR>
  </CHAPTER>
  <CHAPTER>
    < TITLE>Chapter 2</TITLE>
    <SECTION>
      <TITLE>_</TITLE>
      <TEXT>
        <RECURSION>_</RECURSION>
        <IMREP1>
          </IMPCDATA>This is unemphasized text from
          ch. 2: sec. 1.</IMPCDATA>
          <EMPHASIS/>
        </IMREP1>
      </TEXT>
    </SECTION>
    <AUTHOR>Arther Chaptoo</AUTHOR>
```

```
        <AUTHOR>Bill Chaptoo</AUTHOR>
    </CHAPTER>
    <AUTHOR>_</AUTHOR>
    <EDITOR>Ed One</EDITOR>
    <EDITOR>Ed Two</EDITOR>
</DOCUMENT>
```

Create the Skeleton for the Target Document Tree

To create the skeleton target, we start with the start- and end-tags for the root:

`<PAPER></PAPER>`.

From the declaration <!ELEMENT PAPER (TITLE, AUTHINDEX+, SECTION+)> we insert start- and end-tags for the children of PAPER producing:

```
<PAPER>
    <TITLE></TITLE>
    <AUTHINDEX></AUTHINDEX>
    <SECTION></SECTION>
</PAPER>
```

From the declaration <!ELEMENT TITLE (#PCDATA)>we insert the null symbol producing:

```
<PAPER>
    <TITLE>_</TITLE>
    <AUTHINDEX></AUTHINDEX>
    <SECTION></SECTION>
</PAPER>
```

From the declaration <!ELEMENT AUTHINDEX (AUTHOR, CHAPTER_TITLE)> we insert start- and end-tags for the children of AUTHINDEX producing:

```
<PAPER>
    <TITLE>_</TITLE>
    <AUTHINDEX>
    <AUTHOR></AUTHOR>
    <CHAPTER_TITLE></CHAPTER_TITLE>
    </AUTHINDEX>
    <SECTION></SECTION>
</PAPER>
```

From the declaration <!ELEMENT AUTHOR (#PCDATA)> we insert the null symbol producing:

```
<PAPER>
    <TITLE>_</TITLE>
    <AUTHINDEX>
    <AUTHOR>_</AUTHOR>
    <CHAPTER_TITLE></CHAPTER_TITLE>
    </AUTHINDEX>
    <SECTION></SECTION>
</PAPER>
```

From the declaration <!ELEMENT CHAPTER_TITLE (#PCDATA)> we insert the null symbol producing:

```
<PAPER>
    <TITLE>_</TITLE>
    <AUTHINDEX>
    <AUTHOR>_</AUTHOR>
    <CHAPTER_TITLE>_</CHAPTER_TITLE>
    </AUTHINDEX>
    <SECTION></SECTION>
</PAPER>
```

From the declaration <!ELEMENT SECTION (TITLE, CHAPTER_TITLE, TEXT+)> we insert start- and end-tags for the children of SECTION producing:

```
<PAPER>
    <TITLE>_</TITLE>
    <AUTHINDEX>
    <AUTHOR>_</AUTHOR>
    <CHAPTER_TITLE>_</CHAPTER_TITLE>
    </AUTHINDEX>
    <SECTION>
    <TITLE></TITLE>
    <CHAPTER_TITLE></CHAPTER_TITLE>
    <TEXT></TEXT>
    </SECTION>
</PAPER>
```

From the declarations for TITLE and CHAPTER_TITLE we insert null symbols producing:

```
<PAPER>
    <TITLE>_</TITLE>
    <AUTHINDEX>
    <AUTHOR>_</AUTHOR>
    <CHAPTER_TITLE>_</CHAPTER_TITLE>
    </AUTHINDEX>
    <SECTION>
    <TITLE>_</TITLE>
    <CHAPTER_TITLE>_</CHAPTER_TITLE>
    <TEXT></TEXT>
    </SECTION>
</PAPER>
```

From the declaration <!ELEMENT TEXT (EMPHASIS_LEVEL, IMPCDATA)> we insert start- and end-tags for the children of TEXT producing:

```
<PAPER>
    <TITLE>_</TITLE>
    <AUTHINDEX>
    <AUTHOR>_</AUTHOR>
    <CHAPTER_TITLE>_</CHAPTER_TITLE>
    </AUTHINDEX>
    <SECTION>
    <TITLE>_</TITLE>
    <CHAPTER_TITLE>_</CHAPTER_TITLE>
    <TEXT>
    <EMPHASIS_LEVEL></EMPHASIS_LEVEL>
    <IMPCDATA></IMPCDATA>
    </TEXT>
    </SECTION>
</PAPER>
```

From the declarations <!ELEMENT IMPCDATA (#PCDATA)> and <!ELEMENT EMPHASIS_LEVEL (#PCDATA)> we insert null symbols producing the final result.

Skeleton Target:

```
<PAPER>
    <TITLE>_</TITLE>
    <AUTHINDEX>
        <AUTHOR>_</AUTHOR>
        <CHAPTER_TITLE>_</CHAPTER_TITLE>
    </AUTHINDEX>
    <SECTION>
        <TITLE>_</TITLE>
        <CHAPTER_TITLE>_</CHAPTER_TITLE>
        <TEXT>
            <EMPHASIS_LEVEL>_</EMPHASIS_LEVEL>
            <IMPCDATA>_</IMPCDATA>
        </TEXT>
    </SECTION>
</PAPER>
```

Application of the Rules in the Ruleset to Produce the Target Document Tree

The first target DTD context is tdc1. Tdc1 is the default target DTD context. Tdc1 has no associate pairs, so rules with tdsc1 are applied once. After the application of the first rule, the skeleton target appears as follows:

```
<PAPER>
    <TITLE>Example</TITLE>
    <AUTHINDEX>
        <AUTHOR>_</AUTHOR>
        <CHAPTER_TITLE>_</CHAPTER_TITLE>
    </AUTHINDEX>
    <SECTION>
        <TITLE>_</TITLE>
        <CHAPTER_TITLE>_</CHAPTER_TITLE>
        <TEXT>
            <EMPHASIS_LEVEL>_</EMPHASIS_LEVEL>
            <IMPCDATA>_</IMPCDATA>
        </TEXT>
    </SECTION>
</PAPER>
```

Note that at this and every subsequent stage the target skeleton satisfies the target_as_tree_DTD.

The second target DTD context is tdc2. Tdc2 associates source element DOCUMENT.AUTHOR with target element PAPER.AUTHINDEX. Because there is only one repetition of DOCUMENT.AUTHOR, there is no change to the skeleton before application of the rules. Two rules (the second and third) have target DTD context tdc2. The Vprogram of each of these rules returns NULL rather than returning a non-null string value (e.g. "_"). This is a way of indicating that the rule is not to be executed, so after application of these rules there is no change to the target skeleton.

The third target DTD context is tdc3. Tdc3 associates source DOCUMENT.EDITOR with target PAPER.AUTHINDEX. There are two repetitions of DOCUMENT.EDITOR.

This produces a restriction of source_as_tree_Doc for each repetition of DOCUMENT.EDITOR, the restriction being to delete (with all descendants) all but one repetition of DOCUMENT.EDITOR. The result to target skeleton is:

```
<PAPER>
    <TITLE>Example</TITLE>
    <AUTHINDEX>
        <AUTHOR>_</AUTHOR>
        <CHAPTER_TITLE>_</CHAPTER_TITLE>
    </AUTHINDEX>
    <AUTHINDEX>
        <AUTHOR>_</AUTHOR>
        <CHAPTER_TITLE>_</CHAPTER_TITLE>
    </AUTHINDEX>
    <SECTION>
        <TITLE>_</TITLE>
        <CHAPTER_TITLE>_</CHAPTER_TITLE>
        <TEXT>
            <EMPHASIS_LEVEL>_</EMPHASIS_LEVEL>
            <IMPCDATA>_</IMPCDATA>
        </TEXT>
    </SECTION>
</PAPER>
```

After application of the fourth and fifth rules, the result is:

```
<PAPER>
    <TITLE>Example</TITLE>
    <AUTHINDEX>
        <AUTHOR>Ed One</AUTHOR>
        <CHAPTER_TITLE>Example</CHAPTER_TITLE>
    </AUTHINDEX>
    <AUTHINDEX>
        <AUTHOR>Ed Two</AUTHOR>
        <CHAPTER_TITLE>Example</CHAPTER_TITLE>
    </AUTHINDEX>
    <SECTION>
        <TITLE>_</TITLE>
        <CHAPTER_TITLE>_</CHAPTER_TITLE>
        <TEXT>
            <EMPHASIS_LEVEL>_</EMPHASIS_LEVEL>
            <IMPCDATA>_</IMPCDATA>
        </TEXT>
    </SECTION>
</PAPER>
```

The fourth target DTD context is tdc4. It associates source DOCUMENT.CHAPTER.AUTHOR with target PAPER.AUTHINDEX. There are a total of three repetitions of DOCUMENT.CHAPTER.AUTHOR, producing three restrictions and adding three AUTHINDEX blocks to target skeleton. After application of the sixth and seventh rules, the resulting document is:

```
<PAPER>
    <TITLE>Example</TITLE>
    <AUTHINDEX>
        <AUTHOR>Ed One</AUTHOR>
        <CHAPTER_TITLE>Example</CHAPTER_TITLE>
    </AUTHINDEX>
    <AUTHINDEX>
        <AUTHOR>Ed Two</AUTHOR>
        <CHAPTER_TITLE>Example</CHAPTER_TITLE>
    </AUTHINDEX>
    <AUTHINDEX>
        <AUTHOR>Arther Chapwon</AUTHOR>
        <CHAPTER_TITLE>Chapter 1</CHAPTER_TITLE>
    </AUTHINDEX>
    <AUTHINDEX>
        <AUTHOR>Arther Chaptoo</AUTHOR>
        <CHAPTER_TITLE>Chapter 2</CHAPTER_TITLE>
    </AUTHINDEX>
    <AUTHINDEX>
        <AUTHOR>Bill Chaptoo</AUTHOR>
        <CHAPTER_TITLE>Chapter 2</CHAPTER_TITLE>
    </AUTHINDEX>
    <SECTION>
```

-continued
```
    <TITLE>_</TITLE>
    <CHAPTER_TITLE>_</CHAPTER_TITLE>
    <TEXT>
      <EMPHASIS_LEVEL>_</EMPHASIS_LEVEL>
      <IMPCDATA>_</IMPCDATA>
    </TEXT>
  </SECTION>
</PAPER>
```

The last target DTD context is tdc5. It associates source DOCUMENT.CHAPTER with target PAPER.SECTION and source DOCUMENT.CHAPTER.SECTION.TEXT with target PAPER.SECTION.TEXT. The associations are used hierarchically to produce a total of seven restrictions: the first four being associated with the first repetition of DOCUMENT.CHAPTER.SECTION for which there is exactly one corresponding repetition of DOCUMENT.CHAPTER.AUTHOR; the fifth being associated with the second repetition of DOCUMENT.CHIAPTER.SECTION for which there is also exactly one corresponding repetition of DOCUMENT.CHAPTER.AUTHOR; the sixth being associated with the third repetition of DOCUMENT.CHAPTER.SECTION and its first corresponding repetition of DOCUMENT.CHAPTER.AUTHOR; and the seventh being associated with the third repetition of DOCUMENT.CHAPTER.SECTION and its second corresponding repetition of DOCUMENT.CHAPTER.AUTHOR. after application of tdc5 and before application of the last two rules, the target skeleton is now transformed to:

```
<PAPER>
  <TITLE>Example</TITLE>
  <AUTHINDEX>
    <AUTHOR>Ed One</AUTHOR>
    <CHAPTER_TITLE>Example</CHAPTER_TITLE>
  </AUTHINDEX>
  <AUTHINDEX>
    <AUTHOR>Ed Two</AUTHOR>
    <CHAPTER_TITLE>Example</CHAPTER_TITLE>
  </AUTHINDEX>
  <AUTHINDEX>
    <AUTHOR>Arther Chapwon</AUTHOR>
    <CHAPTER_TITLE>Chapter 1</CHAPTER_TITLE>
  </AUTHINDEX>
  <AUTHINDEX>
    <AUTHOR>Arther Chaptoo</AUTHOR>
    <CHAPTER_TITLE>Chapter 2</CHAPTER_TITLE>
  </AUTHINDEX>
  <AUTHINDEX>
    <AUTHOR>Bill Chaptoo</AUTHOR>
    <CHAPTER_TITLE>Chapter 2</CHAPTER_TITLE>
  </AUTHINDEX>
  <SECTION>
    <TITLE>_</TITLE>
    <CHAPTER_TITLE>_</CHAPTER_TITLE>
    <TEXT>
      <EMPHASIS_LEVEL>_</EMPHASIS_LEVEL>
      <IMPCDATA>_</IMPCDATA>
    </TEXT>
    <TEXT>
      <EMPHASIS_LEVEL>_</EMPHASIS_LEVEL>
      <IMPCDATA>_</IMPCDATA>
    </TEXT>
    <TEXT>
      <EMPHASIS_LEVEL>_</EMPHASIS_LEVEL>
      <IMPCDATA>_</IMPCDATA>
    </TEXT>
    <TEXT>
      <EMPHASIS_LEVEL>_</EMPHASIS_LEVEL>
      <IMPCDATA>_</IMPCDATA>
```

-continued
```
    </TEXT>
  </SECTION>
  <SECTION>
    <TITLE>_</TITLE>
    <CHAPTER_TITLE>_</CHAPTER_TITLE>
    <TEXT>
      <EMPHASIS_LEVEL>_</EMPHASIS_LEVEL>
      <IMPCDATA>_</IMPCDATA>
    </TEXT>
  </SECTION>
  <SECTION>
    <TITLE>_</TITLE>
    <CHAPTER_TITLE>_</CHAPTER_TITLE>
    <TEXT>
      <EMPHASIS_LEVEL>_</EMPHASIS_LEVEL>
      <IMPCDATA>_</IMPCDATA>
    </TEXT>
  </SECTION>
  <SECTION>
    <TITLE>_</TITLE>
    <CHAPTER_TITLE>_</CHAPTER_TITLE>
    <TEXT>
      <EMPHASIS_LEVEL>_</EMPHASIS_LEVEL>
      <IMPCDATA>_</IMPCDATA>
    </TEXT>
  </SECTION>
</PAPER>
```

The last four rules are applied to each of the seven restrictions by evaluating references from the bottom up, first evaluating the references with no Bprograms and the Bprograms and with no references, then hierarchically evaluating programs and references until the root Vprogram is evaluated. The final result is:

target_as_tree_Doc:

```
<PAPER>
  <TITLE>Example</TITLE>
  <AUTHINDEX>
    <AUTHOR>Ed One</AUTHOR>
    <CHAPTER_TITLE>Example</CHAPTER_TITLE>
  </AUTHINDEX>
  <AUTHINDEX>
    <AUTHOR>Ed Two</AUTHOR>
    <CHAPTER_TITLE>Example</CHAPTER_TITLE>
  </AUTHINDEX>
  <AUTHINDEX>
    <AUTHOR>Arther Chapwon</AUTHOR>
    <CHAPTER_TITLE>Chapter 1</CHAPTER_TITLE>
  </AUTHINDEX>
  <AUTHINDEX>
    <AUTHOR>Arther Chaptoo</AUTHOR>
    <CHAPTER_TITLE>Chapter 2</CHAPTER_TITLE>
  </AUTHINDEX>
  <AUTHINDEX>
    <AUTHOR>Bill Chaptoo</AUTHOR>
    <CHAPTER_TITLE>Chapter 2</CHAPTER_TITLE>
  </AUTHINDEX>
  <SECTION>
    <TITLE>_</TITLE>
    <CHAPTER_TITLE>Chapter 1</CHAPTER_TITLE>
    <TEXT>
      <EMPHASIS_LEVEL>0</EMPHASIS_LEVEL>
      <IMPCDATA>This is </IMPCDATA>
    </TEXT>
    <TEXT>
      <EMPHASIS_LEVEL>1</EMPHASIS_LEVEL>
      <IMPCDATA>text from</IMPCDATA>
    </TEXT>
    <TEXT>
      <EMPHASIS_LEVEL>1</EMPHASIS_LEVEL>
      <IMPCDATA>the first chapter.</IMPCDATA>
    </TEXT>
```

```
        <TEXT>
          <EMPHASIS_LEVEL>1</EMPHASIS_LEVEL>
          <IMPCDATA>the first section of</IMPCDATA>
        </TEXT>
      </SECTION>
      <SECTION>
        <TITLE>_</TITLE>
        <CHAPTER_TITLE>Chapter 1</CHAPTER_TITLE>
        <TEXT>
          <EMPHASIS_LEVEL>0</EMPHASIS_LEVEL>
          <IMPCDATA>This is unemphasized text from ch. 1:
sec. 2. </IMPCDATA>
        </TEXT>
      </SECTION>
      <SECTION>
        <TITLE>_</TITLE>
        <CHAPTER_TITLE>Chapter 2</CHAPTER_TITLE>
        <TEXT>
          <EMPHASIS_LEVEL>0</EMPHASIS_LEVEL>
          <IMPCDATA>This is unemphasized text from ch. 2:
sec 1.</IMPCDATA>
        </TEXT>
      </SECTION>
      <SECTION>
        <TITLE>_</TITLE>
        <CHAPTER_TITLE>Chapter 2</CHAPTER_TITLE>
        <TEXT>
          <EMPHASIS_LEVEL>0</EMPHASIS_LEVEL>
          <IMPCDATA>This is unemphasized text from ch. 2:
sec 1.</IMPCDATA>
        </TEXT>
      </SECTION>
</PAPER>
```

Transformation of the Target Document Tree to the Target XML Document

The process of transforming a target document tree into a target XML document can be viewed as a kind of inversion of the process of transforming a raw source XML document into a source document tree. The first step in the inversion corresponds to the last step in the direct document transformation process—this is the document transformation step of demoting imbedded leaves and compound repetitions. The inverse step at the document level is to remove the IMREP and IMPCDATA tags. The result of this step is:

```
<PAPER>
  <TITLE>Example</TITLE>
  <AUTHINDEX>
    <AUTHOR>Ed One</AUTHOR>
    <CHAPTER_TITLE>Example</CHAPTER_TITLE>
  </AUTHINDEX>
  <AUTHINDEX>
    <AUTHOR>Ed Two</AUTHOR>
    <CHAPTER_TITLE>Example</CHAPTER_TITLE>
  </AUTHINDEX>
  <AUTHINDEX>
    <AUTHOR>Arther Chapwon</AUTHOR>
    <CHAPTER_TITLE>Chapter 1</CHAPTER_TITLE>
  </AUTHINDEX>
  <AUTHINDEX>
    <AUTHOR>Arther Chaptoo</AUTHOR>
    <CHAPTER_TITLE>Chapter 2</CHAPTER_TITLE>
  </AUTHINDEX>
  <AUTHINDEX>
    <AUTHOR>Bill Chaptoo</AUTHOR>
    <CHAPTER_TITLE>Chapter 2</CHAPTER_TITLE>
  </AUTHINDEX>
  <SECTION>
    <TITLE>_</TITLE>
    <CHAPTER_TITLE>Chapter 1</CHAPTER_TITLE>
    <TEXT>
      <EMPHASIS_LEVEL>0</EMPHASIS_LEVEL>
      This is
    </TEXT>
    <TEXT>
      <EMPHASIS_LEVEL>1</EMPHASIS_LEVEL>
      text from
    </TEXT>
    <TEXT>
      <EMPHASIS_LEVEL>1</EMPHASIS_LEVEL>
      the first chapter
    </TEXT>
    <TEXT>
      <EMPHASIS_LEVEL>1</EMPHASIS_LEVEL>
      the first section of
    </TEXT>
  </SECTION>
  <SECTION>
    <TITLE>_</TITLE>
    <CHAPTER_TITLE>Chapter 1</CHAPTER_TITLE>
    <TEXT>
      <EMPHASIS_LEVEL>0</EMPHASIS_LEVEL>
      This is unemphasized text from ch. 1: sec. 2.
    </TEXT>
  </SECTION>
  <SECTION>
    <TITLE>_</TITLE>
    <CHAPTER_TITLE>Chapter 2</CHAPTER_TITLE>
    <TEXT>
      <EMPHASIS_LEVEL>0</EMPHASIS_LEVEL>
      This is unemphasized text from ch. 2: sec 1
    </TEXT>
  </SECTION>
  <SECTION>
    <TITLE>_</TITLE>
    <CHAPTER_TITLE>Chapter 2</CHAPTER_TITLE>
    <TEXT>
      <EMPHASIS_LEVEL>0</EMPHASIS_LEVEL>
      This is unemphasized text from ch. 2: sec 1
    </TEXT>
  </SECTION>
</PAPER>
```

The next step is to convert repetitions (that encode recursion) to recursions. These repetitions are detected by their RECURSION blocks. Since there are no RECURSION blocks in this target document, this step makes no change.

The next step is to promote attributes from the child level back into the appropriate tag. In this example, however, there are no attributes (in the target DTD), so there are no changes resulting from this step.

The next step is to remove any IMSEQ tags resulting from the optional demotion of imbedded compound repetitions. There are none, so this step results in no change.

The final step is to remove any optional leaves with null symbol content and to remove all but the first alternative that has other than null symbol content from any set of alternatives. There are no alternatives in the target DTD. However, there are optional elements including the TITLE child of element SECTION, which has null symbol content in each of its occurrences. These are removed to produce the final result for output:

Target XML Document:

```
<PAPER>
  <TITLE>Example</TITLE>
  <AUTHINDEX>
    <AUTHOR>Ed One</AUTHOR>
    <CHAPTER_TITLE>Example</CHAPTER_TITLE>
```

-continued

```
    </AUTHINDEX>
    <AUTHINDEX>
      <AUTHOR>Ed Two</AUTHOR>
      <CHAPTER_TITLE>Example</CHAPTER_TITLE>
    </AUTHINDEX>
    <AUTHINDEX>
      <AUTHOR>Arther Chapwon</AUTHOR>
      <CHAPTER_TITLE>Chapter 1</CHAPTER_TITLE>
    </AUTHINDEX>
    <AUTHINDEX>
      <AUTHOR>Arther Chaptoo</AUTHOR>
      <CHAPTER_TITLE>Chapter 2</CHAPTER_TITLE>
    </AUTHINDEX>
    <AUTHINDEX>
      <AUTHOR>Bill Chaptoo</AUTHOR>
      <CHAPTER_TITLE>Chapter 2</CHAPTER_TITLE>
    </AUTHINDEX>
    <SECTION>
      <CHAPTER_TITLE>Chapter 1</CHAPTER_TITLE>
      <TEXT>
        <EMPHASIS_LEVEL>0</EMPHASIS_LEVEL>
        This is
      </TEXT>
      <TEXT>
        <EMPHASIS_LEVEL>1</EMPHASIS_LEVEL>
        text from
      </TEXT>
      <TEXT>
        <EMPHASIS_LEVEL>1</EMPHASIS_LEVEL>
        the first chapter.
      </TEXT>
      <TEXT>
        <EMPHASIS_LEVEL>1</EMPHASIS_LEVEL>
        the first section of
      </TEXT>
    </SECTION>
    <SECTION>
      <CHAPTER_TITLE>Chapter 1</CHAPTER_TITLE>
      <TEXT>
        <EMPHASIS_LEVEL>0</EMPHASIS_LEVEL>
        This is unemphasized text from ch. 1: sec. 2.
      </TEXT>
    </SECTION>
    <SECTION>
      <TITLE>_</TITLE>
      <CHAPTER_TITLE>Chapter 2</CHAPTER_TITLE>
      <TEXT>
        <EMPHAS1S_LEVEL>0</EMPHASIS_LEVEL>
        This is unemphasized text from ch. 2: sec 1.
      </TEXT>
    </SECTION>
    <SECTION>
      <CHAPTER_TITLE>Chapter 2</CHAPTER_TITLE>
      <TEXT>
        <EMPHASIS_LEVEL>0</EMPHASIS_LEVEL>
        This is unemphasized text from ch. 2: sec 1.
      </TEXT>
    </SECTION>
  </PAPER>
```

It will be understood from the foregoing description that various modifications and changes may be made, and in fact will be made, in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method for transforming a source XML document satisfying a source DTD into a target XML document satisfying a target DTD, the method comprising:

transforming the source XML document into a source document tree, wherein the source XML document satisfies a first XML grammar and the source document tree satisfies a second XML grammar, wherein transforming the source XML document into a source document tree further comprises:

removing alternates and options;

converting imbedded repetitions and sequences to repeating children;

demoting attributes of elements having attributes to children of the elements having attributes;

converting recursive elements to repeating elements; and demoting imbed leaves and compound repetitions;

converting the source document into a target document tree satisfying the second XML grammar; and transforming the target document tree into the target XML document, wherein the target XML document satisfies the first XML grammar.

2. The method of claim 1 further comprising pruning the source XML document, including selecting a root element for the target XML document and deleting all XML elements that are outside matching root tags in the source XML document.

3. The method of claim 1 wherein removing alternates and options further comprises adding start-tags and end-tags with null content for each missing, non-recursive XML element in the source XML document, including identifying missing, non-recursive elements in dependence upon the source DTD.

4. The method of claim 1 wherein converting imbeddded repetitions and sequences to repeating children further comprises creating repeating children elements, adding start-tags and end-tags for children elements, and deleting imbedded repetitions and sequences.

5. The method of claim 1 wherein demoting attributes of elements having attributes to children of the elements having attributes further comprises adding start-tags and end-tags identifying new attribute demotion elements incorporating attribute names as the names of the new elements, inserting attribute values as element values, and deleting the attributes.

6. The method of claim 1 wherein demoting imbedded leaves and compound repetitions further comprises adding imbedded leaf demotion tags to demote imbedded leaves and adding compound repetition demotion tags to demote compound repetitions.

7. A method for transforming a source XML document satisfying a source DTD into a target XML document satisfying a target DTD, the method comprising:

transforming the source XML document into a source document tree, wherein the source XML document satisfies a first XML grammar and the source document tree satisfies a second XML grammar;

converting the source document into a target document tree satisfying the second XML grammar, wherein converting the source document tree into a target document tree further comprises:

creating the target document tree in a form satisfying the second XML grammar and having tags containing only branches of children tags and leaves with null content;

inserting into the target document tree repeating elements in dependence upon corresponding element of the source document tree, including identifying the corresponding elements from the transformation rules; and applying graphically specified transformation rules to elements of the source document tree, including generating element values and inserting the element values into the target document tree; and transforming the target document tree into the target XML document, wherein the target XML document satisfies the first XML grammar.

8. A method for transforming a source XML document satisfying a source DTD into a target XML document satisfying a target DTD, the method comprising:
  transforming the source XML document into a source document tree, wherein the source XML document satisfies a first XML grammar and the source document tree satisfies a second XML grammar;
  converting the source document into a target document tree satisfying the second XML grammar; and
  transforming the target document tree into the target XML document, wherein the target XML document satisfies the first XML grammar, wherein transforming the target document tree into the target XML document further comprises:
    promoting imbedded leaves and compound repetitions;
    replacing recursions;
    promoting attributes, including moving attributes back inside parent element tags;
    replacing imbedded repetitions and sequences; and
    replacing alternates and options.

9. The method of claim 8 wherein promoting imbedded leaves and compound repetitions further comprises removing elements having imbedded leaf demotion element removing elements having compound repetition demotion element names.

10. The method of claim 8 wherein replacing recursions further comprises reattaching to parent elements having recursion expansion names and deleting children having names identifying the children as empty children.

11. The method of claim 8 wherein replacing imbedded repetitions and sequences further comprises removing any remaining elements having compound repetition demotion element names.

12. The method of claim 8 wherein replacing alternates and options further comprises removing optional blocks with null symbol values and removing all but the first of each set of alternatives.

13. A system for transforming a source XML document satisfying a source DTD into a target XML document satisfying a target DTD, the system comprising:
  means for transforming the source XML document into a source document tree, wherein the source XML document satisfies a first XML grammar and the source document tree satisfies a second XML grammar, wherein transforming the source XML document into a source document tree further comprises:
    means for removing alternates and options;
    means for converting imbedded repetitions and sequences to repeating children;
    means for demoting attributes of elements having attributes to children of the elements having attributes;
    means for converting recursive elements to repeating elements; and
    means for demoting imbed leaves and compound repetitions;
  means for converting the source document into a target document tree satisfying the second XML grammar; and
  means for transforming the target document tree into the target XML document, wherein the target XML document satisfies the first XML grammar.

14. The system of claim 13 further comprising means for pruning the source XML document, including means for selecting a root element for the target XML document and deleting all XML elements that are outside matching root tags in the source XML document.

15. The system of claim 13 wherein means for removing alternates and options further comprises means for adding start-tags and end-tags with null content for each missing, non-recursive XML element in the source XML document, including identifying missing, non-recursive elements in dependence upon the source DTD.

16. The system of claim 13 wherein means for converting imbedded repetitions and sequences to repeating children further comprises means for creating repeating children elements, adding start-tags and end-tags for children elements, and deleting imbedded repetitions and sequences.

17. The system of claim 13 wherein means for demoting attributes of elements having attributes to children of the elements having attributes further comprises means for adding start-tags and end-tags identifying new attribute demotion elements incorporating attribute names as the names of the new elements, inserting attribute values as element values, and deleting the attributes.

18. The system of claim 13 wherein means for demoting imbedded leaves and compound repetitions further comprises means for adding imbedded leaf demotion tags to demote imbedded leaves and adding compound repetition demotion tags to demote compound repetitions.

19. The system for transforming a source XML document satisfying a source DTD into a target XML document satisfying a target DTD, the system comprising:
  means for transforming the source XML document into a source document tree, wherein the source XML document satisfies a first XML grammar and the source document tree satisfies a second XML grammar;
  means for converting the source document into a target document tree satisfying the second XML grammar, wherein converting the source document tree into a target document tree further comprises:
    means for creating the target document tree in a form satisfying the second XML grammar and having tags containing only branches of children tags and leaves with null content;
    means for inserting into the target document tree repeating elements in dependence upon corresponding element of the source document tree including identifying the corresponding elements from the transformation rules; and
    means for applying graphically specified transformation rules to elements of the source document tree, including generating element values and inserting the element values into the target document tree; and
  means for transforming the target document tree into the target XML document, wherein the target XML document satisfies the first XML grammar.

20. The system for transforming a source XML document satisfying a source DTD into a target XML document satisfying a target DTD, the system comprising:
  means for transforming the source XML document into a source document tree, wherein the source XML document satisfies a first XML grammar and the source document tree satisfies a second XML grammar;
  means for converting the source document into a target document tree satisfying, the second XML grammar; and
  means for transforming the target document tree into the target XML document, wherein the target XML document satisfies the first XML grammar, wherein transforming the target document tree into the target XML document further comprises:
  means for promoting imbedded leaves and compound repetitions;
  means for replacing recursions;
  means for promoting attributes, including moving attributes back inside parent element tags;
  means for replacing imbedded repetitions and sequences; and
  means for replacing alternates and options.

21. The system of claim 20 wherein means for promoting imbedded leaves and compound repetitions further comprises means for removing elements having imbedded leaf demotion element removing elements having compound repetition demotion element names.

22. The system of claim 20 wherein means for replacing recursions further comprises means for reattaching to parent elements elements having recursion expansion names and means for deleting children having names identifying the children as empty children.

23. The system of claim 20 wherein means for replacing imbedded repetitions and sequences further comprises means for removing any remaining elements having compound repetition demotion element names.

24. The system of claim 20 wherein means for replacing alternates and options further comprises means for removing optional blocks with null symbol values and means for removing all but the first of each set of alternatives.

25. A computer program product for transforming a source XML document satisfying a source DTD into a target XML document satisfying a target DTD, the computer program product comprising:
  a recording medium;
  means, recorded on the recording medium, for transforming the source XML document into a source document tree, wherein the source XML document satisfies a first XML grammar and the source document tree satisfies a second XML grammar, wherein transforming the source XML document into a source document tree further comprises:
    means, recorded on the recording medium, for removing alternates and options;
    means, recorded on the recording medium, for converting imbedded repetitions and sequences to repeating children;
    means, recorded on the recording medium, for demoting attributes of elements having attributes to children of the elements having attributes;
    means, recorded on the recording medium, for converting recursive elements to repeating elements; and
    means, recorded on the recording medium, for demoting imbed leaves and compound repetitions;
  means, recorded on the recording medium, for converting the source document in to a target document tree satisfying the second XML grammar; and
  means, recorded on the recording medium, transforming the target document tree into the target XML document, wherein the target XML document satisfies the first XML grammar.

26. The computer program product of claim 25 further comprising means, recorded medium, for pruning the source XML document, including means for selecting a root element for the target XML document and deleting all XML elements that are outside matching root tags in the source XML document.

27. The computer program product of claim 25 wherein means, recorded on the recording medium, for removing alternates and options further comprises means for adding start-tags and end-tags with null content for each missing, non-recursive XML element in the source XML document, including identifying missing, non-recursive elements in dependence upon the source DTD.

28. The computer program product of claim 25 wherein means, recorded on the recording medium, for converting imbedded repetitions and sequences to repeating children further comprises means for creating repeating children elements, adding start-tags and end-tags for children elements, and deleting imbedded repetitions and sequences.

29. The computer program product of claim 25 wherein means, recorded on the recording medium, for demoting attributes of elements having attributes to children of the elements having attributes further comprises means for adding start-tags and end-tags identifying new attribute demotion elements incorporating attribute names as the names of the new elements, inserting attribute values as element values, and deleting the attributes.

30. The computer program product of claim 25 wherein means, recorded on the recording medium, for demoting imbedded leaves and compound repetitions further comprises means for adding imbedded leaf demotion tags to demote imbedded leaves and adding compound repetition demotion tags to demote compound repetitions.

31. A computer program product for transforming a source XML document satisfying a source DTD into a target XML document satisfying a target DTD, the computer program product comprising:
  a recording medium;
  means, recorded on the recording medium, for transforming the source XML document into a source document tree, wherein the source XML document satisfies a first XML grammar and the source document tree satisfies a second XML grammar;
  means, recorded on the recording medium, for converting the source document into a target document tree satisfying the second XML grammar, wherein converting the source document tree into a target document tree further comprises:
    means, recorded on the recording medium, for creating the target document tree in a form satisfying the second XML grammar and having tags containing only branches of children tags and leaves with null content;
    means, recorded on the recording medium, for inserting into the target document tree repeating elements in dependence upon corresponding element of the source document tree, including identifying the corresponding elements from the transformation rules; and
    means, recorded on the recording medium, for applying graphically specified transformation rules to elements of the source document tree including generating element values and inserting the element values into the target document tree; and
  means, recorded on the recording medium, for transforming the target document tree into the target XML document, wherein the target XML document satisfies the first XML grammar.

32. The computer program product for transforming a source XML document satisfying a source DTD into a target XML document satisfying a target DTD, the computer program product comprising:

a recording medium;

means, recorded on the recording medium, for transforming the source XML document into a source document tree, wherein the source XML document satisfies a first XML grammar and the source document tree satisfies a second XML grammar;

means, recorded on the recording medium, for converting the source document into a target document tree satisfying the second XML grammar; and means, recorded on the recording medium, for transforming the target document tree into the target XML document, wherein the target XML document satisfies the first XML grammar, wherein transforming the target document tree into the target XML document further comprises:

means, recorded on the recording medium, for promoting imbedded leaves and compound repetitions;

means, recorded on the recording medium, for replacing recursions;

means, recorded on the recording medium, for promoting attributes, including moving attributes back inside parent element tags;

means, recorded on the recording medium, for replacing imbedded repetitions and sequences; and means, recorded on the recording medium, for replacing alternates and options.

33. The computer program product of claim 32 wherein means, recorded on the recording medium, for promoting imbedded leaves and compound repetitions further comprises means, recorded on the recording medium, for removing elements having imbedded leaf demotion element removing elements having compound repetition demotion element names.

34. The computer program product of claim 32 wherein, means, recorded on the recording medium, for replacing recursions further comprises means, recorded on the recording medium, for reattaching to parent elements elements having recursion expansion names and means, recorded on the recording medium, for deleting children having names identifying the children as empty children.

35. The computer program product of claim 32 wherein means, recorded on the recording medium, for replacing imbedded repetitions and sequences further comprises means, recorded on the recording medium, for removing any remaining elements having compound repetition demotion element names.

36. The computer program product of claim 32 wherein means, recorded on the recording medium, for replacing alternates and options further comprises means, recorded on the recording medium, for removing optional blocks with null symbol values and means, recorded on the recording medium, for removing all but the first of each set of alternatives.

* * * * *